United States Patent
Liang et al.

(10) Patent No.: US 9,782,725 B2
(45) Date of Patent: Oct. 10, 2017

(54) CROSS-FLOW ELECTROCHEMICAL SEPARATION DEVICES AND METHODS OF ASSEMBLING SAME

(71) Applicant: EVOQUA WATER TECHNOLOGIES LLC, Warrendale, PA (US)

(72) Inventors: Li-Shiang Liang, Harvard, MA (US); Joseph D. Gifford, Marlborough, MA (US); Vivian Leow Hwee Teng, Singapore (SG); Keng Hoo Yeo, Singapore (SG); Chin Hiang Tan, Singapore (SG)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 15/116,964

(22) PCT Filed: Apr. 2, 2015

(86) PCT No.: PCT/US2015/024089
§ 371 (c)(1),
(2) Date: Aug. 5, 2016

(87) PCT Pub. No.: WO2015/153885
PCT Pub. Date: Oct. 8, 2015

(65) Prior Publication Data
US 2016/0346737 A1 Dec. 1, 2016

Related U.S. Application Data

(60) Provisional application No. 61/974,027, filed on Apr. 2, 2014.

(51) Int. Cl.
B01D 17/06 (2006.01)
B01D 61/46 (2006.01)
B01D 63/08 (2006.01)
C02F 1/46 (2006.01)
B01D 61/48 (2006.01)
B01D 61/42 (2006.01)
B01D 61/50 (2006.01)
(Continued)

(52) U.S. Cl.
CPC ............ *B01D 61/48* (2013.01); *B01D 17/06* (2013.01); *B01D 61/42* (2013.01); *B01D 61/50* (2013.01); *C02F 1/4693* (2013.01); *C02F 1/4695* (2013.01); *B01D 2315/10* (2013.01); *C02F 1/46104* (2013.01); *C02F 2201/4611* (2013.01); *C02F 2201/46115* (2013.01)

(58) Field of Classification Search
CPC ...................................................... B01D 17/06
USPC .................................................. 204/660, 666
See application file for complete search history.

(56) References Cited

U.S. PATENT DOCUMENTS

2003/0155243 A1 8/2003 Sferrazza
2010/0326833 A1 12/2010 Messalem et al.
(Continued)

*Primary Examiner* — Brian W Cohen

(57) ABSTRACT

Electrochemical purification apparatuses for treating water and methods of assembling the devices are provided. The apparatuses may be cross-flow electrochemical devices. The devices may be assembled and sealed through masking and application of a potting material. The devices may comprise various structures configured to improve the current efficiency of the device, reduce leakage, and improve the distribution of potting material to the assembly.

29 Claims, 57 Drawing Sheets

(51) Int. Cl.
*C02F 1/469* (2006.01)
*C02F 1/461* (2006.01)

(56) References Cited

U.S. PATENT DOCUMENTS

| | | |
|---|---|---|
| 2011/0284376 A1* | 11/2011 | Ng .................. B01D 61/46 204/520 |
| 2012/0117789 A1 | 5/2012 | Liang et al. |
| 2012/0168313 A1 | 7/2012 | Grebenyuk et al. |
| 2012/0199484 A1 | 8/2012 | Liang |

* cited by examiner

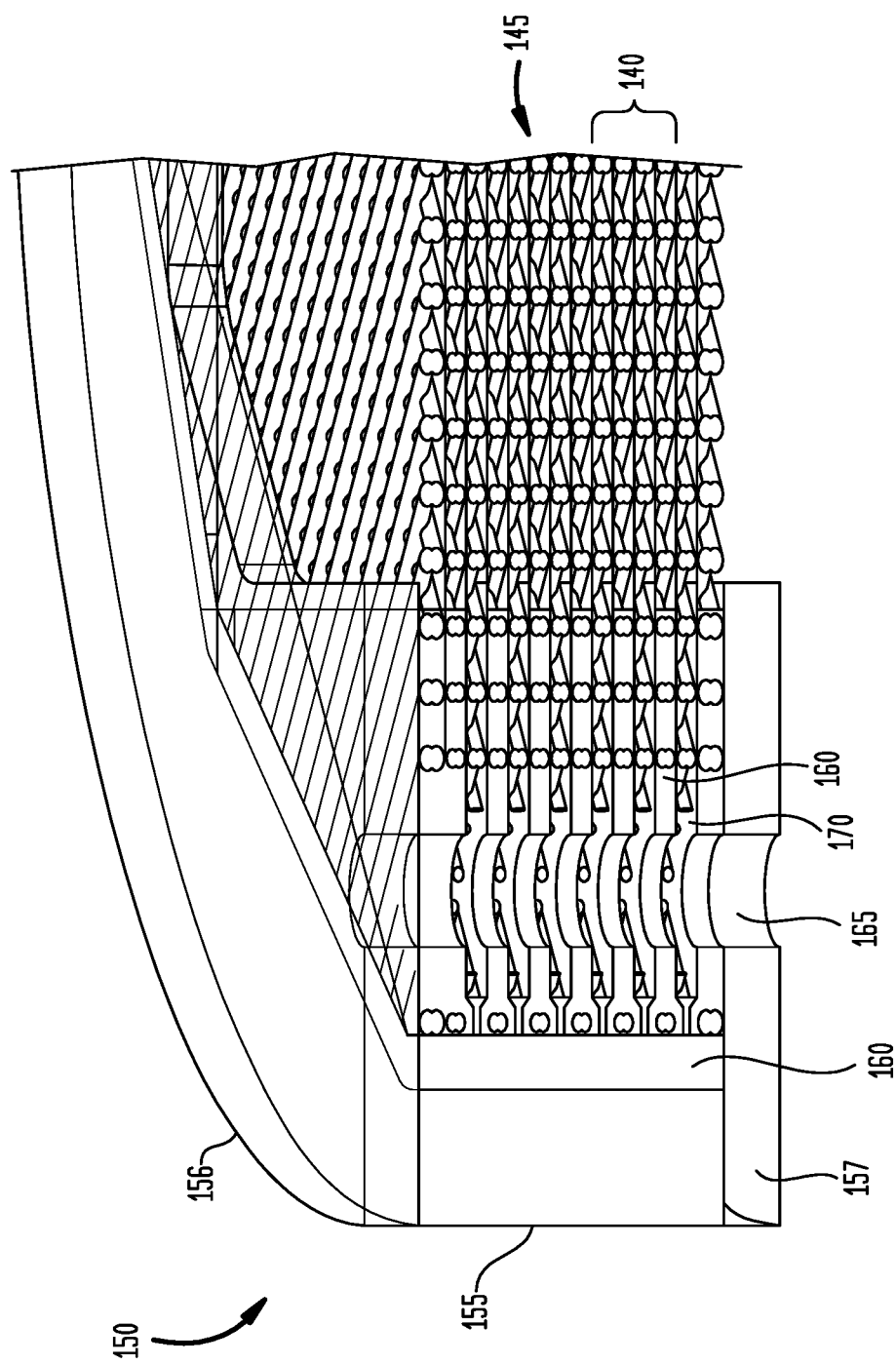

CROSS-FLOW ELECTROCHEMICAL SEPARATION DEVICES AND METHODS OF ASSEMBLING SAME

FIELD OF THE TECHNOLOGY

One or more aspects relate generally to electrical purification apparatuses and methods of assembling the same. More particularly, one or more aspects relate to cross-flow electrical purification apparatuses and methods of assembling same.

SUMMARY

In accordance with one or more aspects, an electrochemical separation apparatus may comprise a cell stack. The cell stack may further comprise a plurality of aligned cell pairs, each of the plurality of aligned cell pairs including an ion concentrating compartment constructed and arranged to provide fluid flow in a first direction and an ion diluting compartment constructed and arranged to provide fluid flow in a second direction that is different from the first direction. Each of the ion concentrating compartments may comprise an anion exchange membrane, a cation exchange membrane, and a first spacer positioned between the anion exchange membrane and the cation exchange membrane, the first spacer having a masked first set of end portions and a potted second set of end portions. Each of the ion diluting compartments may comprise an anion exchange membrane, a cation exchange membrane, and a second spacer positioned between the anion exchange membrane and the cation exchange membrane, the second spacer having a potted first set of end portions and a masked second set of end portions. The masked first set of end portions of the first spacer may be aligned with the potted first set of end portions of the second spacer, and the potted second set of end portions of the first spacer being aligned with the masked second set of end portions of the second spacer. Each end portion of the first and second sets of end portions may define a channel extending therethrough, each channel being in fluid communication with those spacers through whose masked end portion the channel extends, and each channel being in fluid isolation from those spacers through whose potted end portion the channel extends. The electrochemical separation apparatus may further comprise a frame surrounding the cell stack to form a first module and a housing enclosing the first module.

In accordance with one or more aspects, each of the masked first set of end portions of each of the first spacers and masked second set of end portions of each of the second spacers may comprise a sleeve surrounding the end portion of the spacer.

In accordance with one or more aspects, each of the sleeves may comprise a pair of films welded together.

In accordance with one or more aspects, the pair of films may be welded to each of the first or second spacers at each of the masked first or second set of end portions at multiple interior locations to form obstructions to fluid and current flow.

In accordance with one or more aspects, the pair of films may be welded directly to each other at each of the masked first or second set of end portions at multiple interior locations to form obstructions to fluid and current flow.

In accordance with one or more aspects, each of the sleeves of the first plurality of sleeves may comprise a plurality of ribs formed from welded together portions of the pair of plastic films.

In accordance with one or more aspects, each of the first or second spacers at each of the masked first or second set of end portions may comprise a plurality of raised obstructions in an interior of the masked first or second set of end portions to obstruct fluid and current flow.

In accordance with one or more aspects, each sleeve may comprise a plastic film and a portion of membrane welded to the masked first or second set of end portions of the first or second spacer, at a periphery of the end portion, the portion of membrane being a portion of one of the anion exchange and the cation exchange membrane.

In accordance with one or more aspects, the electrochemical separation apparatus may comprise further a second frame surrounding a second cell stack to form a second module within the housing, and a gasket positioned between the first module and the second module, the gasket comprising a plurality of apertures, each aperture aligned respectively with a channel of the first cell stack and a channel of the second module to provide for fluid communication between the first module and the second module.

In accordance with one or more aspects, may further comprise a second frame surrounding a second cell stack to form a second module within the housing, and a blocking spacer positioned between the first module and the second module to redirect flow between the first module and the second module.

In accordance with one or more aspects, the frame may comprise a reservoir configured to hold potting material.

In accordance with one or more aspects, the frame may comprise a channel configured to transfer potting material from the reservoir to the cell stack.

In accordance with one or more aspects, the frame may comprise a potting diffuser mechanism proximate the cell stack and in fluid communication with the channel.

In accordance with one or more aspects, the potting diffuser mechanism may comprise an angled cut-out formed in the frame, the angled cut-out configured to distribute potting material evenly to a full width of the cell stack.

In accordance with one or more aspects, the frame may comprise a unitary body.

In accordance with one or more aspects, the electrochemical separation apparatus may further comprise a first electrode at a first end of the housing and a second electrode at a second end of the housing.

In accordance with one or more aspects, the electrochemical separation apparatus may further comprise a casing surrounding the first electrode, the casing comprising a sealing bracket, a sealing cap, and an o-ring positioned between the sealing bracket and the sealing cap.

In accordance with one or more aspects, the electrochemical separation apparatus may further comprise a plurality of expandable plugs extending through the cell stack and arranged to maintain alignment of the plurality of aligned cell pairs.

In accordance with one or more aspects, a method of assembling an electrochemical separation apparatus may comprise: masking a first plurality of spacers at a first set of end portions; masking a second plurality of spacers at a second set of end portions, the second set of end portions being oriented at an angle to the first set of end portions; forming a plurality of cell pairs by, for each cell pair, positioning a spacer from the first plurality of spacers between a first anion exchange membrane and a cation exchange membrane to provide an ion concentrating compartment configured to direct fluid flow in a first direction, and positioning a spacer from the second plurality of spacers between the cation exchange membrane and a second anion exchange membrane to provide an ion diluting compartment configured to direct fluid flow in a second direction that is different from the first direction; forming a cell stack by successively stacking the formed plurality of cell pairs within a frame; potting the first set of end portions and the second set of end portions such that potting material enters the first set of end portions of the second plurality of spacers while being masked from entering the first set of end portions of the first plurality of spacers, and such that potting material enters the second set of end portions of the first plurality of spacers while being masked from entering the second set of end portions of the second plurality of spacers; defining a channel through each of the potted portions of each of the first and second sets of end portions such that each of the channels in the first set of end portions is in fluid communication with a plurality of ion concentrating compartments and fluidly isolated from a plurality of ion diluting compartments, while each of the channels in the second set of end portions is in fluid communication with the plurality of ion depleting compartments and fluidly isolated from the plurality of ion concentrating compartments; and inserting the channeled cell stack and frame into a housing to form the electrochemical separation apparatus.

In accordance with one or more aspects, masking a first plurality of spacers at a first set of end portions may comprise welding together a pair of plastic films to envelope each of the first set of end portions.

In accordance with one or more aspects, the pair of plastic films may be directly welded to each other.

In accordance with one or more aspects, the pair of plastic films may be welded to each of the first or second spacers.

In accordance with one or more aspects, potting may comprise injecting potting epoxy into the frame surrounding the cell stack from where it is wicked into the first set of end portions and the second set of end portions.

In accordance with one or more aspects, potting may comprise spinning the frame about a central axis as potting epoxy is injected into the frame.

In accordance with one or more aspects, the method may further comprise promoting uniform distribution of the potting epoxy.

In accordance with one or more aspects, the method may further comprise mounting a second electrochemical separation apparatus in the housing.

In accordance with one or more aspects, the method may further comprise inserting a blocking spacer between the first and second electrochemical separation apparatuses.

In accordance with one or more aspects, the method may further comprise maintaining alignment of the cell stack with at least one expandable plug.

In accordance with one or more aspects, the method may further comprise promoting current efficiency within the electrochemical separation apparatus.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of multiple embodiments are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

FIG. 12A is a schematic illustration of Section A-A' in FIG. 11 in accordance with one or more embodiments;

DETAILED DESCRIPTION

Figure 1A:
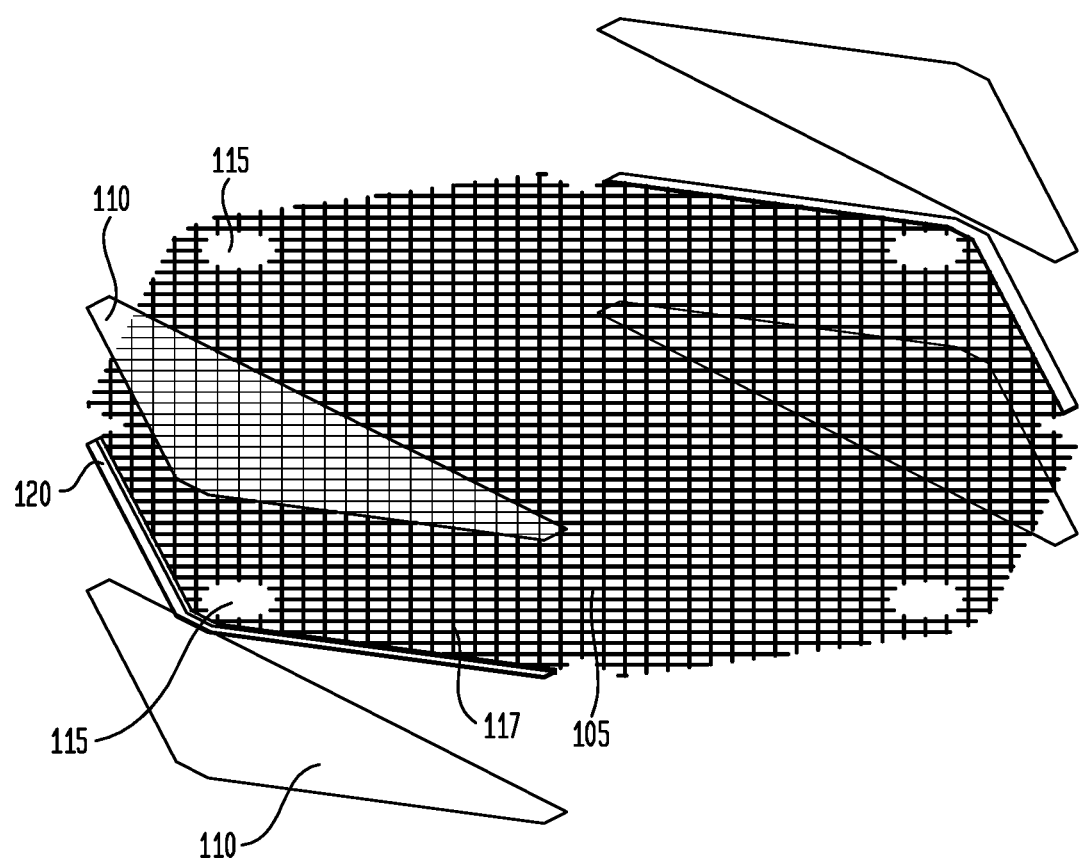
FIGS. 1A-1B present schematic illustrations of a spacer in accordance with one or more embodiments.

Devices for purifying fluids using electrical fields are commonly used to treat water and other liquids containing dissolved ionic species. Two types of such electrochemical separation devices that treat water in this way are electrodeionization and electrodialysis devices.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semi-permeable or selectively permeable ion exchange or bipolar membranes. Continuous electrodeionization (CEDI) devices are EDI devices known to those skilled in the art that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered on feed waters of low salinity because of elevated electrical resistance. Also, because the operation of ED on high salinity feed waters can result in elevated electrical current consumption, ED apparatus have heretofore been most effectively used on source waters of intermediate salinity. In ED based systems, because there is no electroactive media, splitting water is inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

Plate-and-frame and spiral wound designs have been used for various types of electrochemical deionization devices including but not limited to electrodialysis (ED) and electrodeionization (EDI) devices. Commercially available ED devices are typically of plate-and-frame design, while EDI devices are available in both plate and frame and spiral configurations.

The present invention relates to devices that may purify fluids electrically within a housing, as well as methods of manufacture and use thereof. Liquids or other fluids to be purified enter the purification device or apparatus and, under the influence of an electric field, are treated to produce an ion-depleted liquid. Species from the entering liquids are collected to produce an ion-concentrated liquid. The components of the electrical purification apparatus, which may also be referred to as an electrochemical separation system or an electrochemical separation device, may be assembled using various techniques to achieve optimal operation of the apparatus.

In some embodiments of the present disclosure, methods for assembling an electrochemical separation device are provided. The electrochemical separation devices may be cross-flow devices. In cross-flow electrodialysis devices the diluting and concentrating streams flow in directions at an angle (for example, perpendicular) to each other. Potential applications include desalination of seawater, brackish water and brines from oil and gas production.

In accordance with one or more embodiments, the efficiency of electrochemical separation systems may be improved. Current loss is one potential source of inefficiency. In some embodiments, such as those involving a cross-flow design, the potential for current leakage may be addressed. Current efficiency may be defined as the percentage of current that is effective in moving ions out of the dilute stream into the concentrate stream. Various sources of current inefficiency may exist in an electrochemical separation system or electrical purification apparatus. One potential source of inefficiency may involve current that bypasses the cell pairs (pairs of adjacent concentration and diluting compartments) by flowing through the dilute and concentrate inlet and outlet manifolds. Inlet and outlet manifolds may be in direct fluid communication with flow compartments and may reduce pressure drop in each flow path. Part of the electrical current from one electrode to the other may bypass the stack of cell pairs by flowing through the manifolds. The bypass current reduces current efficiency and increases energy consumption. Another potential source of inefficiency may involve ions that enter the dilute stream from the concentrate due to imperfect permselectivity of ion exchange membranes. In some embodiments, techniques associated with the sealing and potting of membranes and screens within a device may facilitate reduction of current leakage.

In one or more embodiments, a bypass path in a stack may be manipulated to promote current flow along a direct path through a cell stack so as to improve current efficiency. In some embodiments, an electrochemical separation device or electrical purification apparatus may be constructed and arranged such that current flow is directed through active membrane surfaces rather than through undesired bypass paths. In some embodiments, current efficiency of at least about 60% may be achieved. In other embodiments, a current efficiency of at least about 70% may be achieved. In still other embodiments, a current efficiency of at least about 80% may be achieved. In at least some embodiments, a current efficiency of at least about 85% may be achieved. In at least some embodiments, a current efficiency of at least about 90% may be achieved.

Spacers, such as screens, may be positioned within compartments to provide structure and define the compartments and, in certain examples, may assist in directing fluid flow through the compartment. The spacers may be made of polymeric materials or other materials that allow for a desired structure and fluid flow within the compartments. In certain embodiments, the spacers may be constructed and arranged to redirect or redistribute fluid flow within the compartments. In some examples, the spacer may comprise a mesh-like or screen material to provide structure and allow for the desired fluid flow through the compartment.

The spacer may be constructed and arranged to redirect at least one of fluid flow and electrical current to improve current efficiency. The spacer may also be constructed and arranged to create multiple fluid flow stages in an electrical purification apparatus. In some embodiments, the plurality of ion exchange membranes may alternate between cation exchange membranes and anion exchange membranes to provide a series of ion diluting compartments and ion concentrating compartments.

The geometry of the membranes may be of any suitable geometry such that the membranes may be secured within a cell stack. In certain embodiments, a particular number of corners or vertices on the cell stack may be desired so as to suitably secure the cell stack within a frame. In certain embodiments, particular membranes may have different geometries than other membranes in the cell stack.

In certain embodiments of the disclosure, the flow within a compartment may be adjusted, redistributed, or redirected to provide greater contact of the fluid with the membrane surfaces within the compartment. The compartment may be constructed and arranged to redistribute fluid flow within the compartment. The compartment may have obstructions, projections, protrusions, flanges, or baffles that may provide a structure to redistribute the flow through the compartment, which will be discussed further below. In certain embodiments, the obstructions, projections, protrusions flanges, or baffles may be referred to as a flow redistributor.

In certain examples, the spacer assemblies, for example, a screen between a pair of membranes, may be secured to one another to provide a first compartment having a fluid flow path in a first direction and a second compartment having a fluid flow path in a second direction.

In some embodiments of the present disclosure, methods are provided for securing spacers and ion exchange membranes to produce a membrane cell stack for an electrical purification apparatus. The method may provide for the securing of multiple spacers, anion exchange membranes, and cation exchange membranes for use in electrical purification apparatus such as a cross-flow electrodialysis (ED) device. The method may allow for securing spacers and membranes to a frame through a potting process. The method may eliminate the need for welding peripheries such as one or more edges of the membrane(s).

In some embodiments, the method may involve masking end portions of spacers to provide a masked end portion that remains free of potting material during sequential potting steps. For example, the method may involve welding films to alternated end portions of spacer as described herein prior to a potting process. After potting is completed ports may be formed in the cell stack, by for example, drilling through potted portions. The ports will be in fluid communication with the compartments whose end portions were masked, and fluidly isolated at the end portions that were potted, providing for alternating cross-flow compartments, for example alternating concentrating and depleting compartments.

In accordance with one or more embodiments, an electrochemical separation system or electrical purification apparatus may be modular. Each modular unit may generally function as a sub-block of an overall electrochemical separation system. A modular unit may include any desired number of cell pairs. In some embodiments, the number of cell pairs per modular unit may depend on the total number of cell pairs and passes in the separation device. It may also depend on the number of cell pairs that can be secured in a frame with an acceptable failure rate when tested for cross-leaks and other performance criteria. The number can be based on statistical analysis of the manufacturing process and can be increased as process controls improve. In some non-limiting embodiments, for applications requiring low product flow rates, for example, a modular unit may include about 20-50 cell pairs. In other applications with higher product flow rate a modular unit may include 50-200 cell pairs. Further increase to, say, 500 cell pairs may be optimum for applications with very high flow rates, such as desalination of seawater to potable water for municipalities. Modular units may be individually assembled and quality control tested, such as for leakage, separation performance and pressure drop prior to being incorporated into an apparatus or system. In some embodiments, a cell stack may be mounted in a frame as a modular unit that can be tested independently. A plurality of modular units can then be assembled together in a housing to provide an overall intended number of cell pairs in an electrochemical separation device. In some embodiments, an assembly method may generally involve placing a first modular unit on a second modular unit, placing a third modular unit on the first and second modular units, and repeating to obtain a plurality of modular units of a desired number. In some embodiments, the assembly or individual modular units may be inserted into a pressure vessel, or housing, for operation. Multi-pass flow configurations may be possible with the placement of blocking membranes and/or spacers between modular units. A modular approach may improve manufacturability in terms of time and cost savings. Modularity may also facilitate system maintenance by allowing for the diagnosis, isolation, removal and replacement of individual modular units. Individual modular units may include manifolding and flow distribution systems to facilitate an electrochemical separation process. Individual modular units may be in fluid communication with one another, as well as with central manifolding and other systems associated with an overall electrochemical separation process.

A cell stack may be secured within a frame, through, for example, a sequential potting procedure, to provide a modular unit. This modular unit may then be secured within a housing. The modular unit may further comprise a bracket assembly or corner support that may secure the modular unit to the housing. A second modular unit may be secured within the housing. One or more additional modular units may also be secured within the housing. In certain embodiments of the disclosure, a blocking spacer may be positioned between the first modular unit and the second modular unit. A tie bar or other device may facilitate installation of one or more modular units within a housing.

The electrical purification apparatus may also comprise a first electrode adjacent a first ion exchange membrane at a first end of the cell stack, and a second electrode adjacent a second ion exchange membrane at a second end of the cell stack. Each of the first ion exchange membrane and the second ion exchange membrane may be an anion exchange membrane or a cation exchange membrane. For example, the first ion exchange membrane may be an anion exchange membrane, and the second ion exchange membrane may be a cation exchange membrane. Two or more modular units may be present between a single pair of electrodes.

In some embodiments of the present disclosure, a method is provided for assembling a cross-flow device that eliminates the requirement for welding of membranes and, furthermore, eliminates gaps between the stack and the frame.

The method may use a potting material, such as epoxy, to seal the edges of membranes and screens to form flow compartments and to prevent cross-leaks between the dilute and concentrate compartments.

According to one or more embodiments, the method may comprise masking a first set of end portions of a first plurality of spacers to protect those end portions from receiving potting epoxy during a later potting step. The method may further comprise masking a second set of end portions of a second plurality of spacers. The masking may comprise forming a sleeve around the respective end portion. The spacers comprising masked end portions are stacked in a frame with alternating anion and cation exchange membranes positioned therebetween. During stacking, the first set of spacers are alternated with the second set of spacers so that the masked end portions of alternating spacers are oriented at an angle to each other. The alternating spacers and membranes provide what in the final form will be alternating ion diluting and ion concentrating compartments of the cross flow electrochemical separation device.

According to one or more embodiments the method further comprises introducing a potting material to the periphery of the cell stack, thereby potting the periphery of the membranes and the unmasked end portions of the spacer, producing potted end portions of the spacer. The potting material however, does not penetrate the masked end portions of the spacers.

Channels may then be defined through the end portions of the spacers to provide flow passages, passing alternatingly through potted end portions and masked end portions. The channels may provide inlet and outlet ports for a dilute stream and a concentrate stream processed by the electrochemical treatment system. Where the channel penetrates the masked end portion of a spacer, it will be in fluid communication with the flow compartment associated with that spacer. Where the channel penetrates a potted end portion of a spacer it will be fluidly isolated from the flow compartment associated with that spacer.

The channeled cell stack and frame may then be inserted into a housing to form the electrochemical separation apparatus. In such a manner, according to one or more methods a cross-flow electrochemical treatment apparatus may be formed.

Figure 1B:
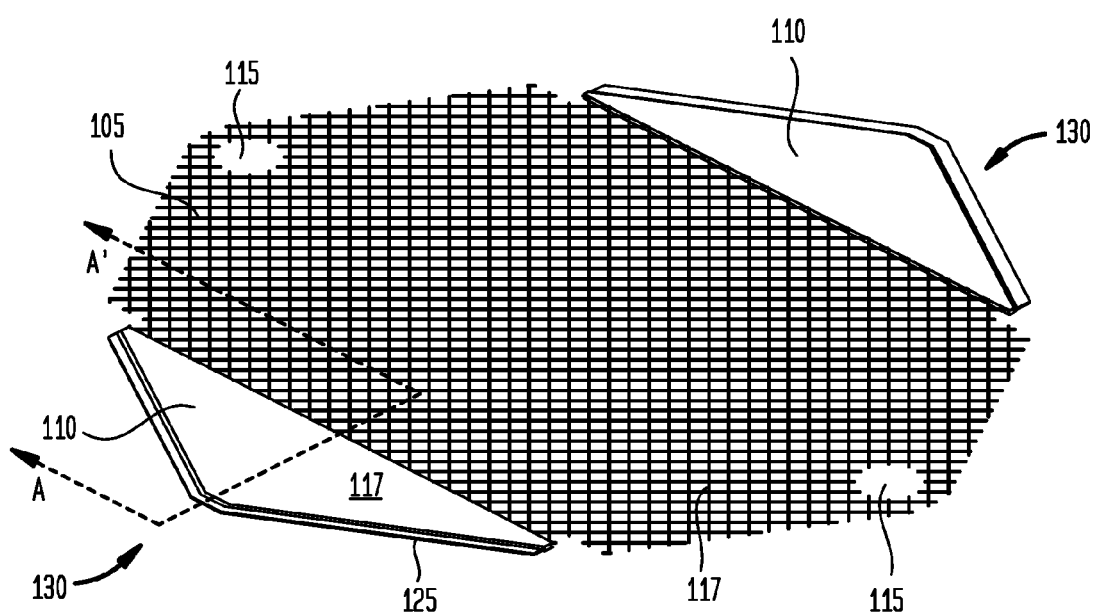
Figure 2:
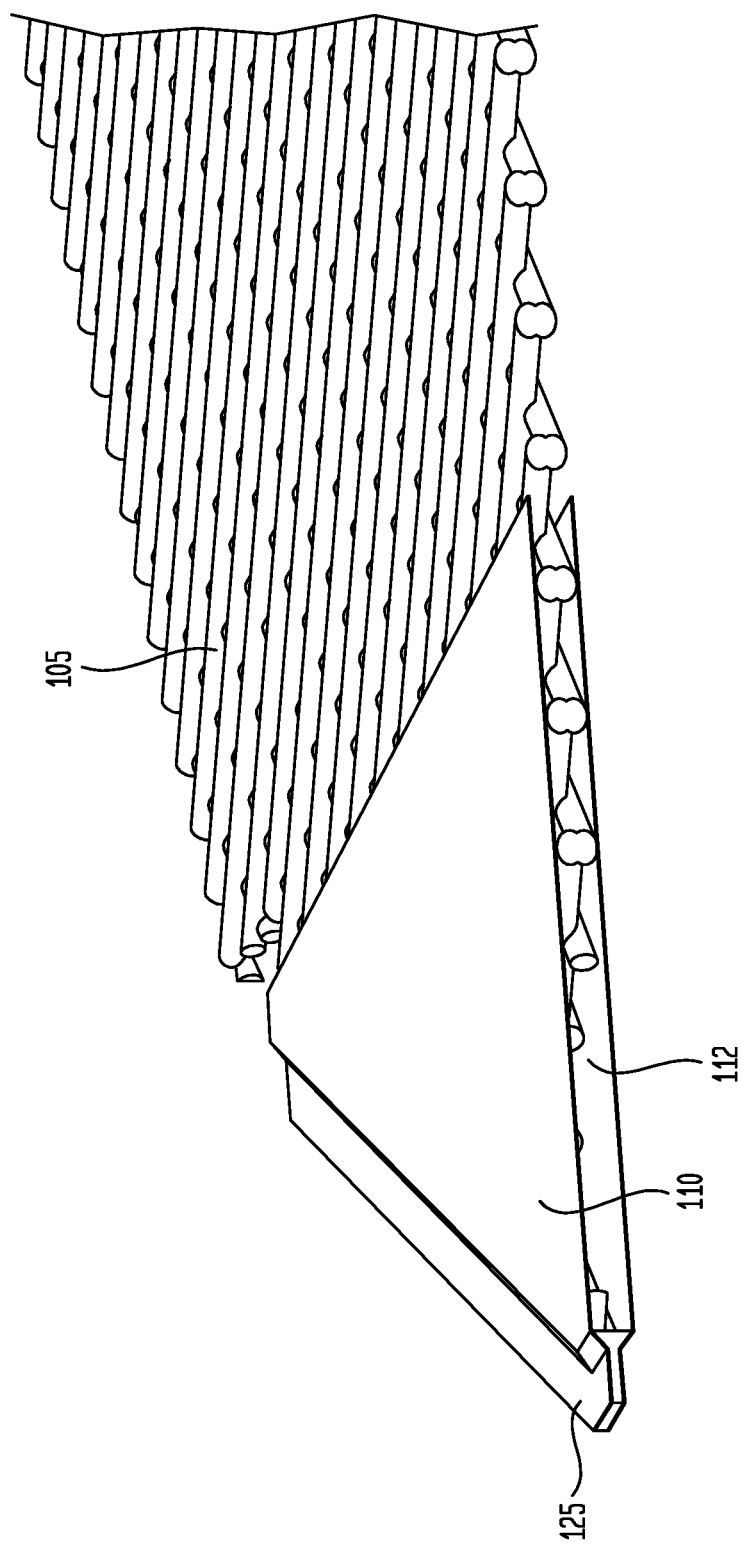
FIG. 2 is a schematic illustration of Section A-A' in FIG. 1B in accordance with one or more embodiments.

According to one or more embodiments, with reference to FIGS. 1A and 1B, the assembly process begins by welding die-cut pieces of plastic film 110 to a spacer (also referred to as a screen) 105 along the edges 120. The edges 120 of the screen 105 may be pre-flattened with heat and pressure. The films 110 joined at a welded edge 125 form a sleeve 130 around an end portion 117 of the spacer 105. According to certain embodiments, holes 115 may be pre-punched in the screens at locations corresponding to inlet and outlet ports to the dilute and concentrate compartments, the ports being added in a subsequent step. FIG. 2 shows a section view through a spacer 105 which shows that the films 110 form an open pocket 112 with the screen 105 in between. The sleeve 130 may serve as a mask to prevent potting material from entering the spacer material 105, within the pocket 112, and thereby forms a masked end portion 117. Other masking techniques are within the scope of the present disclosure.

Figure 3:
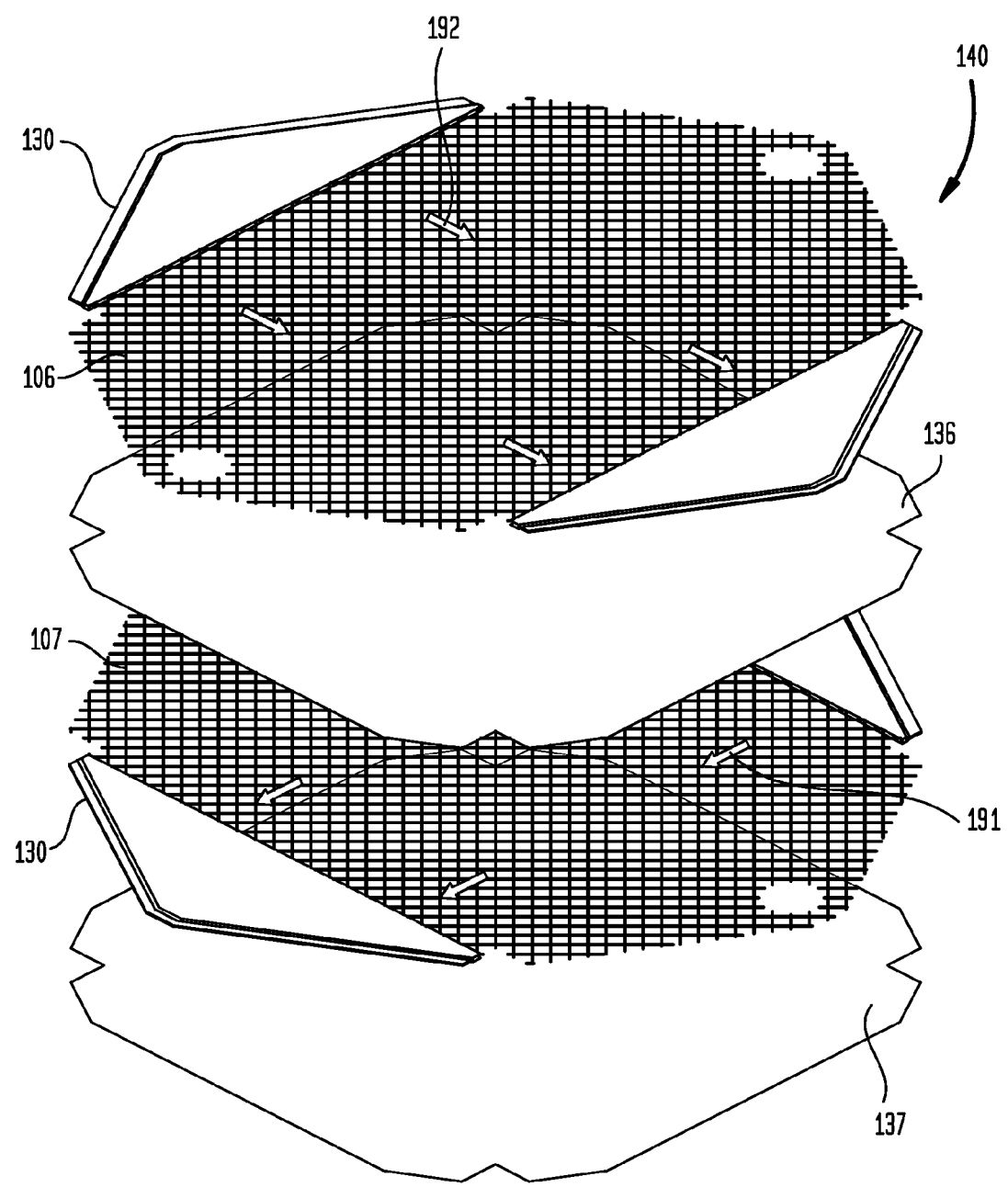
FIG. 3 is a schematic illustration of a cell pair in accordance with one or more embodiments.

As shown in FIG. 3, a cation exchange membrane (CEM) 137, a dilute spacer 107, an anion exchange membrane (AEM) 136, and a concentrate spacer 106 oriented at an angle (for example, 90 degrees) to the first spacer 107 comprise the components of a cell pair 140. In the finished assembly, the cell pair 140 allows for fluid flow in a first direction 191 and fluid flow in a second direction 192. The thickness of each flow compartment (intermembrane spacing) is determined by the thickness of the screen 105 and the films 110. The thickness may range from 0.25 mm-0.75 mm (0.01"-0.03") for the screen and 0.05 mm-0.1 mm (0.002"-0.004") for each film. The intermembrane spacing may therefore range from 0.35 mm-0.95 mm (0.014"-0.038"). Thicknesses outside the typical range given above are of course possible.

Figure 4:
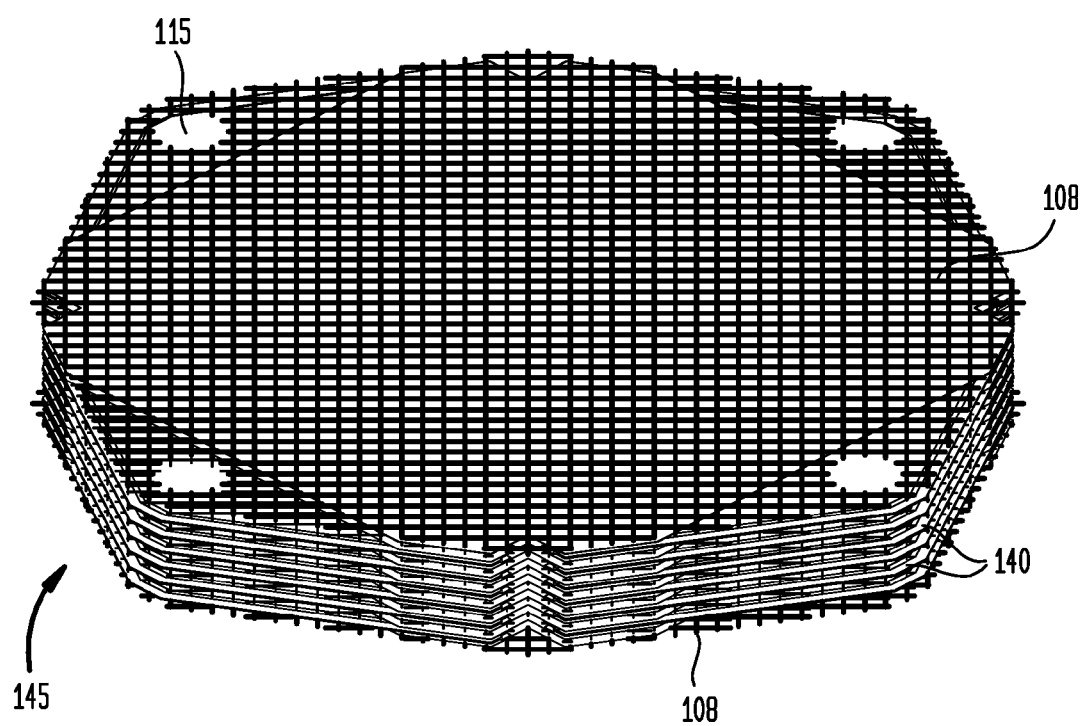
FIG. 4 is a schematic illustration of a cell stack in accordance with one or more embodiments.

Multiple cell pairs 140 can be compiled to form a cell stack 145, as shown in FIG. 4. Electrode screens 108 can be added to both ends of the stack 145. While the number of shown cell pairs is limited for the sake of clarity, this invention is not limited to the number of cell pairs that can be assembled. The total number of modular units and cell pairs per apparatus will depend on, for example, the flow rate and ionic removal required per apparatus as well as optimization of the system design based on energy consumption, capital cost and life cycle cost. For high flow seawater applications, for example the total number of cell pairs per apparatus may range from 2000-4000, housed in multiple modular units and fluidly connected in multiple passes. For residential softening applications, on the other hand, only one modular unit with 20-50 cell pairs fluidly in parallel may suffice.

Figure 5:
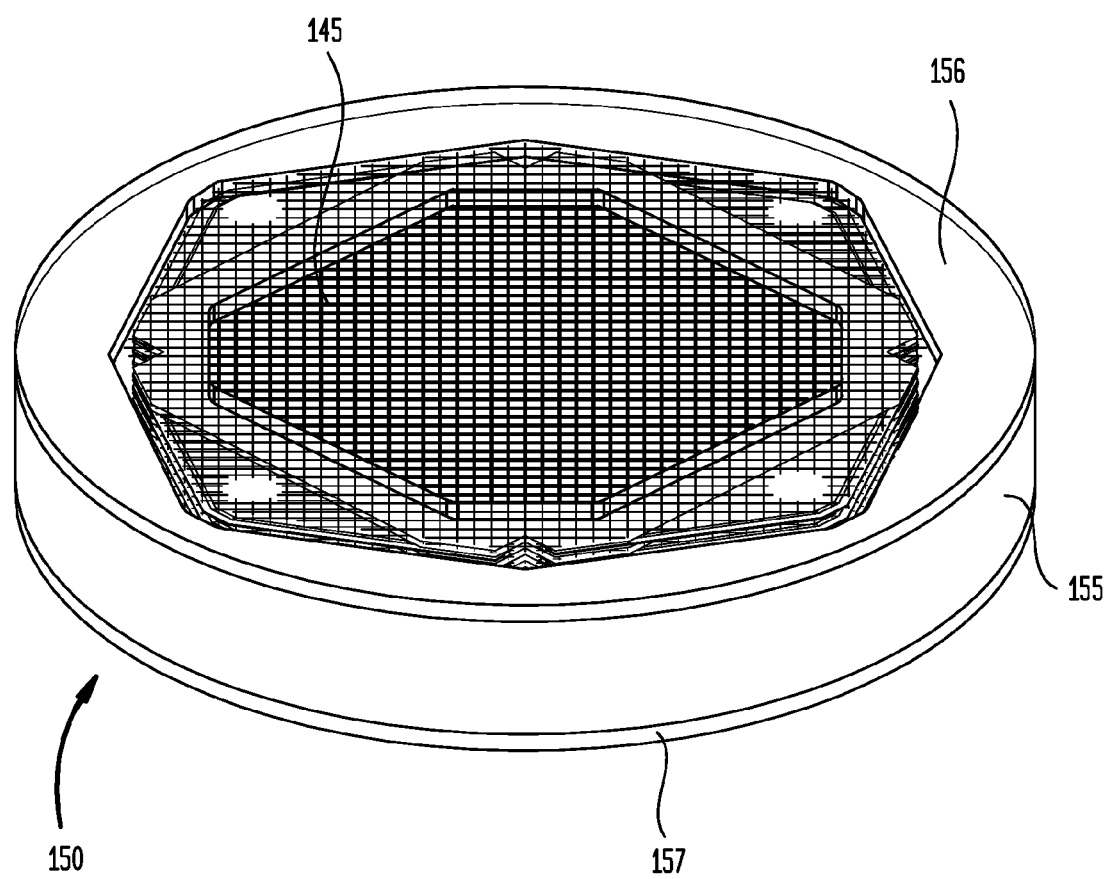
FIG. 5 is a schematic illustration of a treatment module in accordance with one or more embodiments.

According to at least one embodiment, the completed stack 145 is inserted into a frame 155 and enclosed by a top cover 156 and a bottom cover 157, as shown in FIG. 5, to form a modular unit 150. Alternatively, a cover 157 may be attached to the bottom of the frame, and the components may be stacked one by one inside the frame 155, with the top cover 156 then attached. Pins (not shown) protruding upward from the bottom cover 157 may be used to align the stack components. The covers 156 and 157 may be attached and sealed to the frame 155 with a combination of mechanical fasteners, adhesives and/or elastomeric seals.

Figure 6A:
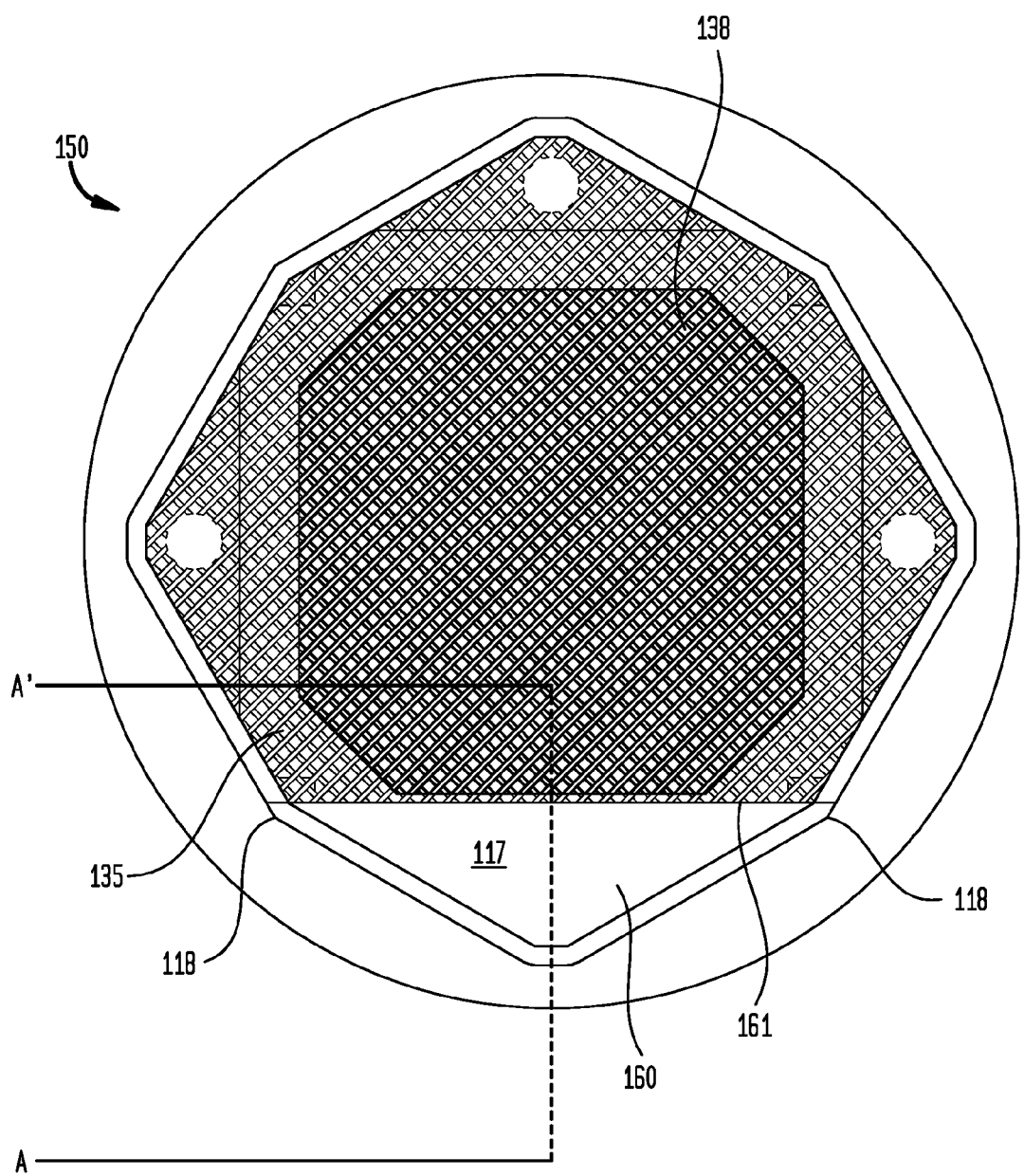
FIG. 6A is a schematic illustration of a step in a method of assembling a cross-flow electrochemical treatment device in accordance with one or more embodiments.
Figure 6B:
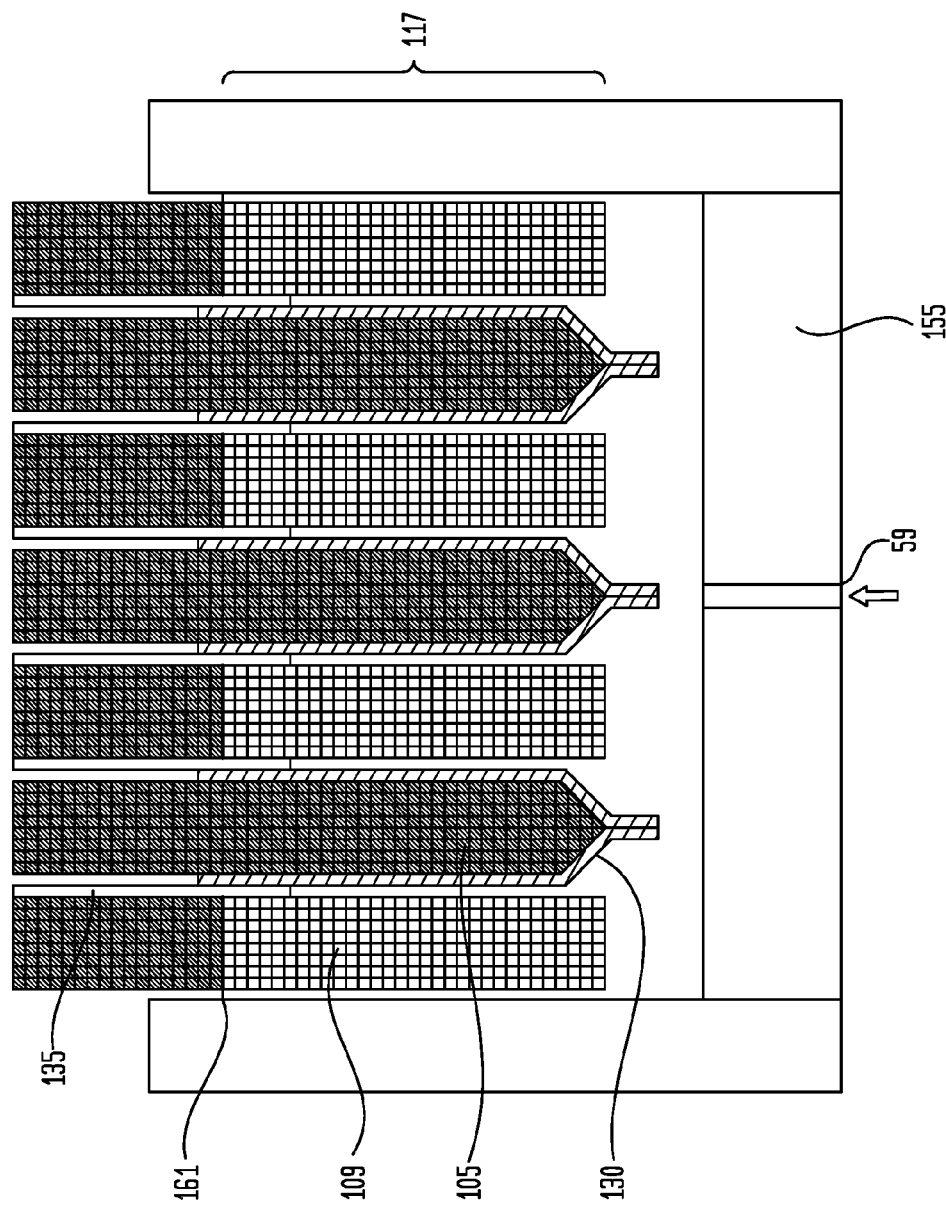
FIG. 6B is a schematic illustration of Section A-A' in FIG. 6A in accordance with one or more embodiments

The modular assembly 150 of frame 155 and stack 145 may be tilted so that the center longitudinal axis is horizontal. A potting adhesive 160, such as a two-part epoxy, may be injected into one end portion 117, as shown in FIGS. 6A and 6B, and given time to harden until it no longer flows.

As epoxy is injected through inlet 59 into an end portion 117 it will penetrate into screens 109 that are not masked by the sleeves 130. The upward movement of the epoxy 160 is partially due to wicking into the porous screens 109.

The rate and amount of epoxy injection along with the rate of wicking are observed and/or controlled so that the epoxy level 161 does not rise above the edges of the masking sleeves 130 that prevent epoxy 160 from spilling into the masked screens 105. The selected epoxy 160 may have a sufficiently low viscosity to easily flow into the alternating potted screens 109 and any gaps between the membranes 135 and adjacent components. The set time of the epoxy 160 must be sufficiently long so that all the epoxy 160 can be slowly injected before the epoxy 160 starts setting and hardening. The final level of potting material 161 may be at a height sufficient to embed the edges of membranes 135 without spilling over the top of the sleeves 130 into the masked screens 105 at the end portion 117.

In subsequent steps, other end portions 117 will be potted, as well as corners 118, leaving an active membrane area 138 in a central portion.

Figure 7:
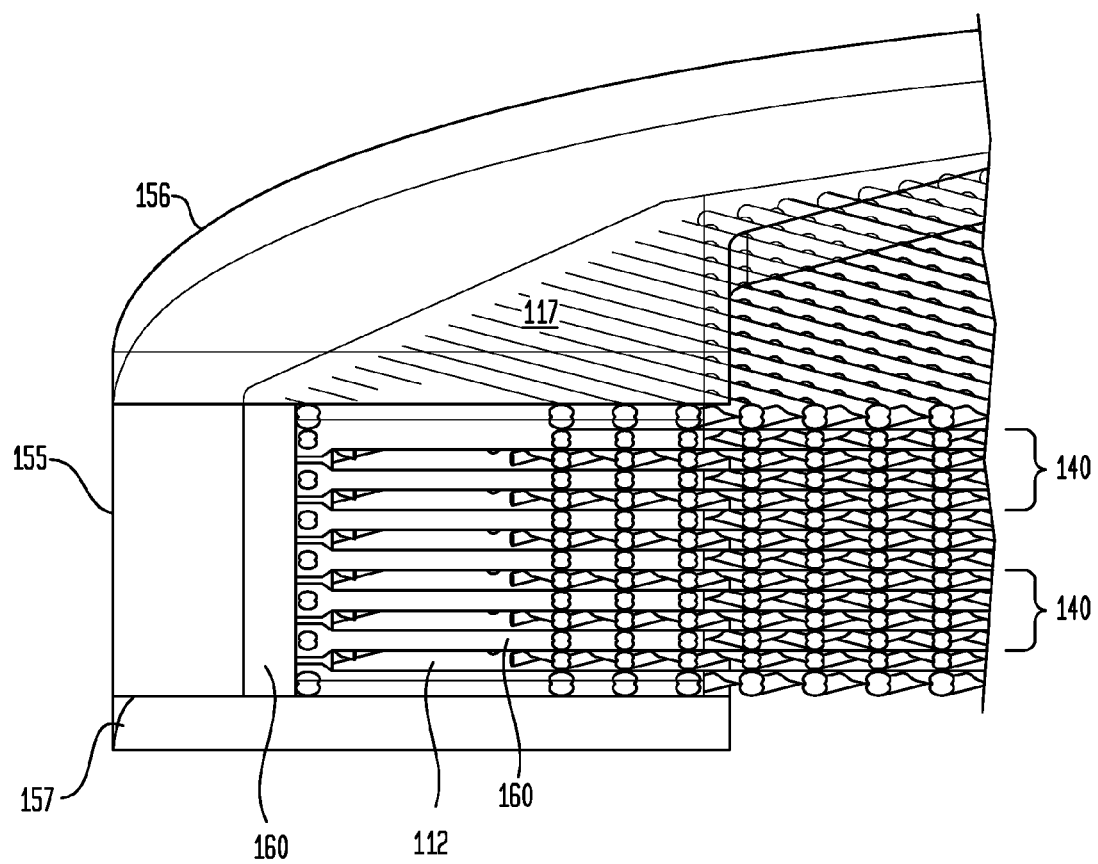
FIG. 7 is a schematic illustration of a cell stack in accordance with one or more embodiments.

FIG. 7 is a section view that shows that the plastic film 110 welded to alternating masked screens 105 in the shown end portion 117 prevents the epoxy 160 from penetrating into the formed pockets 112, while allowing epoxy 160 to penetrate into the alternate screens 105.

Figure 8:
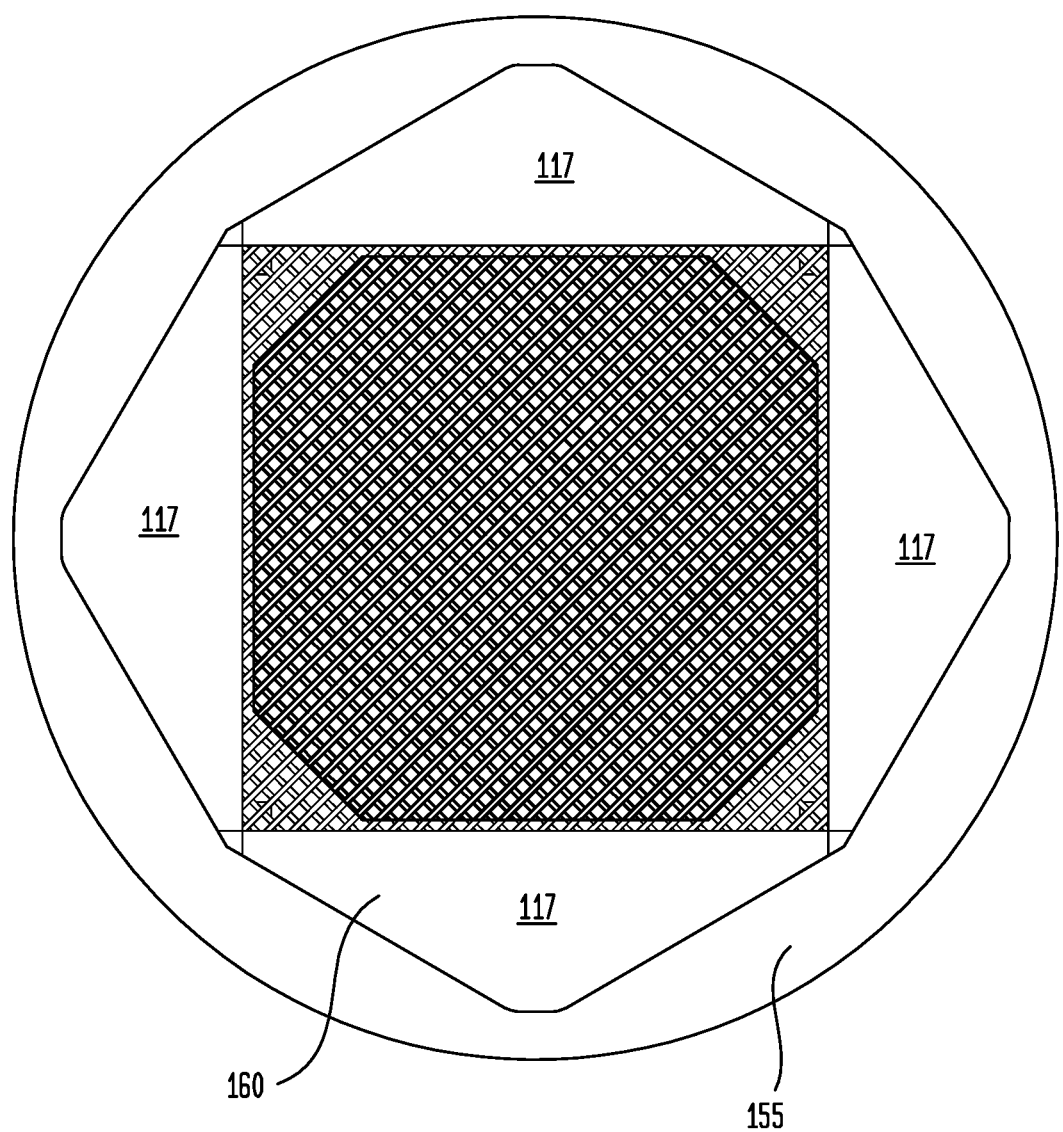
FIG. 8 is a schematic illustration of a step in a method of assembling a cross-flow electrochemical treatment device in accordance with one or more embodiments.

The assembly 150 is progressively rotated a preset amount (for example, 90 degrees at a time) and adhesive is injected until all the end portion quadrants 117 are potted as shown in FIG. 8.

Figure 9:
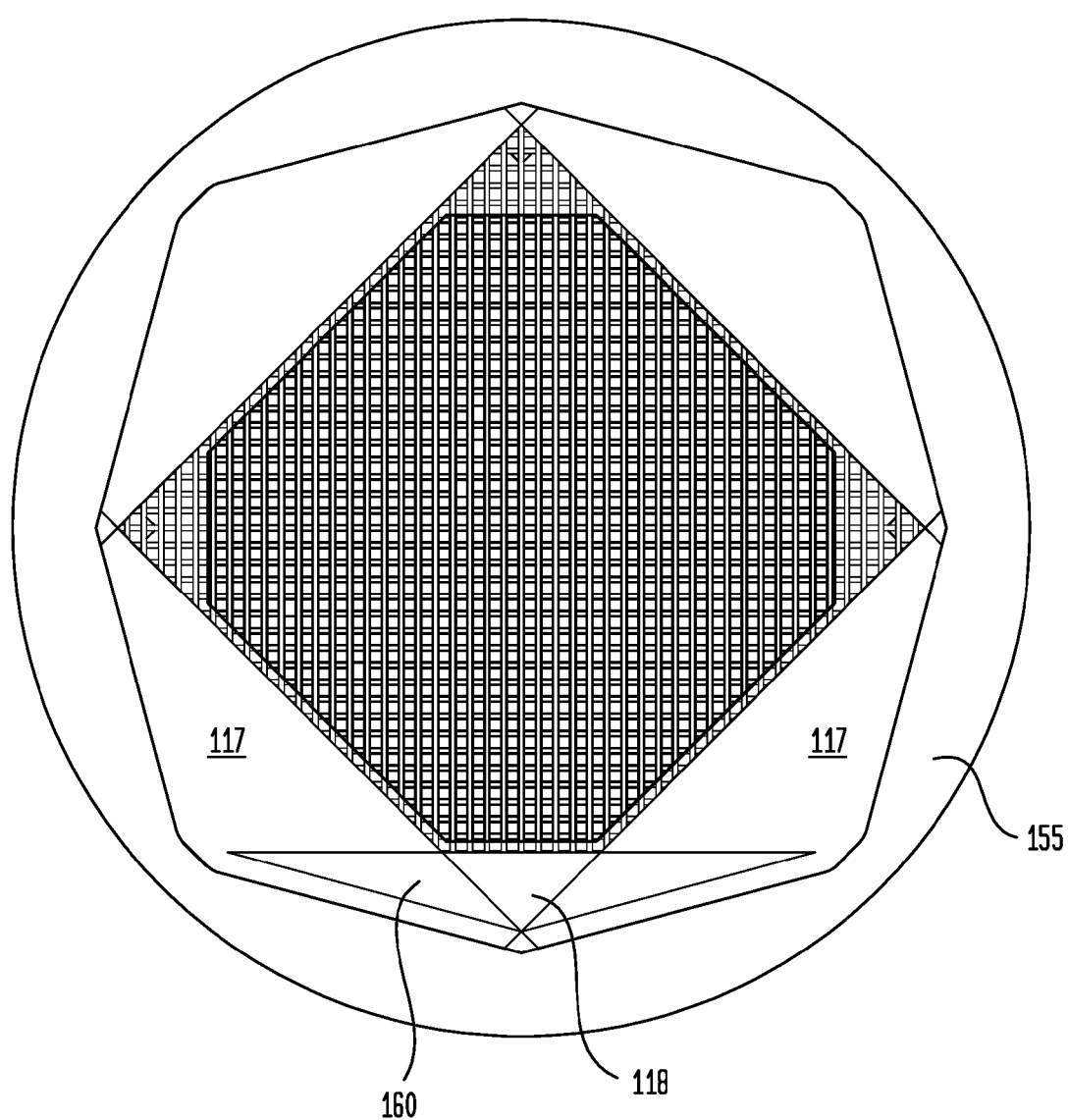
FIG. 9 is a schematic illustration of a step in a method of assembling a cross-flow electrochemical treatment device in accordance with one or more embodiments.
Figure 10:
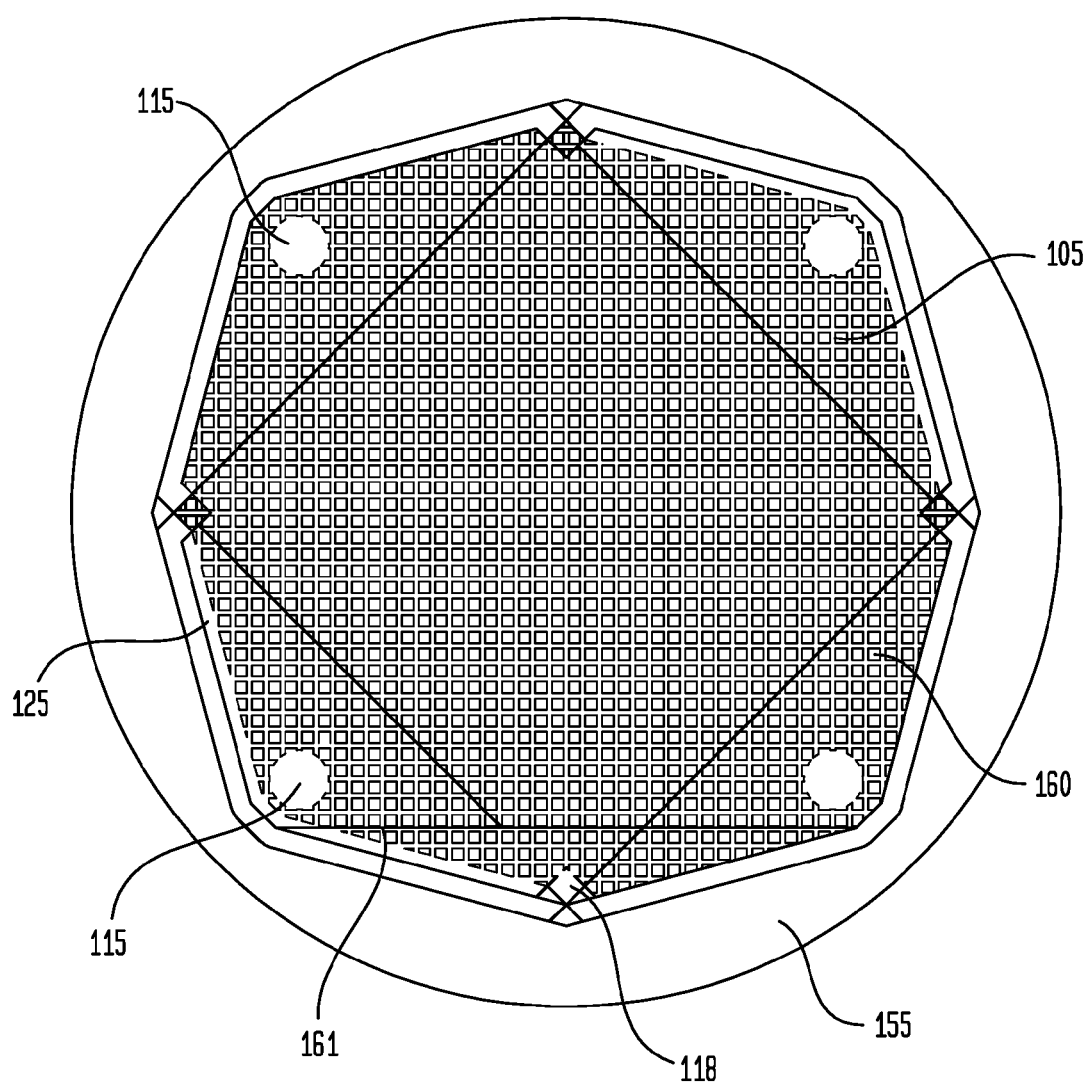
FIG. 10 is a schematic illustration of a step in a method of assembling a cross-flow electrochemical treatment device in accordance with one or more embodiments.

The assembly is then rotated (for example, 45 degrees) and adhesive is injected to pot the first corner 118, as shown in FIG. 9. FIG. 10 shows a horizontal section through a dilute screen; in which the level 161 of the adhesive 160 is high enough to bypass the welds 125 between the plastic film 110 and screen 105 so that the adhesive can flow into the screen 105.

By successive rotations and adhesive injection, all four corners 118 are potted. The potting adhesive 160 may be given further time to fully cure at room temperature or the assembly 150 may be inserted into a heated chamber to accelerate the curing.

Figure 11:
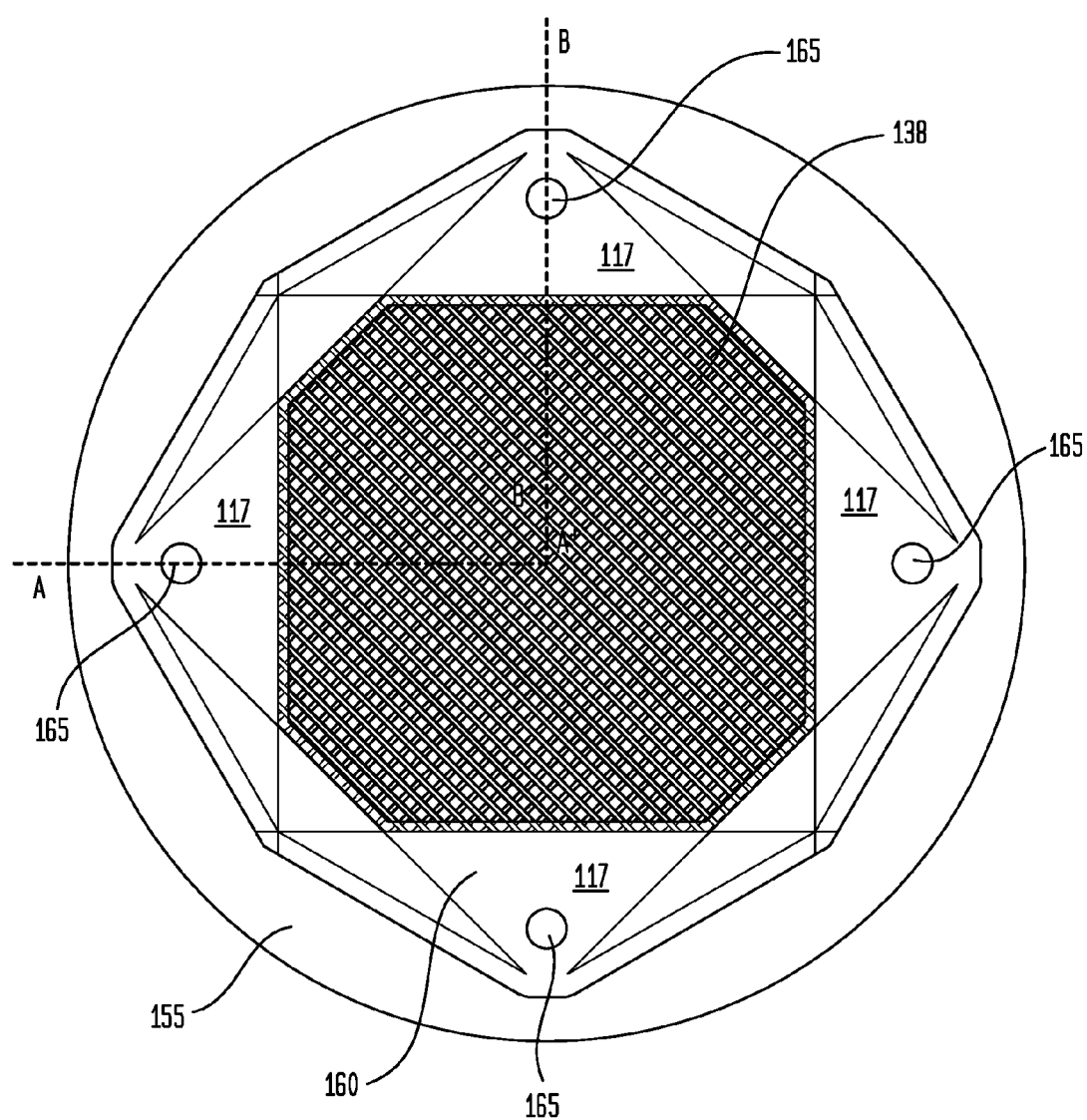
FIG. 11 is a schematic illustration of a treatment module in accordance with one or more embodiments.
Figure 12B:
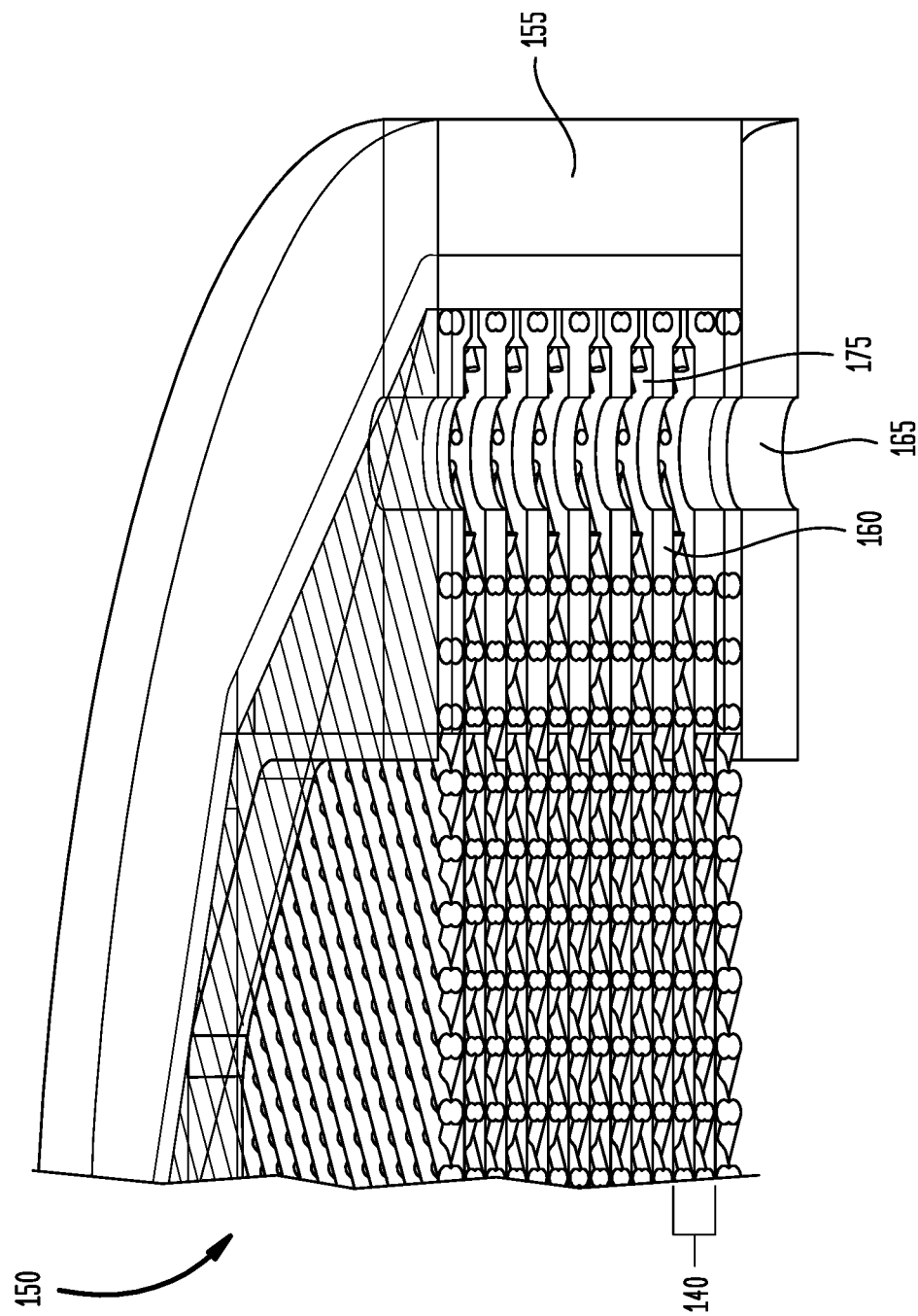
FIG. 12B is a schematic illustration of Section B-B' in FIG. 11 in accordance with one or more embodiments.

A number of holes (for example, four holes) or openings may be drilled or cut through the potting adhesive and the plastic films to provide inlet and outlet ports 165 to the dilute and concentrate compartments as shown in FIG. 11. FIGS. 12A and 12B are section views of cross section lines A-A' and B-B' of FIG. 11, respectively, at right angles which show how one set of diametrically opposite ports 165 communicates with the ion diluting compartments 170 defined by dilute screens and the other set of ports 165 communicates with the ion concentrating compartments 175 defined by the concentrate screens. In certain embodiments, the prepunched holes 115 in the screens 105 may be larger in diameter than the port 165 to prevent damage to the screens 105 during hole formation.

Figure 13A:
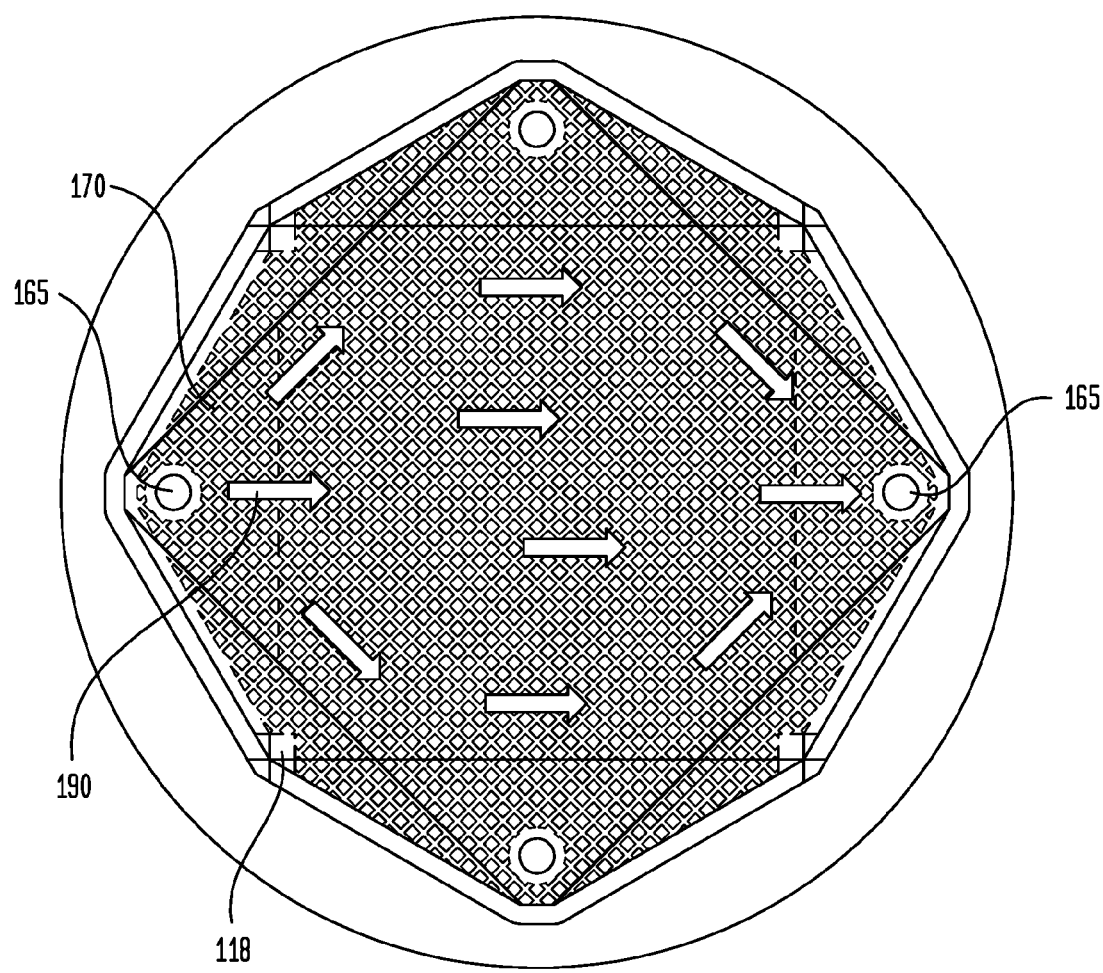
FIGS. 13A and 13B show schematic illustrations of flow patterns through flow compartments of an electrochemical separation apparatus in accordance with one or more embodiments.
Figure 13B:
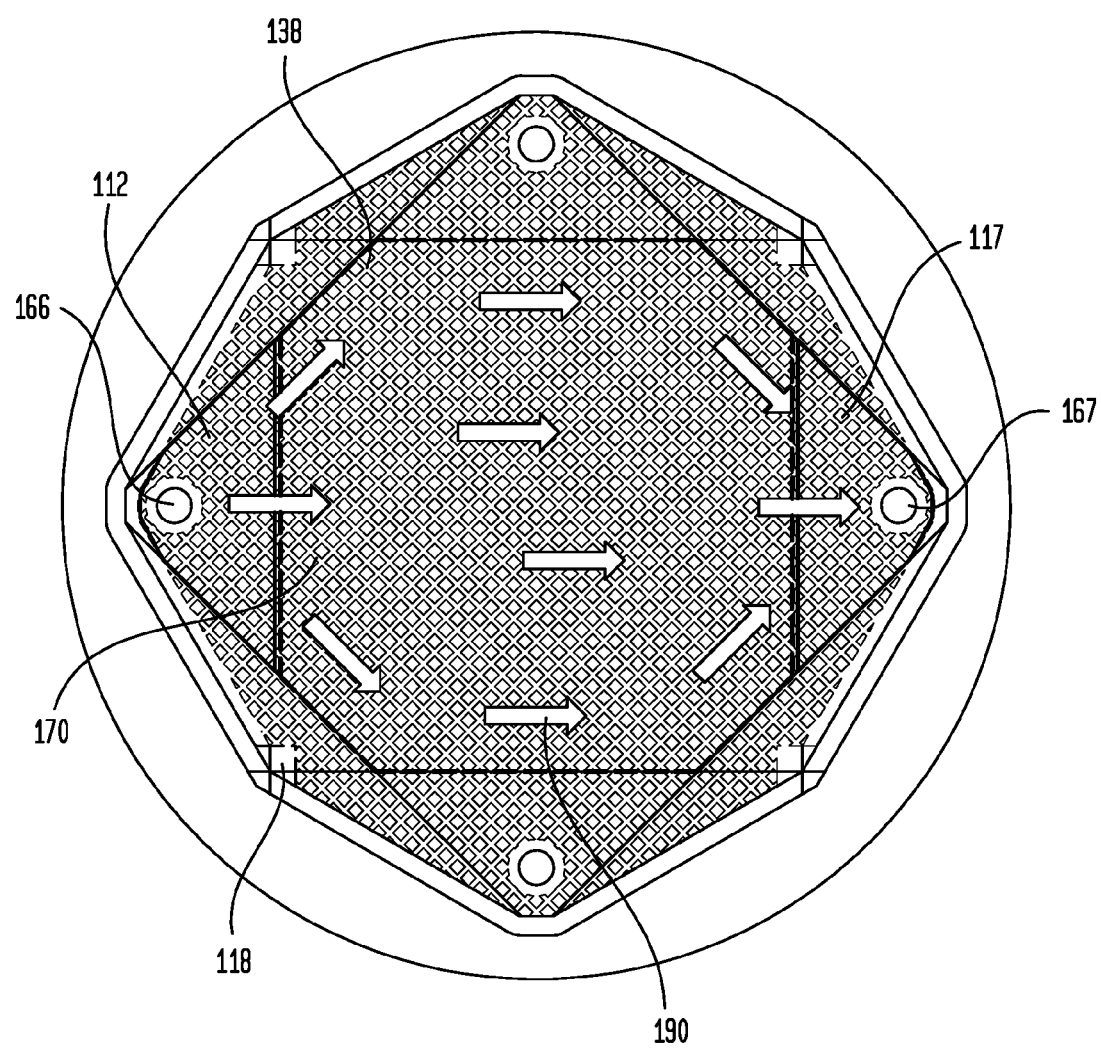

Each of FIGS. 13A and 13B is a horizontal section through an ion diluting compartment 170 showing the flow paths 190 from one port 165 to the other. The potted corners 118 result in a tapered side wall which allow the flow 190 to expand and contract without sharp transitions, eddies or stagnant zones. The strands in the screens 105, particularly when oriented at an angle to the mean flow direction, may promote mixing and dispersion of the flow. Alternatively, structures such as guide ribs may be added to the screens to direct the flow.

Figure 14:
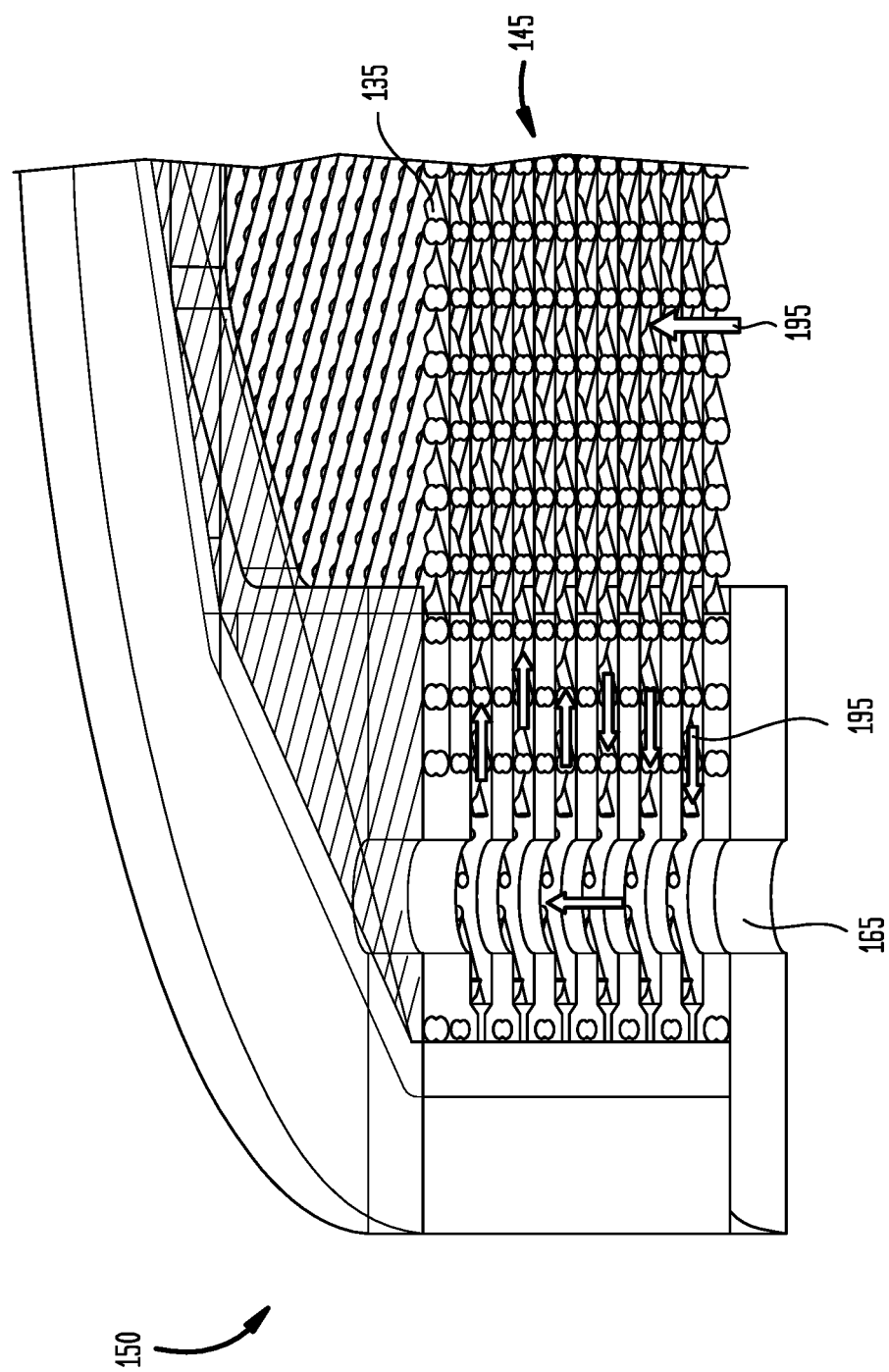
FIG. 14 is a schematic illustration of a potential current bypass paths in accordance with one or more embodiments.

Since the membranes 135 extend beyond the active areas 138 into the potting adhesive 160 of end portions 112, as shown in FIG. 14, there are no gaps between the stack 145 and the frame 155 through which current 195 can bypass the stack, unlike in alternative embodiments, although the potential for some current to bypass the stack 145 through a path, such as the port 165, remains. In some embodiments, there is substantially no current bypass through the stack.

Figure 15:
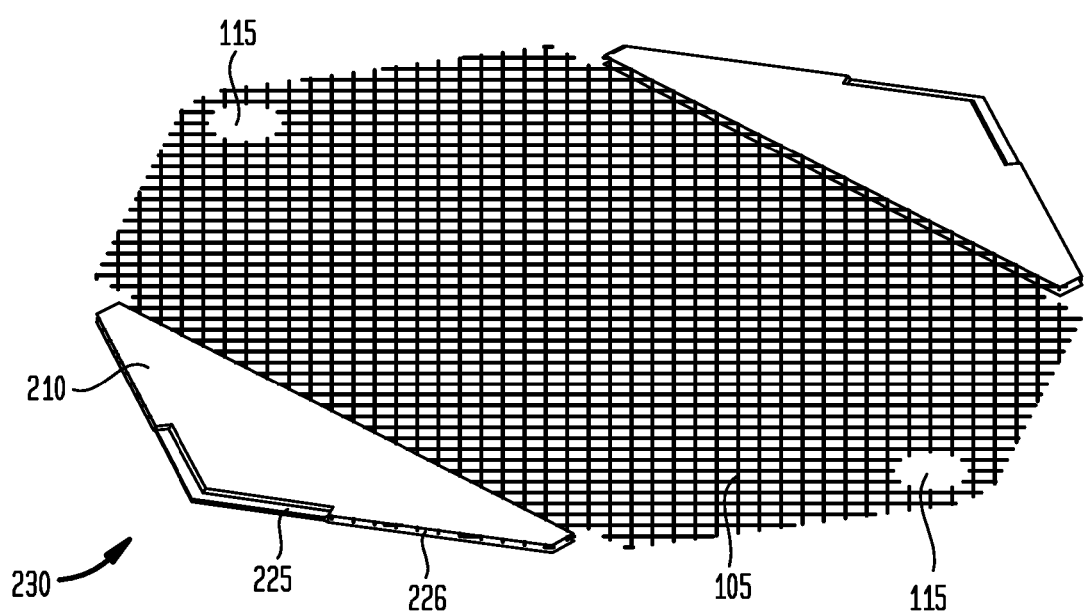
FIG. 15 is a schematic illustration of a spacer in accordance with one or more embodiments.

According to one or more alternative embodiments, the plastic films are welded to the end portions 117 of screens 105 only along short sections 225 to form sleeves 230, as shown in FIG. 15. The remaining edges of the plastic films 210 are not attached.

Figure 16:
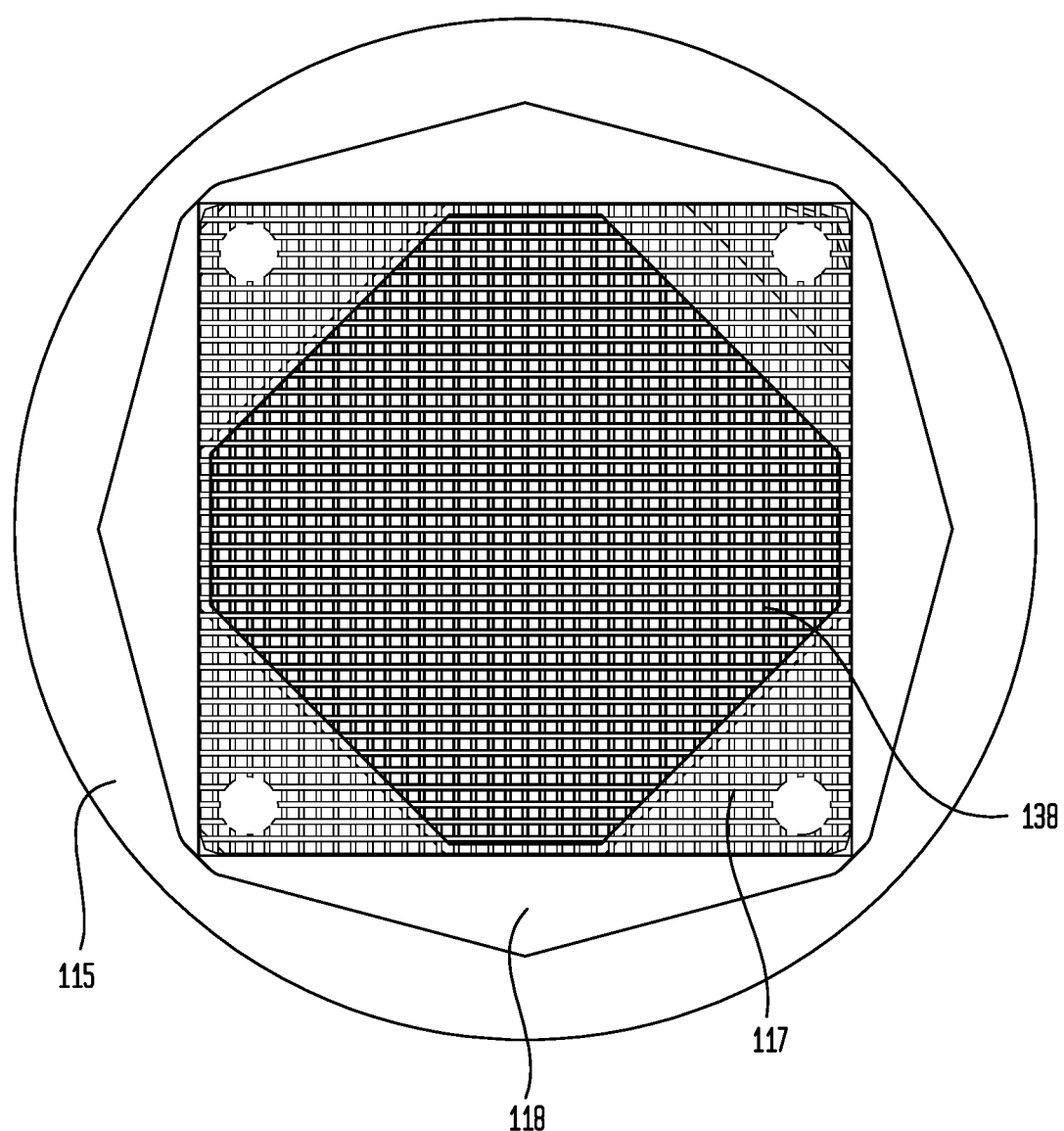
FIG. 16 is a schematic illustration of a step in a method of assembling a cross-flow electrochemical treatment device in accordance with one or more embodiments.
Figure 17:
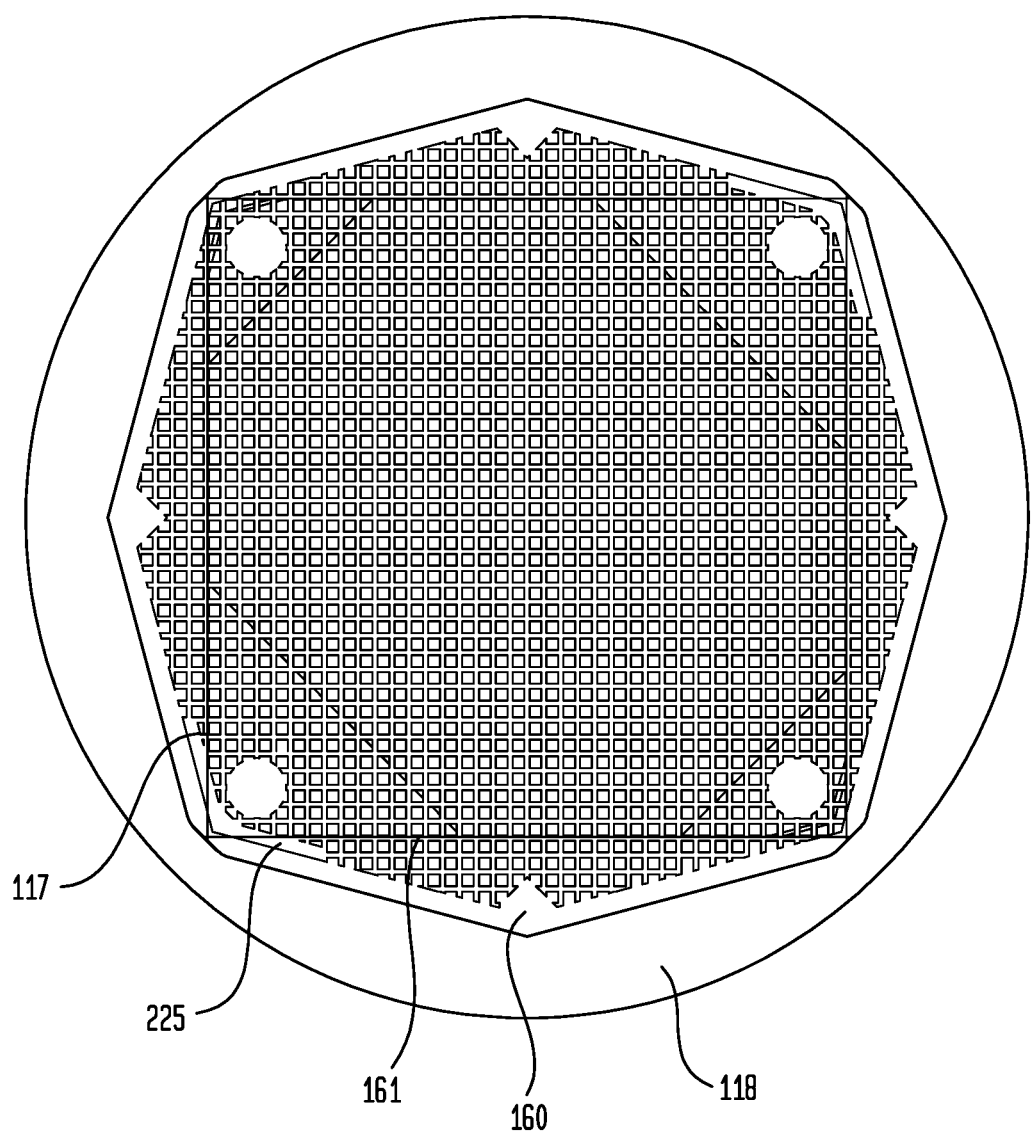
FIG. 17 is a schematic illustration of a step in a method of assembling a cross-flow electrochemical treatment device in accordance with one or more embodiments.

The cell pair 140 components are stacked in the frame in the same manner as in the previously described embodiment shown in FIGS. 1-14. The corners 118 are potted first, however, as shown in FIG. 16. Since the plastic films 210 are not welded to the screens 105 along the entire side edges 120, the adhesive penetrates both the dilute and concentrate screens 105. FIG. 17 is a horizontal section through a dilute screen 105 that shows that the corner adhesives 160 embed the sections of the plastic films 210 that are welded to the screen 105. Because the welded sections 225 in this embodiment are shorter than those in the previously described embodiments, adhesive 160 can flow more freely into the screen 105 up to levels 161 that do not block the port 165.

Figure 18:
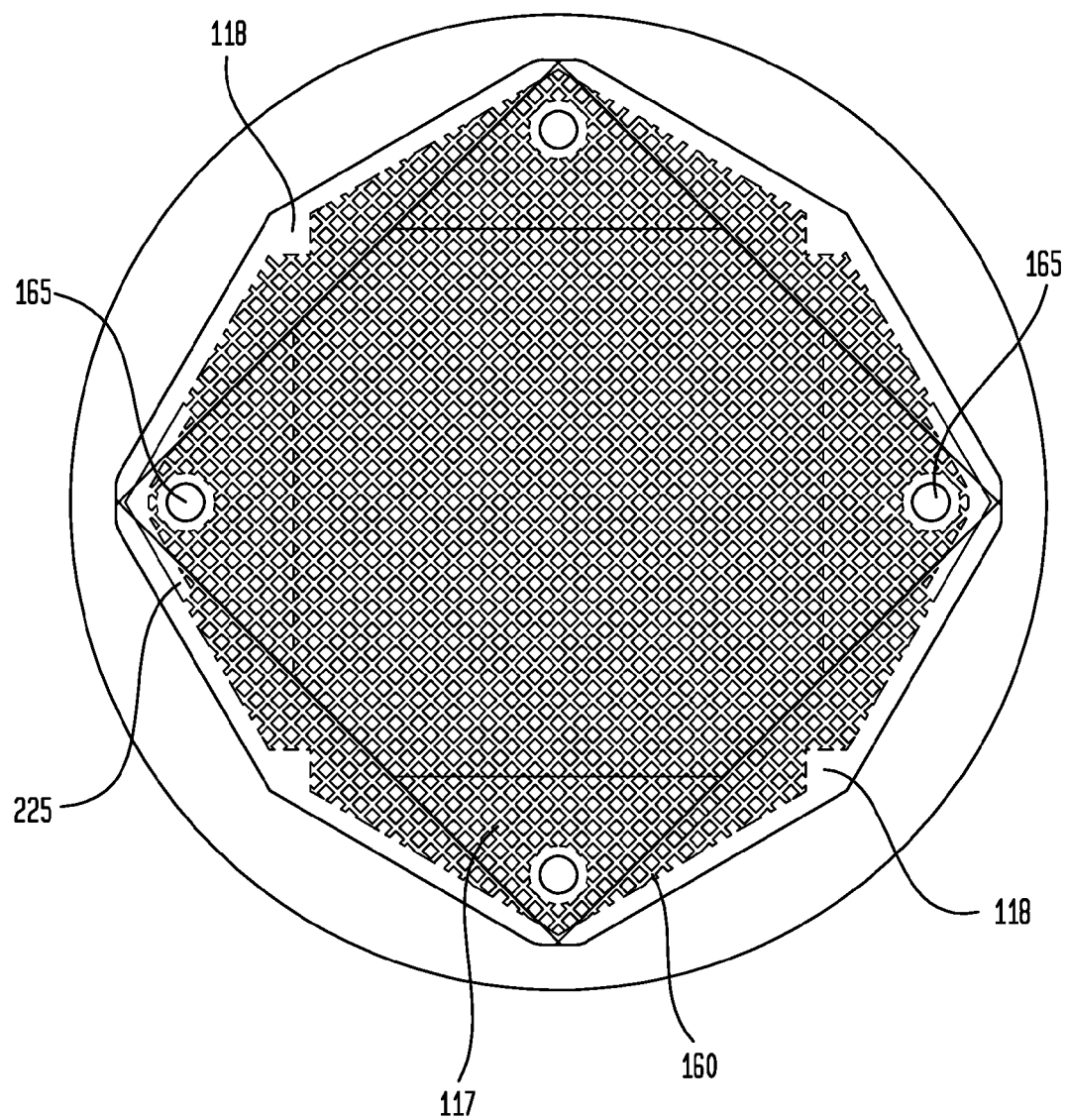
FIG. 18 is a schematic illustration of a step in a method of assembling a cross-flow electrochemical treatment device in accordance with one or more embodiments.

The four end portions 117 are potted next. Afterwards, the ports 165 are drilled. FIG. 18 shows a horizontal section through a screen 105. The combination of the corner 117 potting and the welded edge sections 225 prevent the adhesive 160 from penetrating the screen 105 in the end portions 117 containing the inlet and outlet ports 165.

Figure 19:
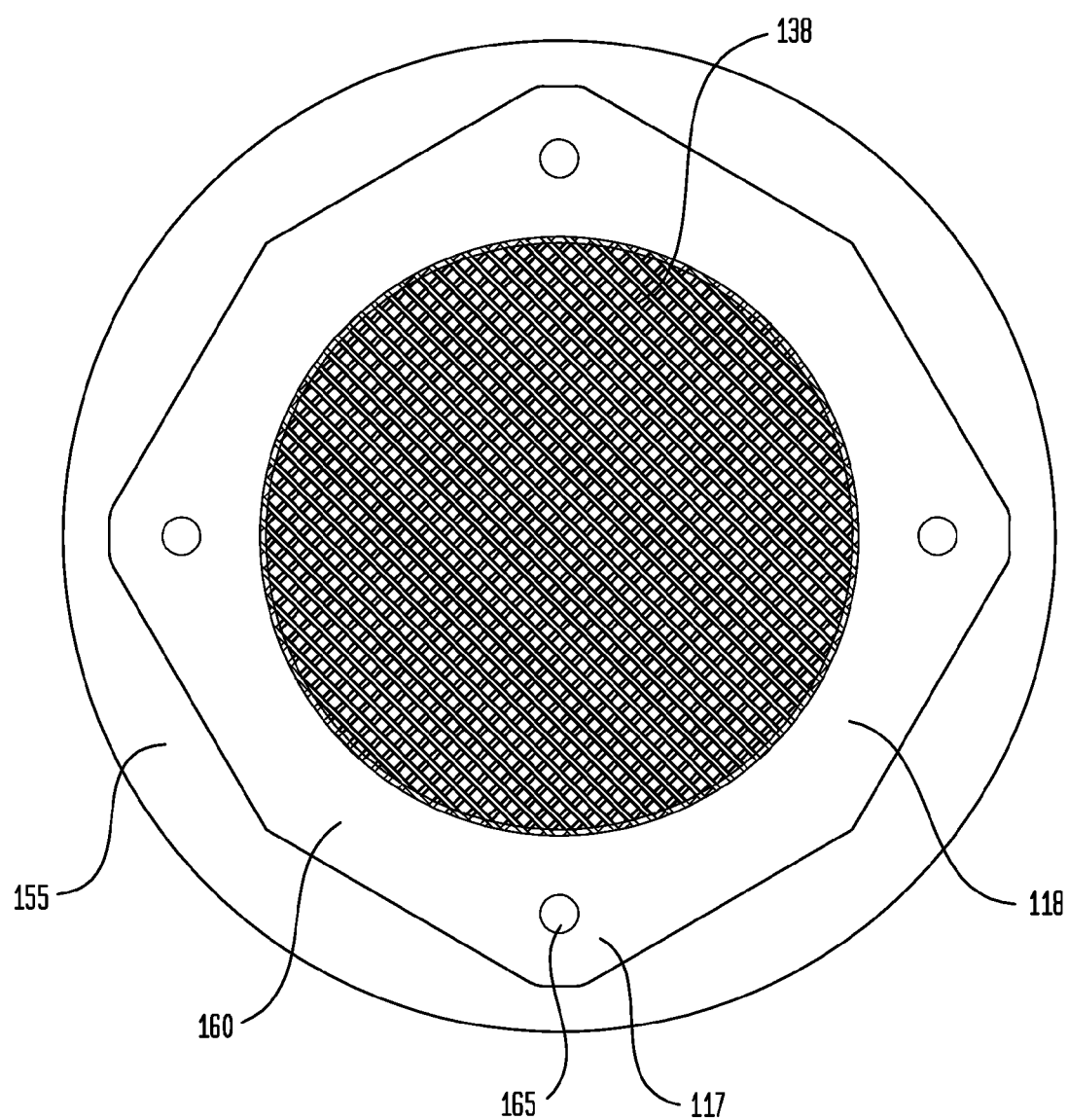
FIG. 19 is a schematic illustration of a treatment module in accordance with one or more embodiments.

According to one or more alternative embodiments, the cell stack in the frame may be spun about the central axis and adhesive injected. Centrifugal force causes the adhesive to form a ring 160 that embeds the periphery of the stack. The rotation can be stopped after the adhesive is set. Holes for ports 165 can be drilled after the adhesive 160 has cured, as shown in FIG. 19. This method has the advantage that the adhesive 160 can be applied all at once, instead of in sequential steps, thereby reducing the overall time for potting.

Any of the above described embodiments may utilize thermal welding of plastic films 110 to the screens 105 or other masking techniques in lieu of welding of membranes 135 (to each other, to screens or to plastic strips). The plastic films 110 may be easily fusible and adhere well to potting adhesives. Potential materials for the plastic films 110 may include PVC and polyester. Clear PVC has the further advantage that it is resistant to cleaning chemicals that may be used during a separations process, such as acids, base or hypochlorite.

The screens 105 may be extruded from thermoplastic plastics such as polyamide (PA or nylon), polyethylene terephthalate (PET), polybutylene terephthalate (PBT), polyethylene (PE), polypropylene (PP) and blends thereof. Polypropylene is commonly used because of its resistance to a wide range of chemicals, low cost and potential compliance with standards for drinking water system components such as NSF/ANSI 61. The screens may also be woven from materials such as polyamide, polyester, polyethylene terephthalate, polypropylene, ethylene tetrafluroethylene (ETFE) and polyether ether ketone (PEEK). Extruded and woven screens, when properly oriented, can direct the direction of flow and improve flow distribution.

The potting adhesive 160 may be able to penetrate the spaces between the membranes 135, which are partially filled with screens 105 and typically have a thickness in the range of 0.25-0.75 mm (0.010-0.030 inches). To be able to control the height of the potting, any upward wicking of the adhesive due to surface tension must be limited.

According to one or more embodiments, the electrochemical separation apparatus resulting from the above-described process may comprise a cell stack, a frame surrounding the cell stack to form a first modular unit, and a housing enclosing the first modular unit. Furthermore, the cell stack may comprising a plurality of aligned cell pairs each including an ion concentrating compartment and an ion diluting compartment. Each of the compartments may include a spacer positioned between an ion exchange membrane and a cation exchange membrane. The spacer of each compartment may have a masked set of end portions and a potted set of end portions. The mask may comprise a sleeve surrounding the end portion of the spacer to prevent the end portion from being exposed to potting material. Alternating spacers may be oriented so that masked end portions of one spacer are aligned with potted end portions of an adjacent spacer. The cell stack may also include channels formed through the potting material, with each channel extending through a respective end portion. Where the channel extends through a masked end portion, it will be in fluid communication with the spacer and flow compartment associated with that end portion. Likewise, where the channel passes through an adjacent unmasked, and therefore, potted end portion, the channel will be fluidly isolated from the spacer associated compartment. In such a manner the channels are able to provide flow to alternating compartments while keeping the respective streams isolated.

The frame 155 and covers 156 and 157 may be fabricated from materials with the requisite mechanical properties and chemical compatibility with the fluids encountered during operation. In applications such as desalination of seawater, plastic materials are favored because of their resistance to corrosion and low cost. Potential plastics include polyvinyl chloride (PVC), polyethylene (PE), polypropylene (PP), polyamides (PA or nylon), acrylonitrile butadiene styrene (ABS), polysulfone or blends of plastics such as Noryl, which is a blend of polyphenylene oxide (PPO) and polystyrene (PS). Reinforcing fillers such as glass fibers may be added for enhancement of chemical resistance and mechanical and thermal properties. In production the most likely method of fabrication would be injection molding.

According to one or more embodiments, the entire periphery of each membrane 135 of the stack 145 is embedded in potting material 160. Each stack is potted and thus mounted in a frame to form a modular assembly. Systems may include one or more such modular assemblies.

The frame 155 and the covers 156 and 157 serve to contain and form the epoxy 160 during the multiple injection steps and curing, in a manner analogous to a mold. According to one or more alternative embodiments, the covers 156 and 157 are removed after the potting is completed. A coating or film on the side of each cover adjacent to the frame prevents the epoxy from directly contacting and adhering to the cover. The coating or film may be selected for minimum adhesion to the epoxy. The ports may be drilled or cut before or after the covers are removed. The resulting modular unit has epoxy flush with both ends of the frame 155. The additional screens 108, as shown in FIG. 4, on both ends of the stack are embedded in the epoxy. The middle section of such screens, corresponding to the active membrane areas, may be removed beforehand.

According to one or more embodiments, methods and apparatuses are provided for reducing current leakage in cross-flow devices. Current leakage reduction may be facilitated by increasing the electrical resistance in the channels between the active areas of the flow compartments and the ports. According to certain embodiments, the plastic films that control penetration of the adhesive into the stack may be welded together in patterns that increase the tortuosity of paths for fluid and current flow.

FIG. 13B is a horizontal section of a cell stack showing fluid flow through a spacer. The area bound by dashed lines is the active area for ion transport, corresponding to the shape of the anode and cathode. The inactive areas (bound by solid lines) serve as inlet or outlet channels between the active areas and the ports.

FIG. 14 shows that a portion of the DC current, flowing upwards in this example, may in certain embodiments bypass the stack by flowing sideways from the active areas in the bottom spacers to a port, upward through the port, then back sideways to the top spacers. The bypass current, also called the leakage current, reduces the current efficiency of the separation process and increases the energy consumption per unit volume of product.

In each spacer, the conductivity of the fluid in the ports and the inlet and outlet channels is close to the average conductivity in the active portion of the spacer. The fraction of total current that bypasses the stack therefore increases as the conductivity increases; for example, in the concentrate stream near the outlet port.

Figure 20:
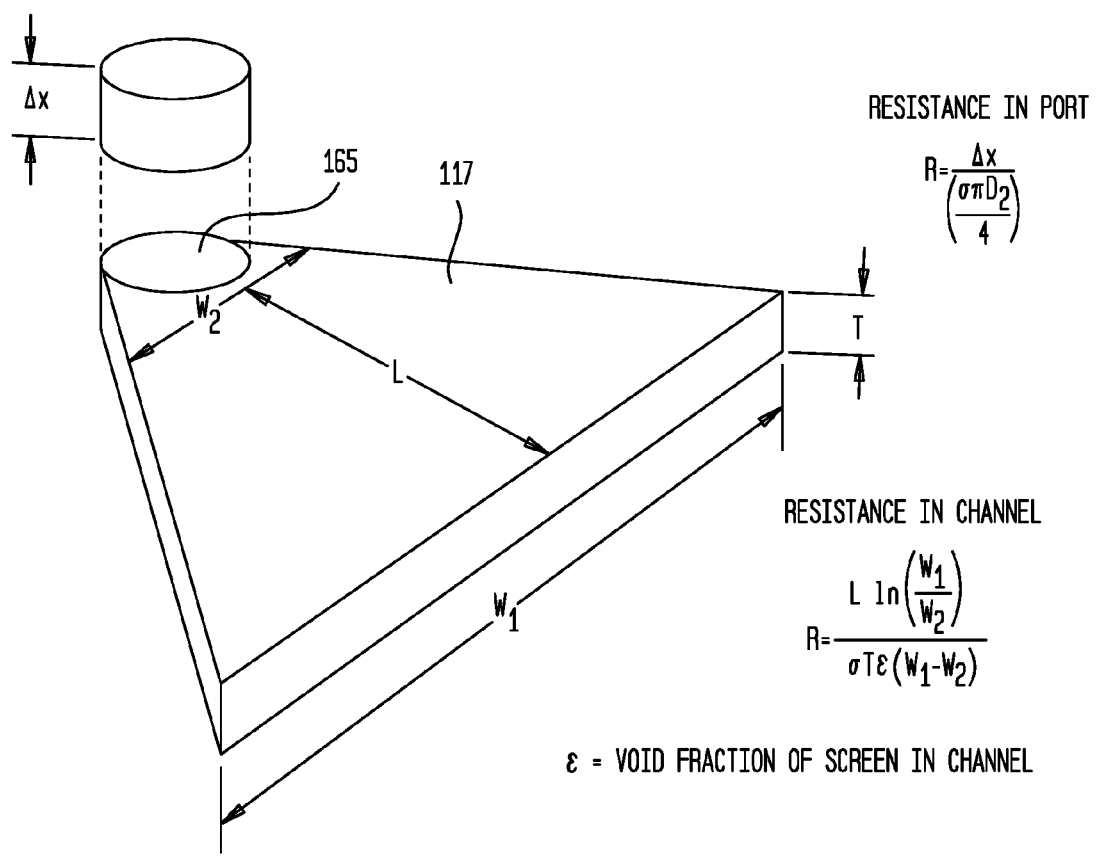
FIG. 20 is a schematic illustration and mathematical representation of electrical resistance in a treatment module in accordance with one or more embodiments in accordance with one or more embodiments.

The flow of current through an ED device can be simulated by a network model of resistors in parallel and series. The electrical resistance through a port and a typical channel can be estimated by equations in FIG. 20. Increasing the resistances can reduce the leakage current. Potential methods include: (1) reducing the diameter of the ports 165; and (2) narrowing the width and increasing the length of the channels (or end portions) 117 from the active areas to the ports. Both methods have the adverse effect of increasing the flow resistance and increasing overall pressure drop.

According to one or more embodiments, current leakage in adhesive sealed cross-flow devices is reduced by increasing the electrical resistance in the channels 117 between the active areas 138 of the flow compartments and the ports 165. The resistance may be increased by increasing the tortuosity of paths for fluid and current flow.

Figure 21:
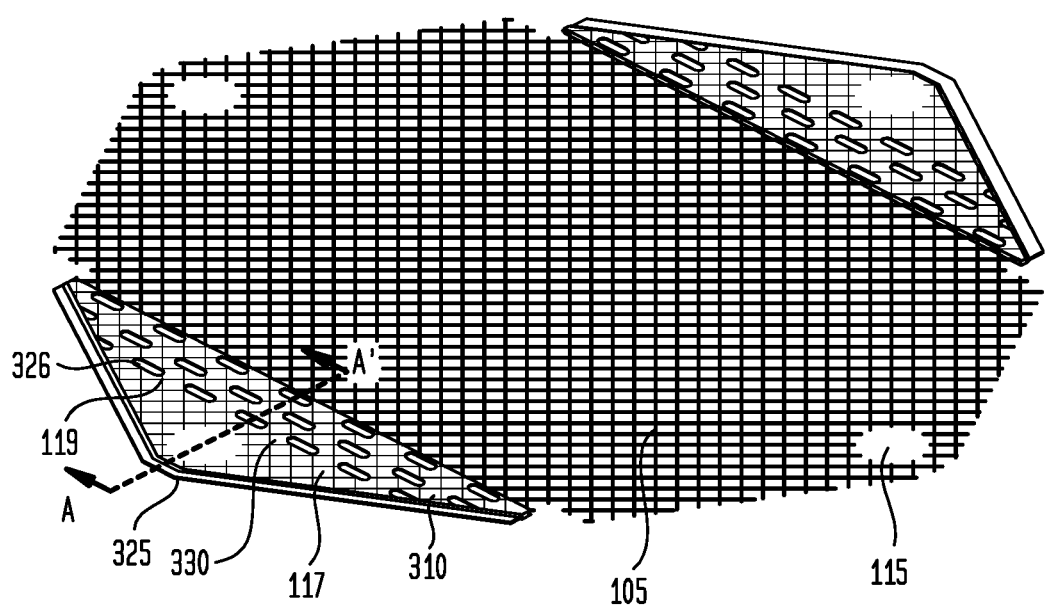
FIG. 21 is a schematic illustration of a spacer in accordance with one or more embodiments.
Figure 22:
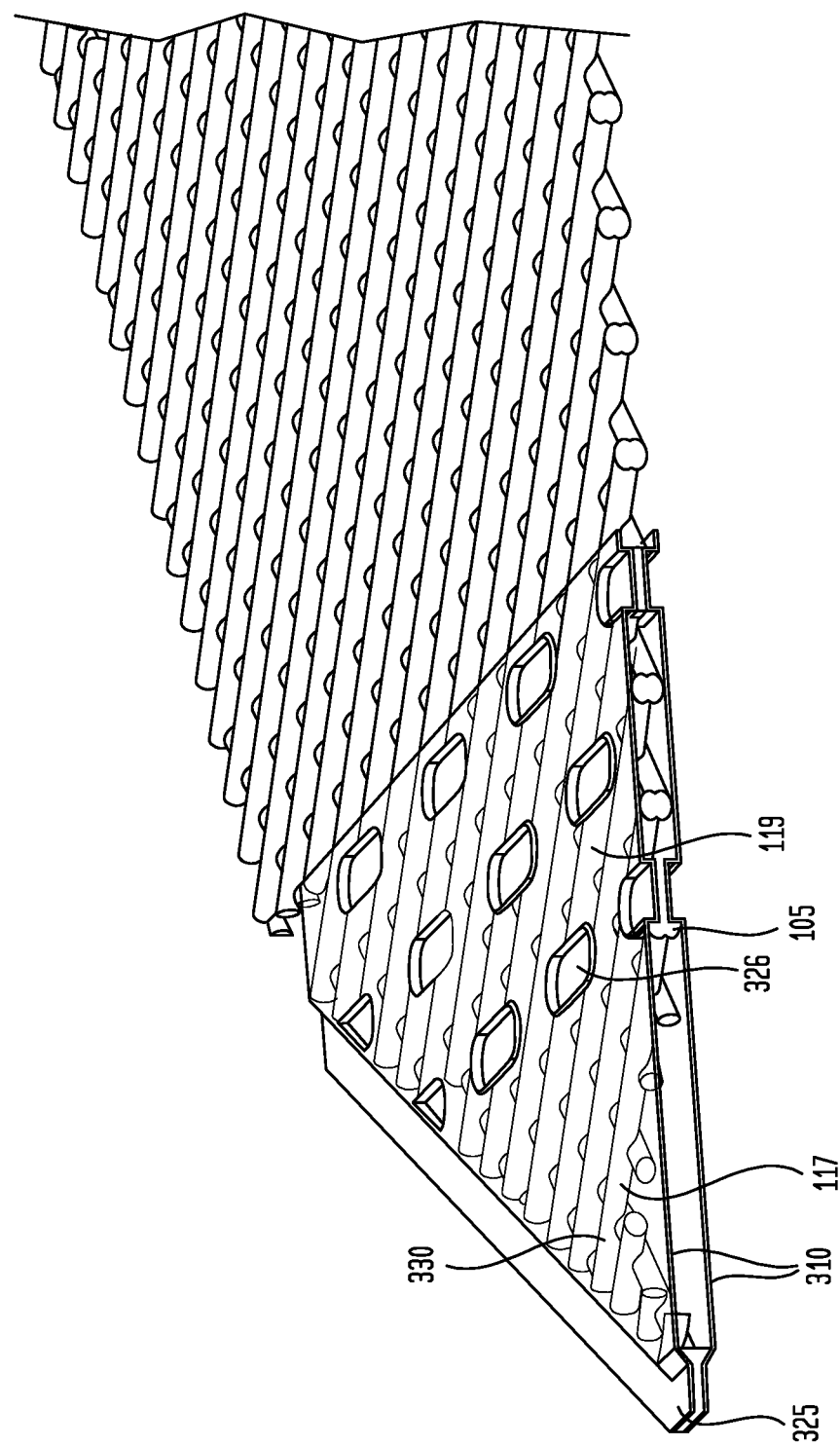
FIG. 22 is a schematic illustration of a view through Section A-A' of FIG. 21 in accordance with one or more embodiments.

According to one or more embodiments of the disclosure, the films 310 that form sleeves 330 at the ends 117 of a spacer 105 may be spot welded together in an interior 119 of the end portion 117 to create obstructions 326 to fluid and current flow, as shown in FIGS. 21 and 22. The screen 105 is welded in between the films 310. The welds can be carried out using heated elements; the seam welds using heated bands and the spot welds heated tips. Alternatively a heated plate with protrusions in the desired pattern can be used to carry out all of the welds at the same time. Ultrasonic welding is another possibility. The plastic films 310 and the screen 105 are sandwiched between a "horn" on top and an anvil on the bottom. The anvil has protrusions which focus the energy from ultrasonic vibrations on the weld areas. The seam welds and spot welds can again be carried out in a single step or in multiple steps, depending on the maximum size of the horn that is economically feasible.

Figure 23:
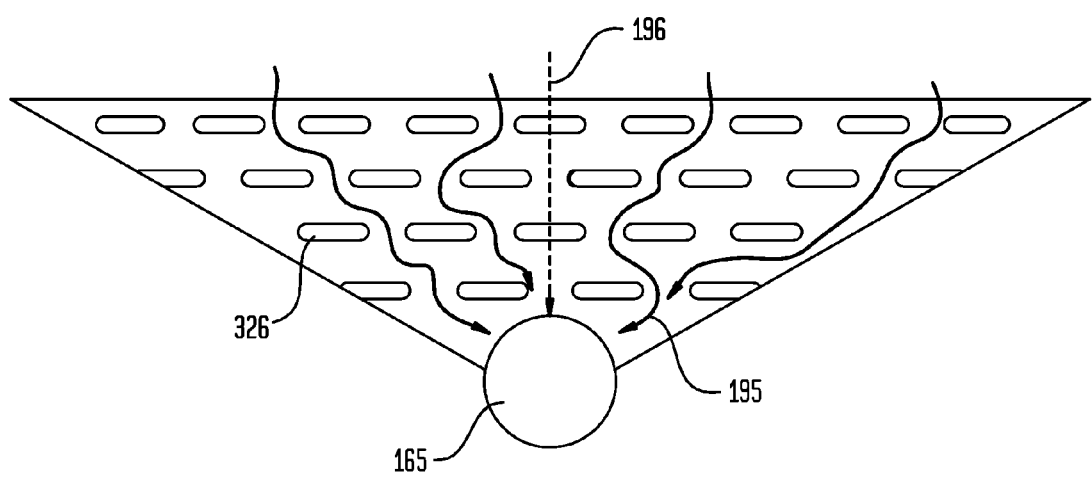
FIG. 23 is a schematic illustration of a spacer in accordance with one or more embodiments.

The obstructions 326 force the current 195 (and the fluid) to take tortuous paths (rather than hypothetical direct paths 196) from the active area 138 to the port 165, or vice versa, as shown in FIG. 23. The ratio of the average lengths of the tortuous paths 195 to the length of a hypothetical direct path 196 is called the "tortuosity."

Figure 24:
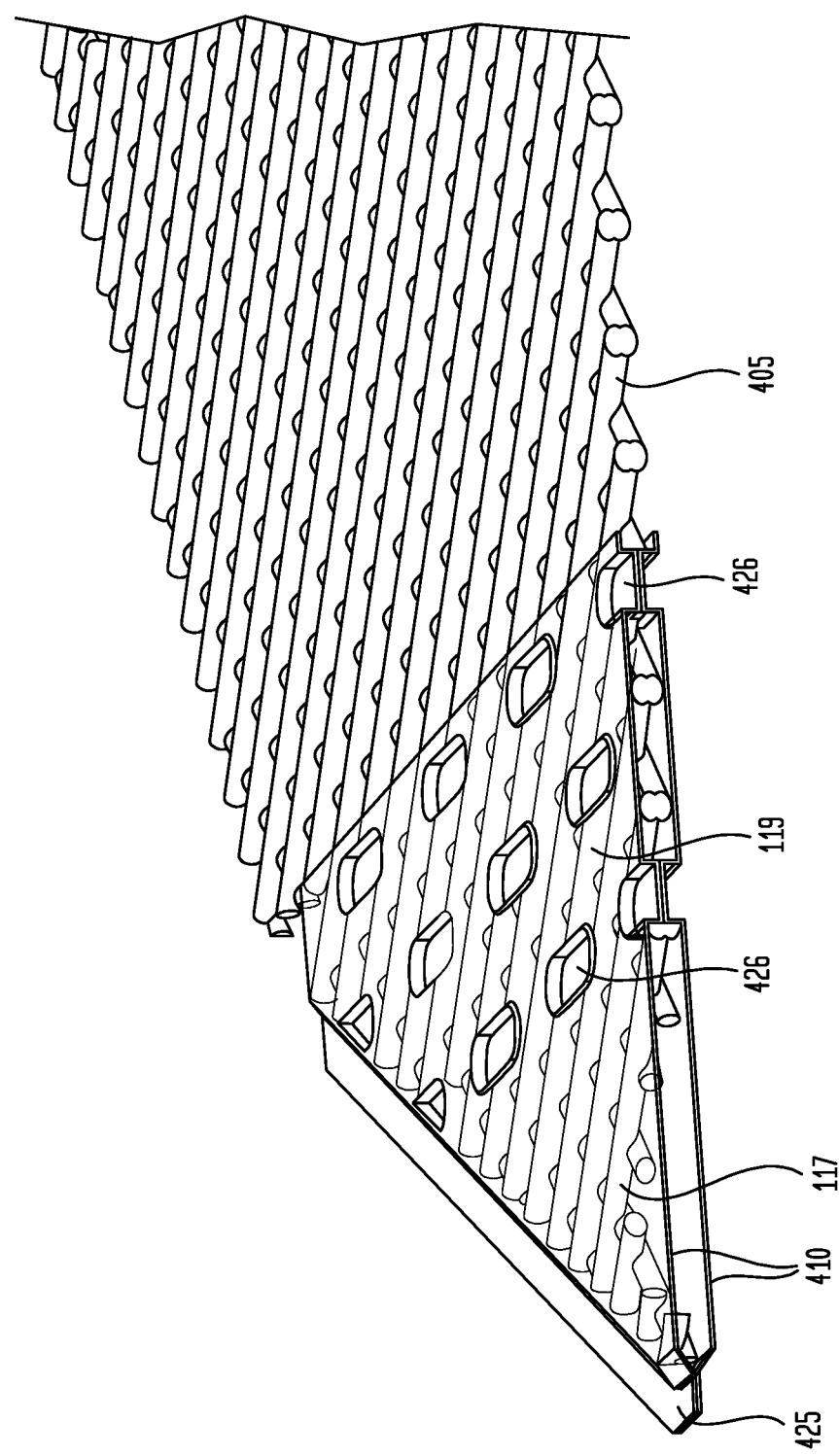
FIG. 24 is a schematic illustration of a spacer in accordance with one or more embodiments.

According to one or more alternative embodiments of the disclosure, the films 410 are welded directly to each other. Openings are die-cut in the screen 405 around the obstructions 426, as shown in FIG. 24. The advantage of this method is that welding of two films 410, such as plastic films, to each other is easier than welding with a screen 405 in-between. The thermal or vibration energy does not have to be transmitted through three layers of materials.

Figure 25:
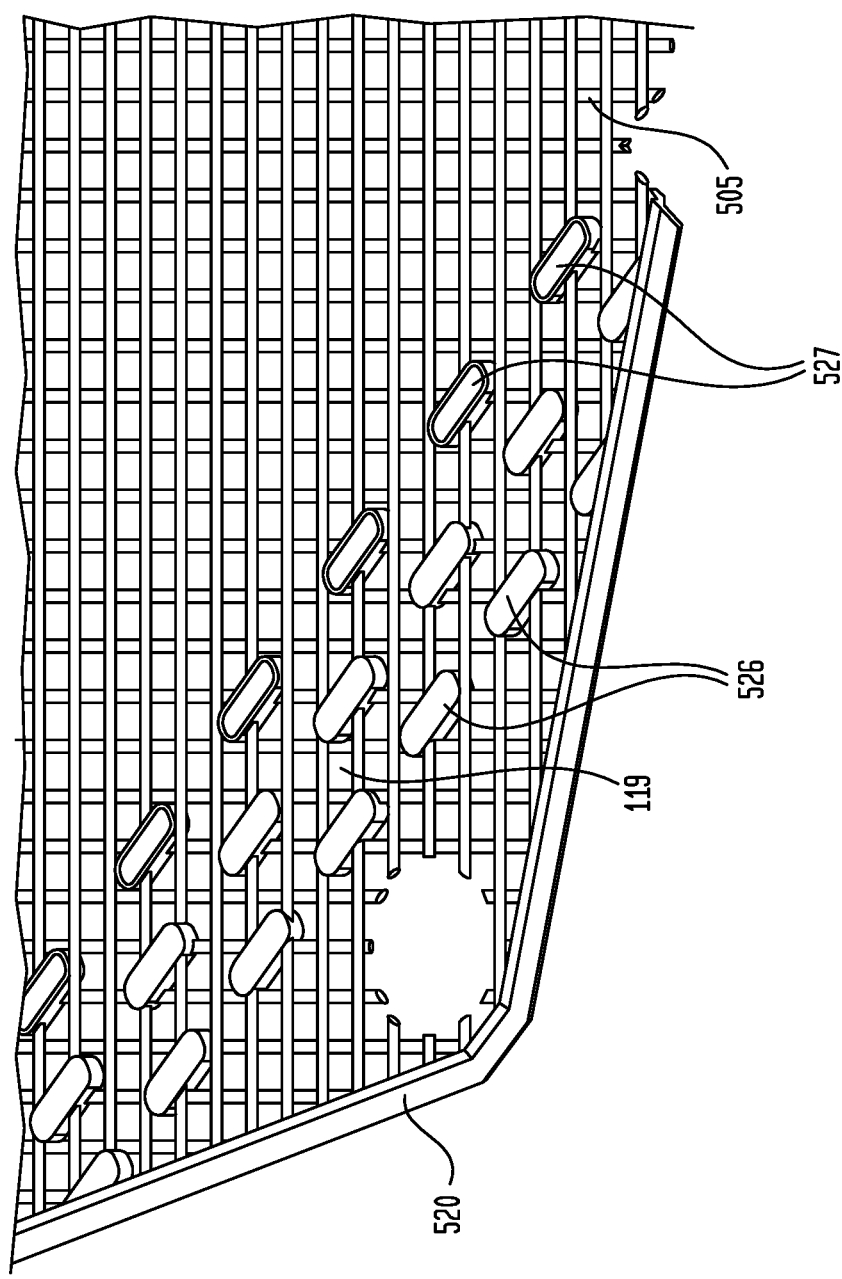
FIG. 25 is a schematic illustration of a spacer in accordance with one or more embodiments.

According to one or more alternative embodiments of the disclosure, the screen 505 may be injection molded, as shown in FIG. 25. Raised areas 526 can be molded on the screen 505 to focus energy on the weld areas. Alternatively the areas of the obstructions 526 can be sealed off by raised ridges 527 around the perimeters; this reduces the overall weld area and may results in lower capital cost for the ultrasonic welder and the horn.

The patterns of the obstructions shown in the previous figures are for illustration only. In practice the patterns have to be optimized based on trade-off between reduction in leakage current vs. increase in fluid pressure drop.

Figure 26:
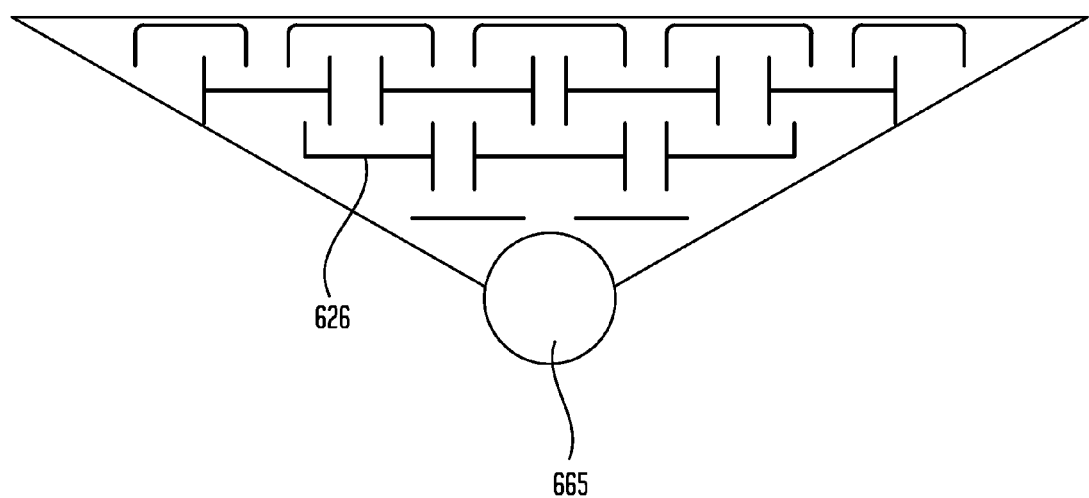
FIG. 26 is a schematic illustration of a spacer in accordance with one or more embodiments.

FIG. 26 shows an extreme example of a labyrinth-like pattern of obstructions 626, which may be possible with a molded screen 605.

According to one or more embodiments, improvements to the apparatus may provide for increased rigidity of the cell stack's 145 surrounding area after being potted with epoxy 160.

According to one or more embodiments, the spacer may comprise a reinforced structure to provide additional support against stack compression. The reinforced structure may be formed by cutting out relief portions from the spacer and welding together the film at that space. Such an arrangement provides for additional epoxy to gather in the relief regions to provide reinforcement. The reinforced structure may comprises welded ribs or ribbings in the pocket-regions, to increase rigidity. Increasing the rigidity of these area ensure that the sub-blocks' gaskets are being compressed as evenly as possible, improving the sealing between sub-blocks when they are stacked into a module, also referred to as a modular unit. It also encourages penetration of the epoxy into the space between membrane and sleeve during the potting step, thereby strengthening the bond between them, and preventing cross leaking between dilute and concentrate compartment.

According to one or more embodiments, the sleeves comprise welded ribs which form channels for epoxy filling. These channels, when potted, contribute to an improved distribution of epoxy through the entire stack height and eliminate gaps. As a result, the area around the manifold ports is strengthened, providing the required hardness to compress gaskets used to seal between sub-blocks. The advantages created by the ribbing include, among other things: (1) providing better sealing between sub-blocks when assemble into a module, reduce the energy consumption; and (2) creating a potting material feeding channel between sleeve and membrane, to increase operation flexibility.

Figure 27A:
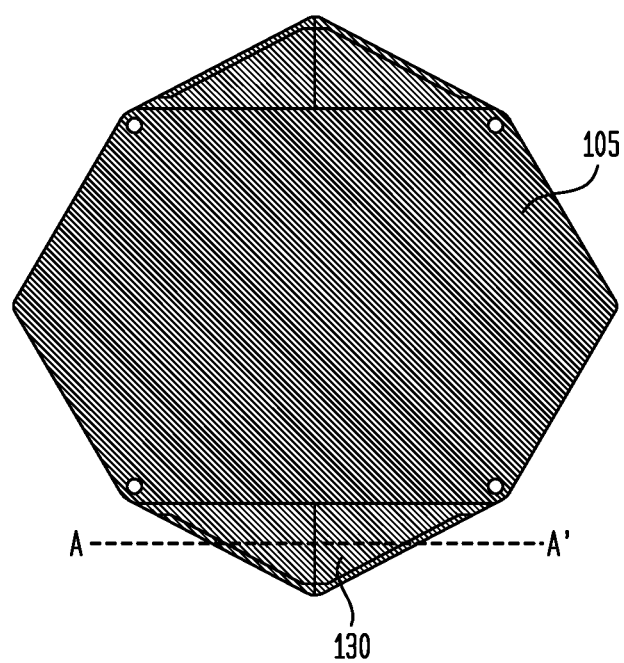
FIG. 27A is a schematic illustration of a spacer in accordance with one or more embodiments.
Figure 27B:
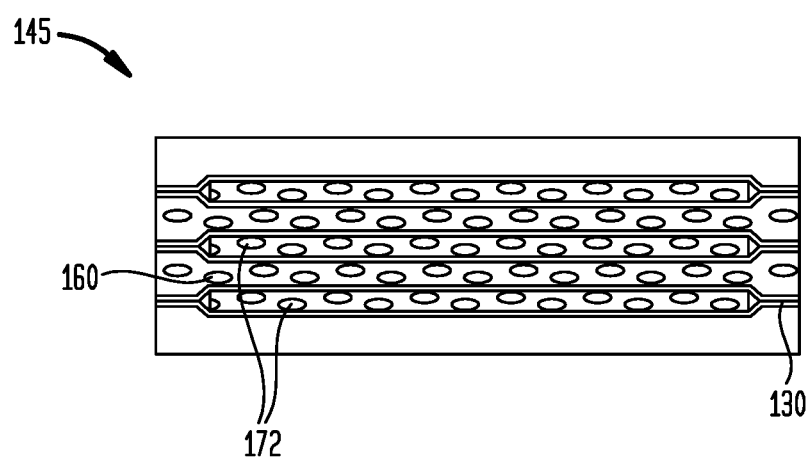
FIG. 27B is a schematic illustration of a view through Section A-A' of FIG. 27A in accordance with one or more embodiments.
Figure 28A:
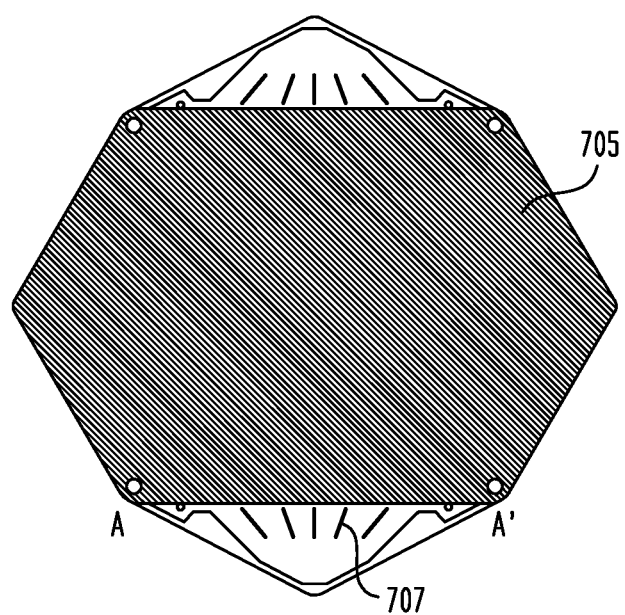
FIG. 28A is a schematic illustration of a spacer in accordance with one or more embodiments.
Figure 28B:
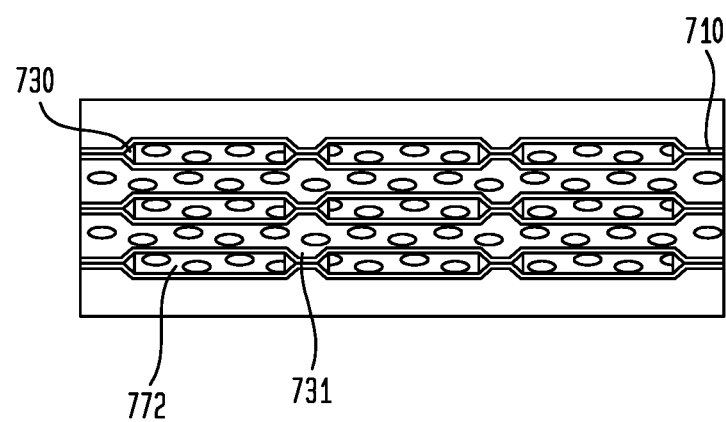
FIG. 28B is a schematic illustration of a view through Section A-A' of FIG. 28A in accordance with one or more embodiments.

The process of welding spacers may sometimes result in delamination where the welded portions of the sleeve and screen separate. Delamination may allow epoxy to flow into the compartment during potting, an undesired result. According to one or more embodiments, the screen 705 is designed with additional reliefs 707 cutout as shown in FIGS. 28A and 28B, thereby reducing or eliminating the problem of delamination. Such a design has the following advantages compared to a design lacking the cut-out reliefs, like that shown in FIGS. 27A and 27B.

Welding at the relief cut-out area 707 allows for the sleeve 710 to be directly welded together to form a stronger bond, thereby reducing or eliminating delamination.

The ribbing design, as shown in FIGS. 28A and 28B, may further contribute to better stack hardness. According to a non-ribbed embodiment, like that shown in FIG. 27, between welds, there is a screen positioned between two sleeves to form a pocket. The screen is not rigid, and when the cell stack is formed, the non-welded portion will be soft and may have problems supporting the gasket to form a good seal during module assembly. With the introduction of more ribs within the weld, epoxy 160 can now fill up the entire stack height when the ribs 731 are aligned vertically. This in turn will form a harder surface which will support the gasket used to seal between sub-blocks during module assembly.

The ribbings 731, like those shown in FIGS. 28A and B may create a potting material feeding channel between sleeve 710 and membrane improving the even and full distribution of potting material.

Figure 29A:
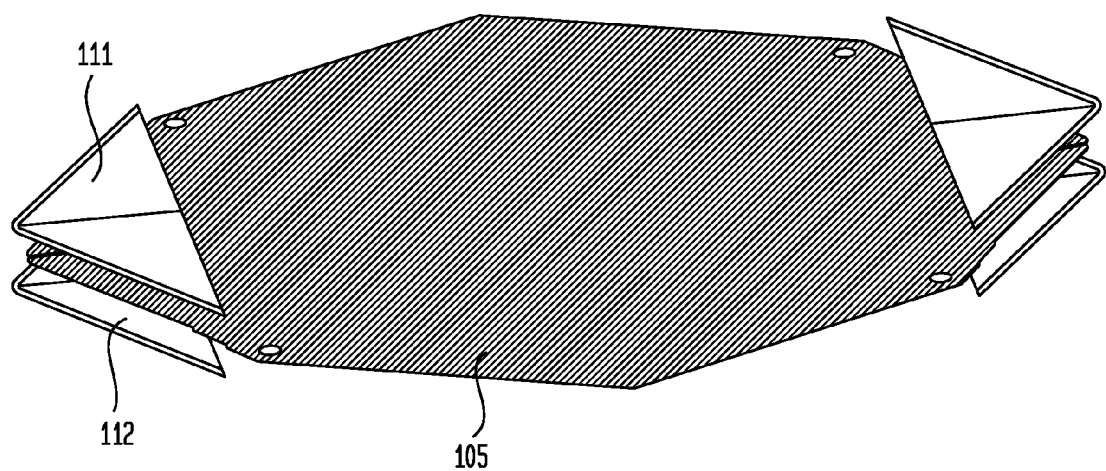
FIG. 29A is a schematic illustration of a spacer in accordance with one or more embodiments.
Figure 29B:
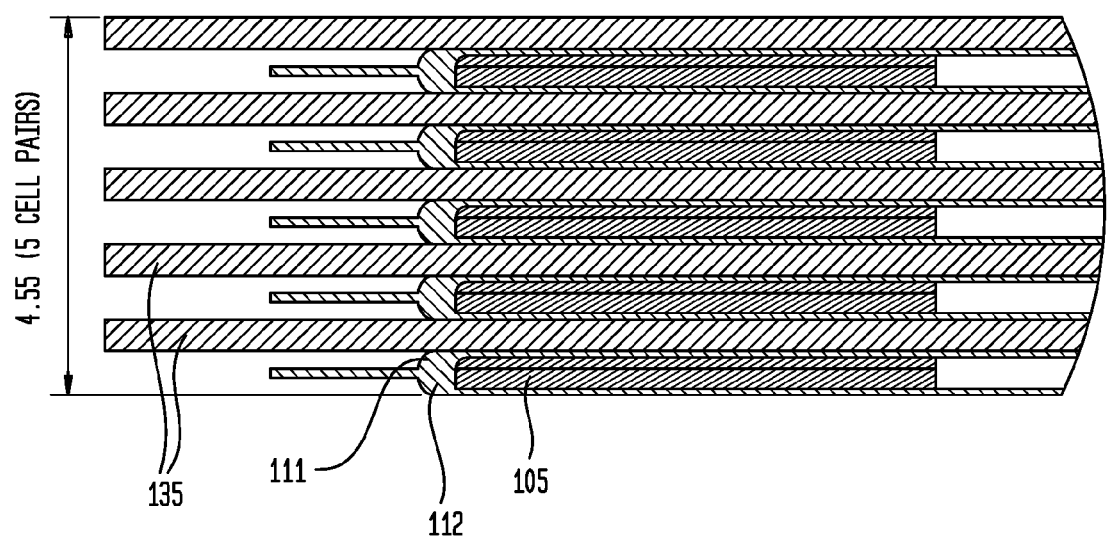
FIG. 29B is a schematic illustration of a cell stack height in accordance with an embodiment as shown in FIG. 29A.

According to certain embodiments, the spacer design is made up of a screen 105 with two opposite end portions positioned between two pieces of film 111 and 112 with edges welded to form a pocket to prevent epoxy from entering the manifold area during potting, as shown, for example, in FIGS. 29A and 29B. The two layers of film 111 and 112 add to the overall thickness of the spacer unit. This film-screen-film arrangement results in an overall greater stack height for the same number of cell pairs when many cell pairs are stacked and a larger cross-sectional area between membranes 135.

Figure 30A:
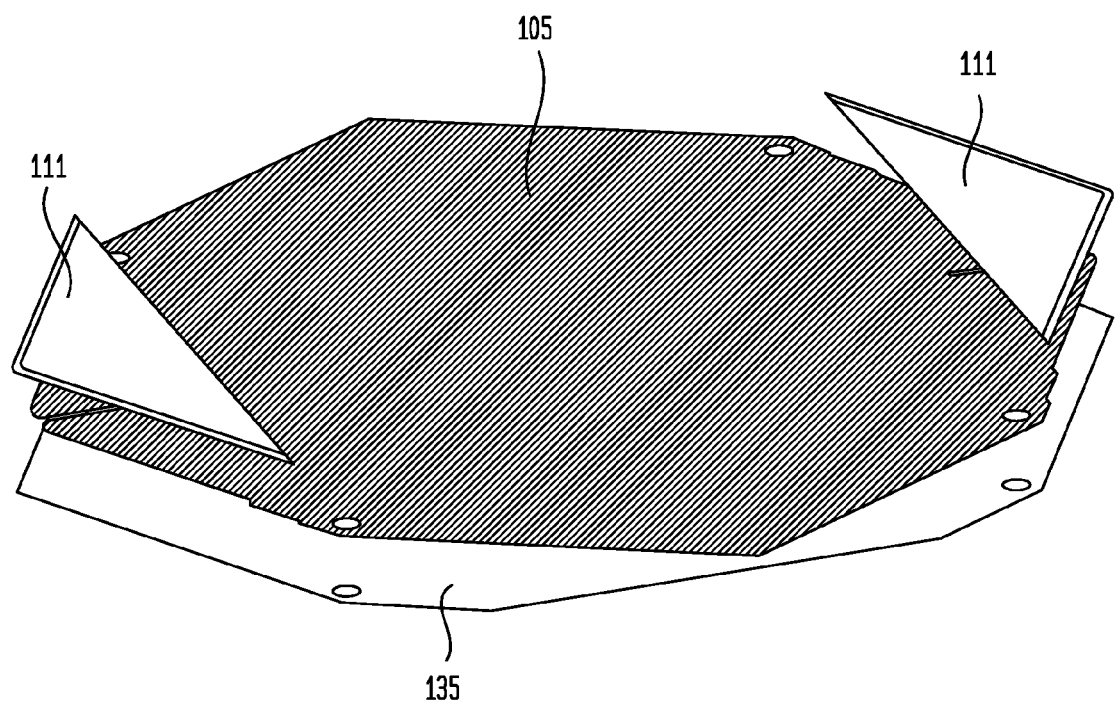
FIG. 30A is a schematic illustration of a spacer in accordance with one or more embodiments.
Figure 30B:
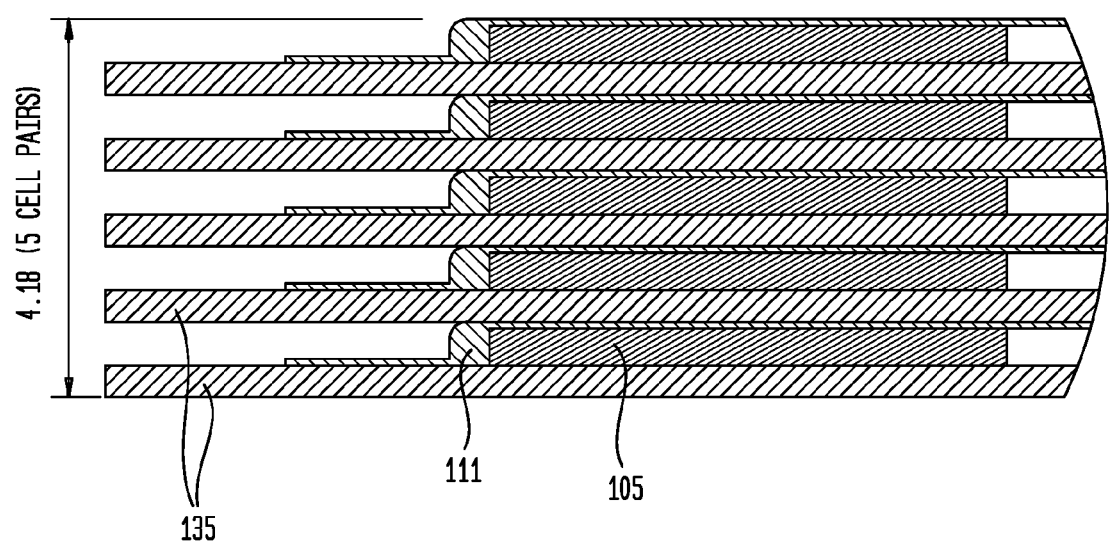
FIG. 30B is a schematic illustration of a cell stack height in accordance with an embodiment as shown in FIG. 30A.

According to one or more alternative embodiments, one of the two films 111 or 112 is replaced with a full sheet of membrane 135, as shown in FIGS. 30A and 30B. Such a configuration reduces the overall height when many cell pairs are stacked. It also reduces the cross-sectional area by a film thickness for better flow channeling. As a result, more cell pairs can be stacked into the same frame height and epoxy penetration within the stack is enhanced. As the height of the spacer is reduced by one film thickness or more, the overall height is reduced by a film thickness multiplied by the number of cell pairs or more. According to some embodiments, the film material 111 may be the same material as the membrane 135 for better bonding.

According to certain embodiments the membrane 135 and the film 111 are welded to each other to create a seal to protect the manifold areas during potting.

Embodiments which include replacing a film 112 with a membrane 135 may provide certain benefits. Such embodiments may provide for a shorter stack height. Such embodiments may provide for improved channeling of the flow by the screen strands by reducing the gap between the spacer screen 105 and membrane 135. Such embodiments may provide for better epoxy penetration because it eliminates the situation of having membrane 135 lying on sleeves 120. As both membrane 135 and sleeve 120 are thin with smooth surfaces, it is very difficult for epoxy to penetrate in between. With this new design, all gaps supposed to be filled with epoxy are laid with screen, which will assist the epoxy penetration.

Such embodiments may provide for easier handling during stacking because the membrane 135 is already attached to the spacer 105. According to certain embodiments, cell pairs are produced according to two configurations—(1) screen, film & AEM; and (2) screen, film and CEM. By welding of the membranes 135 to the screens 105 and films 110, the thin membrane 135 is made easier to handle during stack production. Likewise, because the membrane 135 is now bonded onto a spacer 105, the risk of two or more sheets of membrane 135 sticking to each other during stacking is reduced.

Such embodiments may provide for better storage of spacers 105. Ready-made spacers 105 can be more effectively stored in stacks in humidity-controlled rooms because, with each spacer having a film 110 on one side and membrane 135 on the other, moist air is able to travel more effectively to the membranes 135 to better preserve them.

Figure 31A:
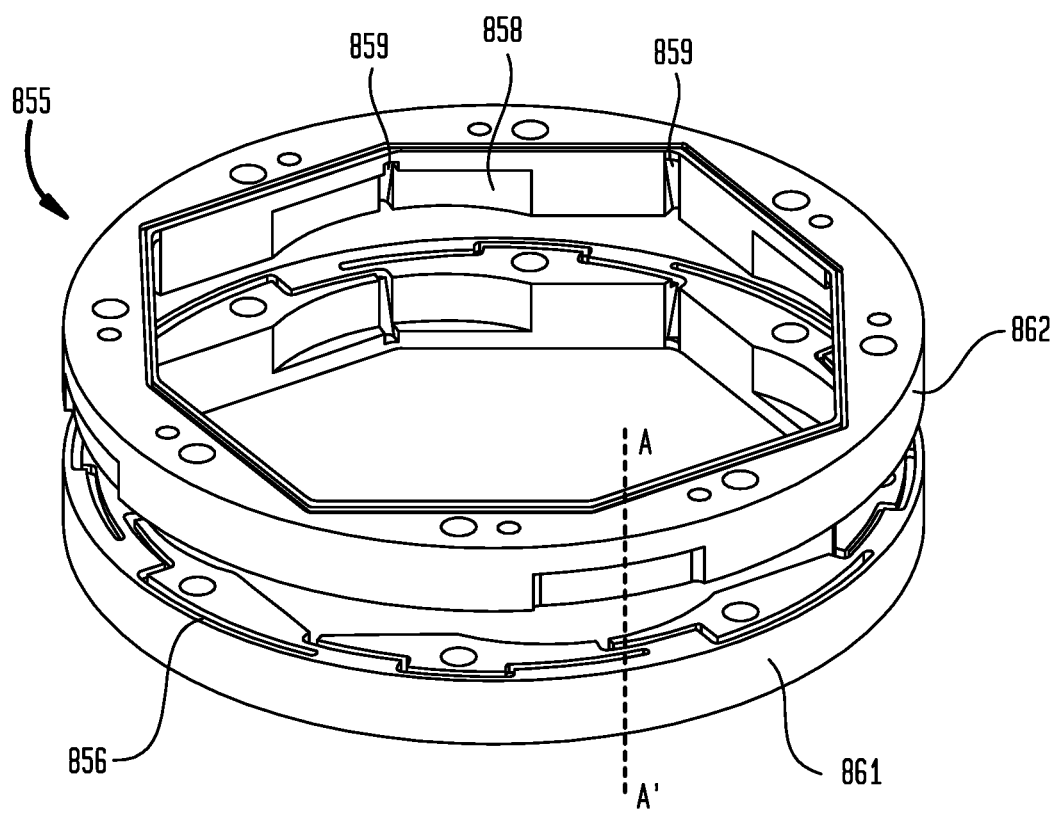
FIG. 31A is a schematic illustration of a frame in accordance with one or more embodiments.
Figure 31B:
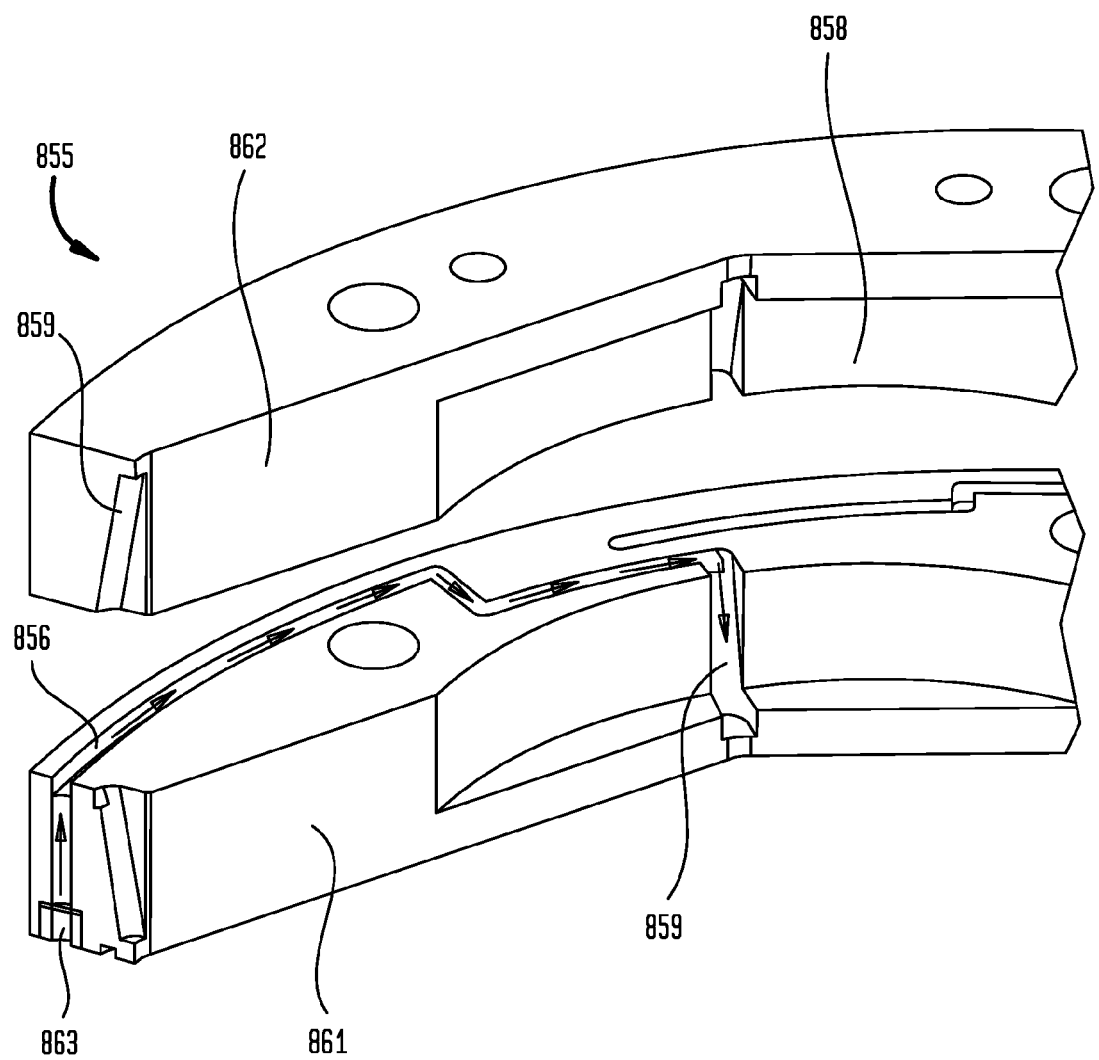
FIG. 31B is a schematic illustration of a view through Section A-A' of FIG. 31A in accordance with one or more embodiments

According to one or more embodiments the sub-block frame 855 is molded into two halves 861 and 862 that are assembled together to form the frame 855, as shown in FIGS. 31A and 31B. According to certain embodiments the potting material flow channels 856 are positioned in the core of the frame 855 where the two halves 861 and 862 interface. The frame 855 also includes potting diffusers 859 and reservoirs 858. At the potting material inlets 863 a potting needle may be inserted to deliver epoxy. The material flows through the potting channel 856, as indicated by the flow arrows, and is delivered to the epoxy reservoir 858 and/or potting diffuser mechanism 859. The inlets 863 of the potting channels 856 may be of the same or higher level as the potted level to avoid back-flow of epoxy when the potting needle is withdrawn.

Figure 32:
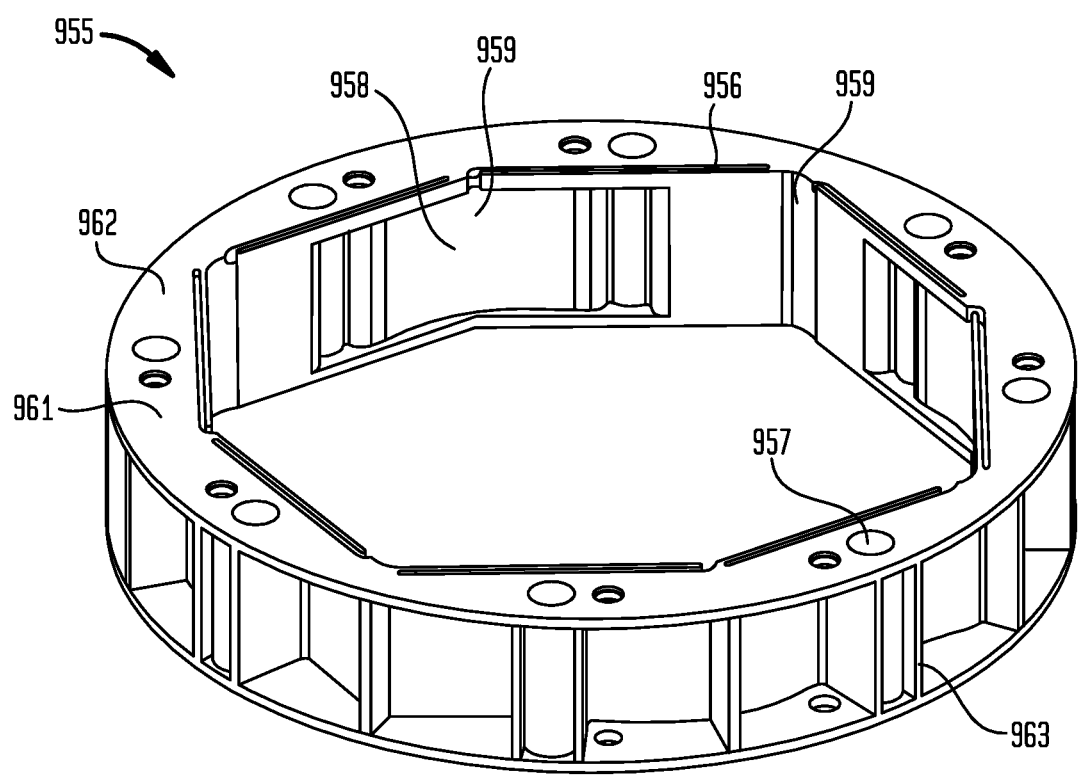
FIG. 32 is a schematic illustration of a unitary frame in accordance with one or more embodiments.
Figure 33A:
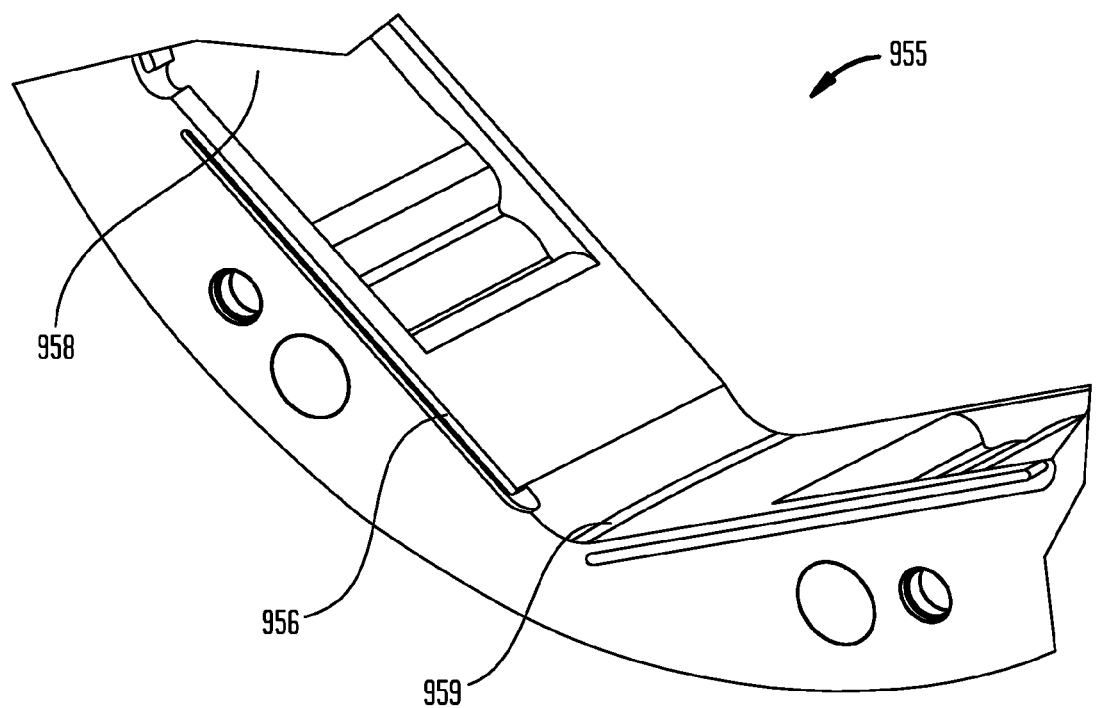
FIG. 33A is a schematic illustration of a frame in accordance with one or more embodiments.
Figure 33B:
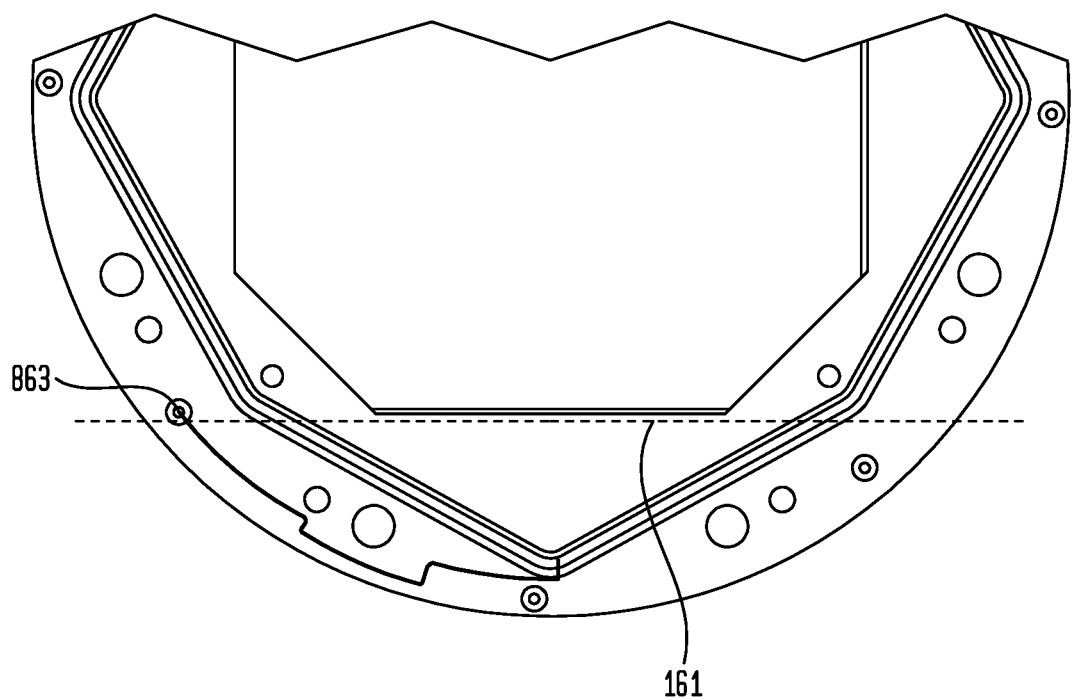
FIG. 33B is a schematic illustration of a frame in accordance with one or more embodiments.

According to one or more alternative embodiments, the potting material flow channels 956 are located at an external surface 962 of the frame 955, as shown in FIGS. 32 and 33A and 33B. Positioning the flow channels 956 at the external surface 962 enables molding the frame as a single unitary piece 961, thereby providing a simpler molding tooling design and reducing the cost and number of steps of production, and furthermore reducing the weight of the frame by 70% to about 2.3 kg.

An adhesive sealing film may be attached to the external surface 962 of the frame 955 to form a closed flow channel 956. The channels 956 direct dispensed potting material to a cut-through diffuser slot 959. The diffuser slot 959 ensures the leveling of the epoxy, thus assist in uniform wicking into the stack. The diffuser slot 959 may be shaped like that shown in FIG. 34, or it may be shaped otherwise. Cut-out pockets in the inner side of the frame 955 act as reservoirs 958 for the epoxy during potting to minimize the drop in level as the epoxy wicks into the stack. The reservoirs 958 have been designed to enhance the molding process such that the ribs 963 can be of equal thickness, thus avoiding warping. Tie-rod holes 957 are reinforced with rib walls 963 all round to strengthen the holes 957 for withstanding tightening force.

As shown in FIG. 33B the epoxy inlet 863 may be positioned at or above the final potting level 161 to avoid back-flow of epoxy when the potting needle is withdrawn. Such an arrangement between the inlet 863 and the final potting level 161 may be provided across various embodiment of the frame.

According to one or more embodiments, a frame is provided for improving the consistency of the potting step of the manufacturing process, by providing a more even distribution of potting material to the cell stack.

Figure 34:
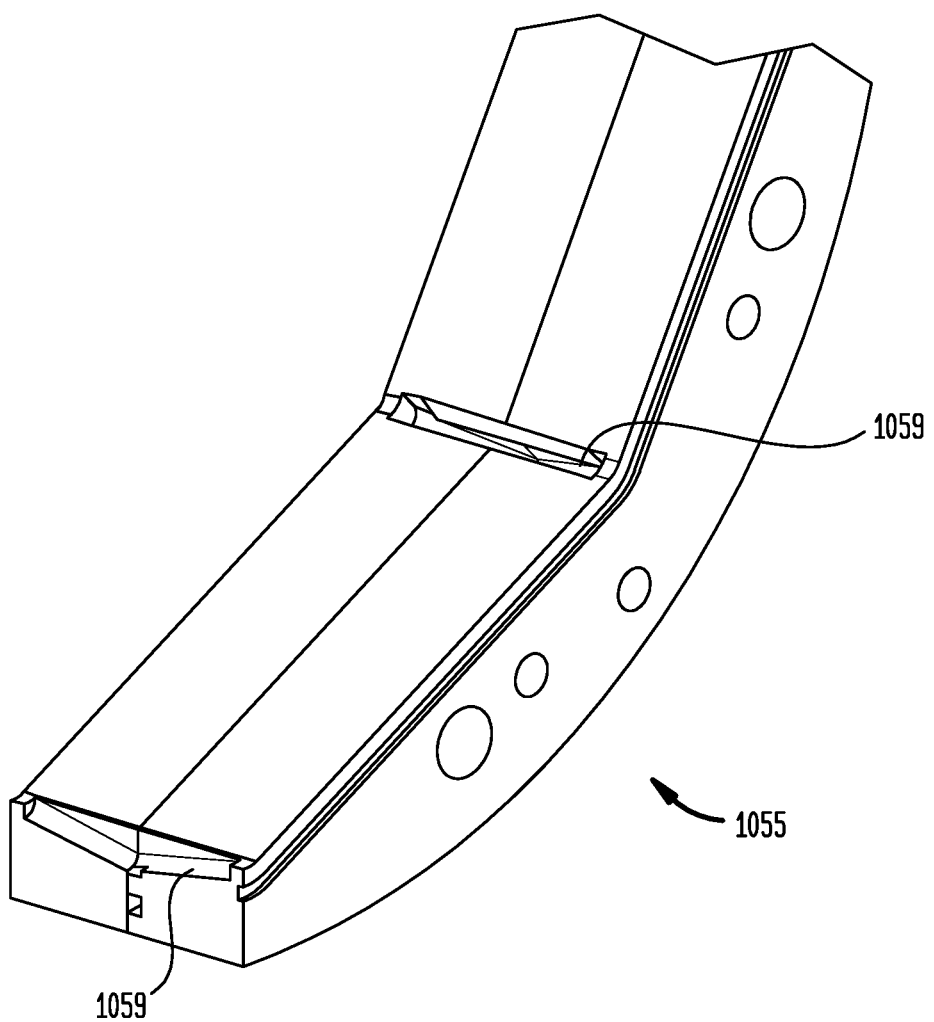
FIG. 34 is a schematic illustration of a frame in accordance with one or more embodiments.

FIG. 34 shows a cut-out of a module frame 1055, according to one or more embodiments. The frame of FIG. 34 shows two diffuser mechanisms 1059. The bottom portion of the figure shows a cross-section of the diffuser mechanism 1059 while the top portion shows the full diffuser 1059 in place. According to certain embodiments, potting material is fed to the diffuser through a channel machined in the frame 1055. As potting each quadrant of a sub-block is done bottom-up, the angled cut-out of the diffuser 1059 levels out the potting material against the full width of the stack before it touches the stack. Such a configuration encourages uniform filling and wicking of potting material into the stack. An even fill will reduce the chance of an improperly potted corner that could lead to internal cross-leaks.

In accordance with one or more embodiments, a sealing component is provided for reducing water and current leakage at the electrodes of the electrochemical separation apparatus.

In an electrochemical module setup, both ends of the module are sandwiched with thick end plates with electrode built in for applying power to the module. The area surrounding the electrode may be subject to leakage.

According to one or more embodiments, an electrode seal is formed to eliminate leakage. The sealing component seals off the electrode rod, preventing leakage of the electrode water. This design may accommodate slight misalignment in terms of perpendicularity of the electrode rod to the electrode plate. It may also provide the benefit of improved pressure tolerance in terms of leak-sealing.

Figure 35:
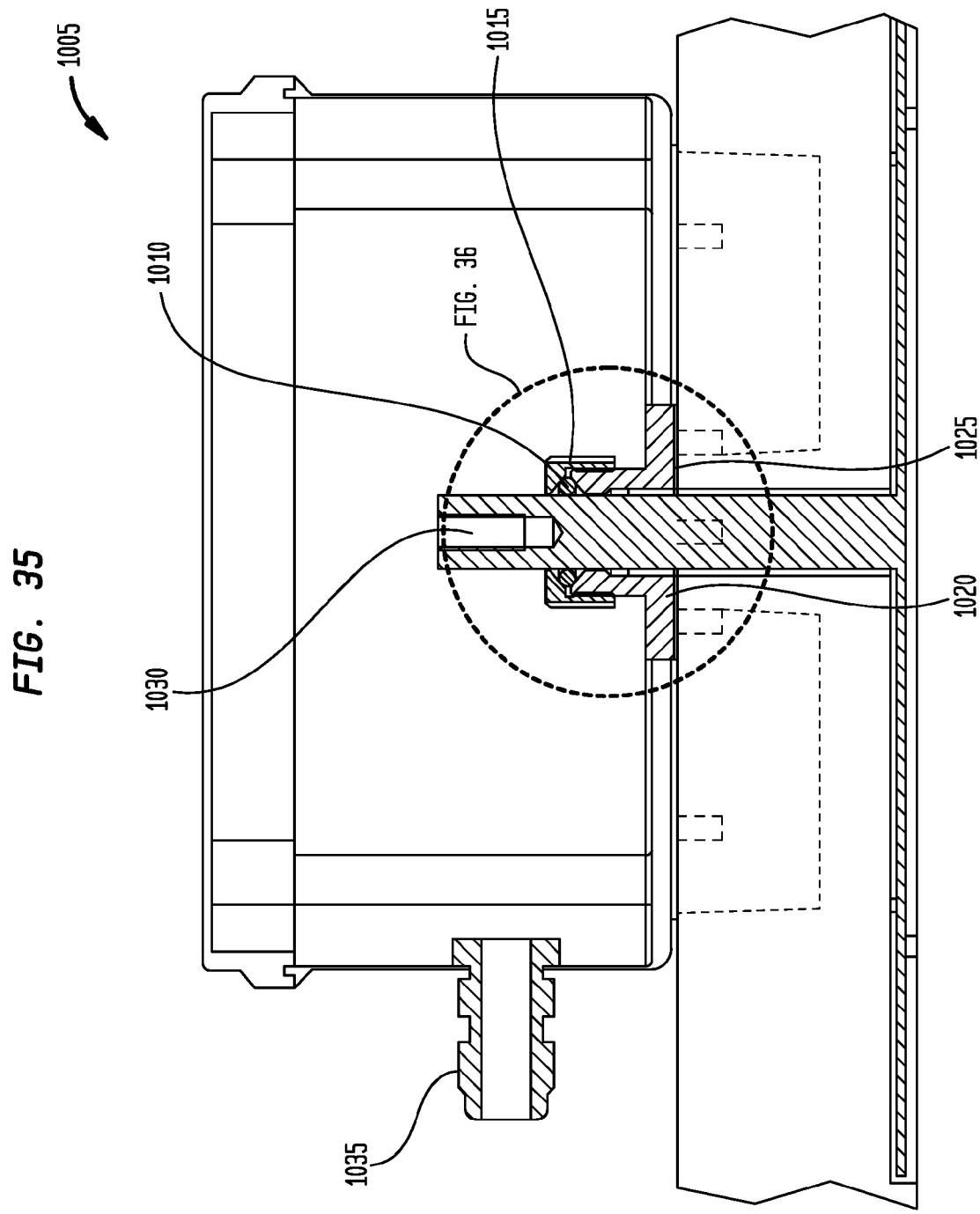
FIG. 35 is a schematic illustration of a power connection box in accordance with one or more embodiments.
Figure 36:
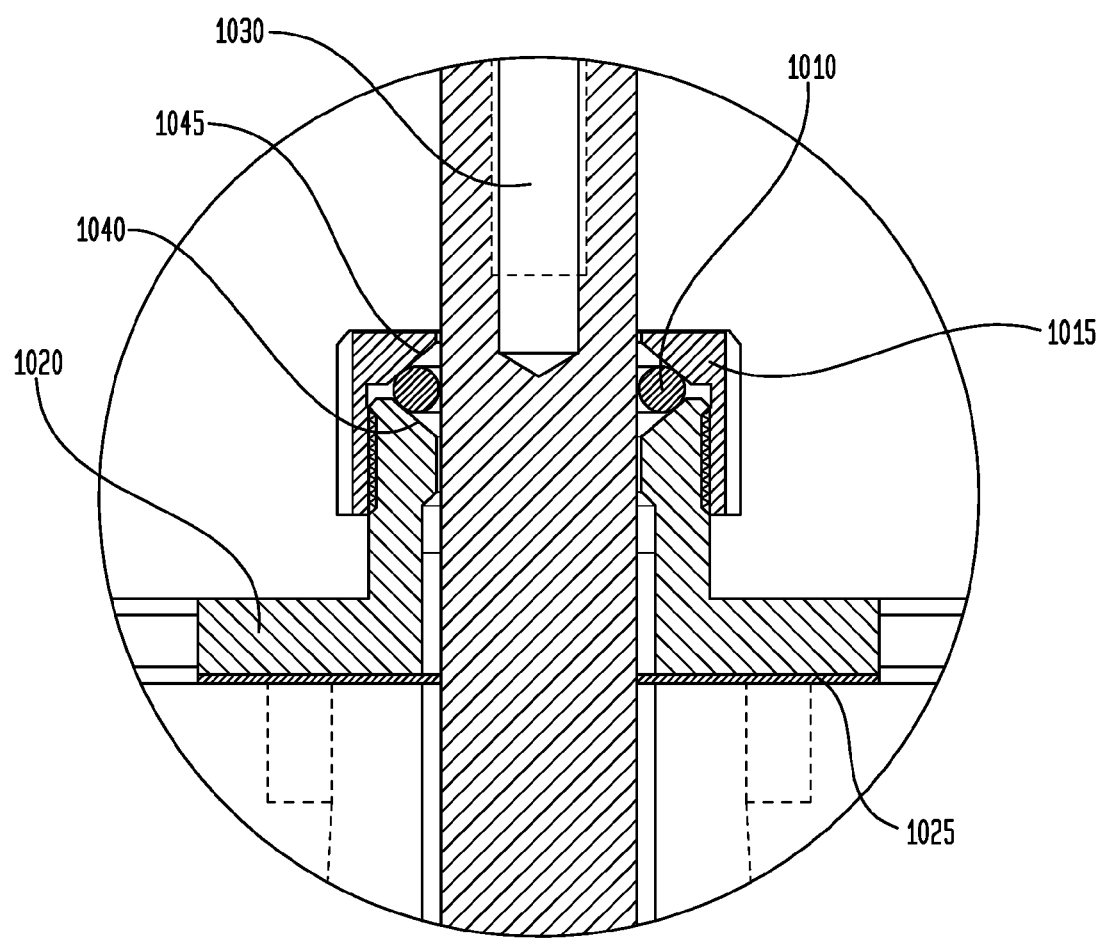
FIG. 36 is a schematic illustration of a power connection box in accordance with one or more embodiments.

According to one or more embodiments, as shown in FIG. 35, the sealing component may comprise a fabricated sealing cap 1015, sealing bracket 1020, an O-ring 1010 and a rubber gasket 1025. The gasket 1025 may be positioned between an end plate and the sealing bracket 1020. The sealing gasket 1025 at the base of the sealing bracket 1020 seals off the leakage between the end plate and the bracket 1020. Each of the sealing bracket 1020 and the sealing cap 1015 may have a conical edge, as shown in FIG. 36. An O-ring 1010 is positioned between the sealing bracket 1020 and the sealing cap 1015 along each of those components conical edges 1040 and 1045. In operation, as the cap 1015 is tightened the O-ring 1010 is compacted forming a seal between the electrode rod 1030, the sealing bracket 1020 and the cap 1015, as shown in FIGS. 35 and 36. Additionally, a power connection box 1005 with an opening for cable grommet 1035 and a gasket covers and seals the exposed metal parts so that it is out of reach to prevent electrocution, as shown in FIG. 35.

According to one or more embodiments, an expandable screen plug is provided to reduce cross leak. Cross-leak may be present in a sub-block, due to incomplete potting of the sub-corner. PVC guiding rods are used to align multiple screens and membranes during the stacking process, as well as for the alignment of the stack to the sub-blocks frame. The PVC guiding rod causes uneven compression between the layers of membrane due to a pinching phenomenon around the PVC guiding rod during stacking. According to certain embodiments, PVC guiding rods may be replaced with expandable screen plugs. Within a stack, the expandable screen plug may reduce uneven compression while ensuring the alignment of the various materials. The alignment between the stack and its frame is further set by shims made of screen material. The screen-shims may be inserted in between the stack and the frame at both sides of each pin's location so as to align the stack into the frame.

The expandable screen plug may expand upon deployment. With its ability to expand, the plug enhances the absorption of the potting materials by the multiple layers of material while ensuring that the layers remain in place. Guiding rods are usually made of solid materials as it serves as a support for the materials.

Figure 37:
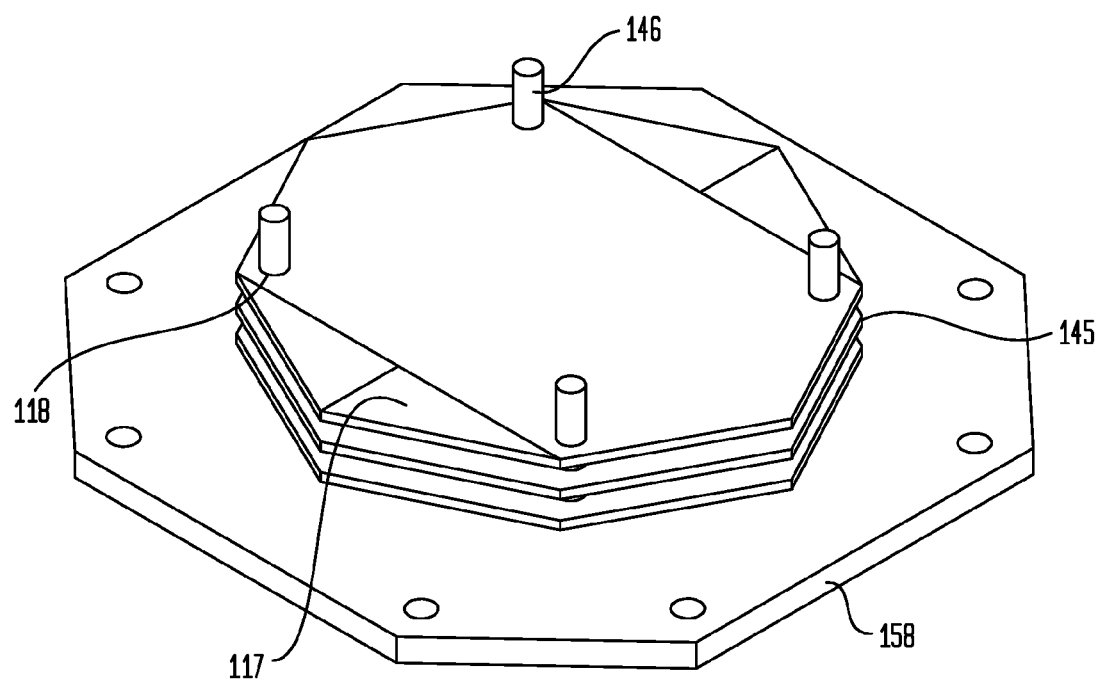
FIG. 37 is a schematic illustration of a step in a method of assembling a cross-flow electrochemical treatment device in accordance with one or more embodiments.
Figure 38:
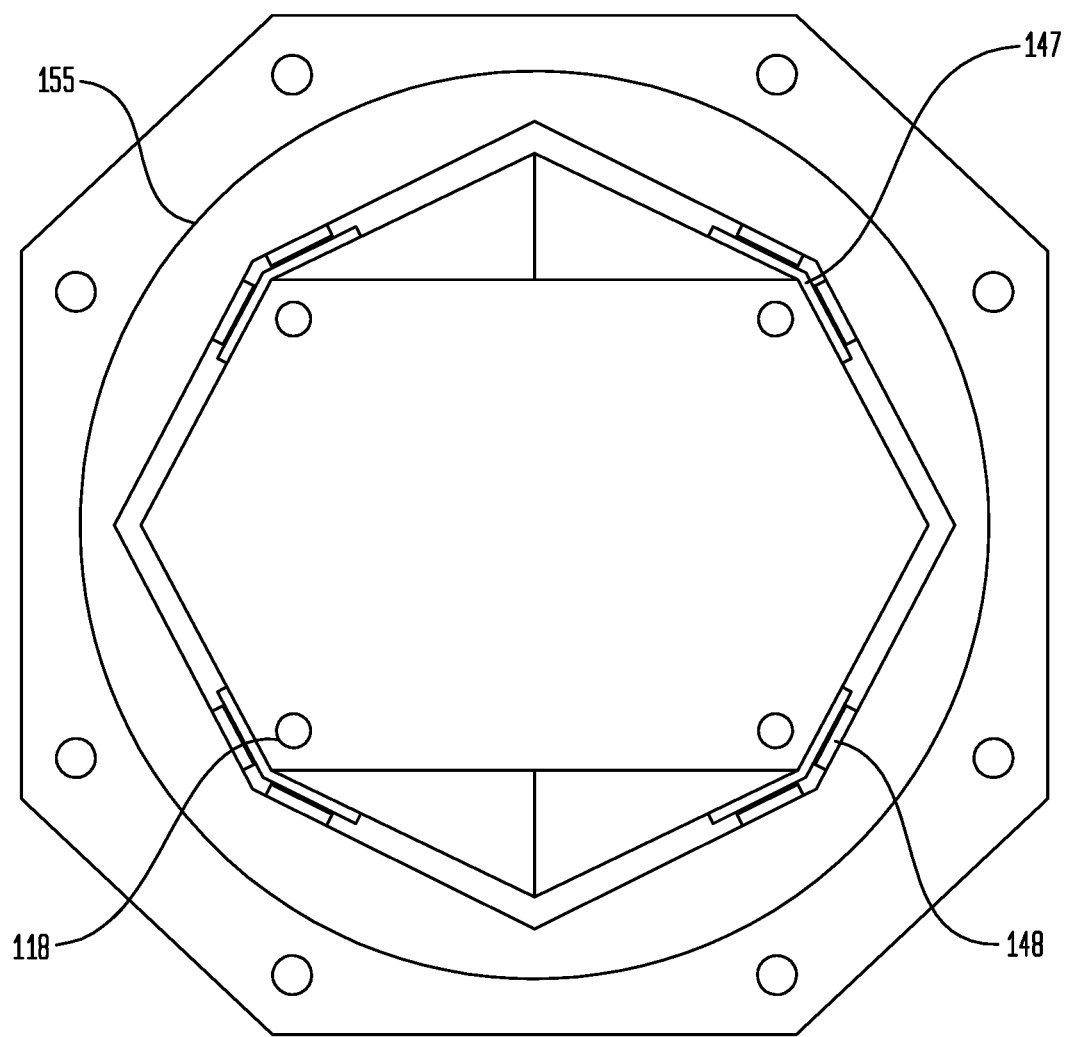
FIG. 38 is a schematic illustration of a step in a method of assembling a cross-flow electrochemical treatment device in accordance with one or more embodiments.
Figure 39:
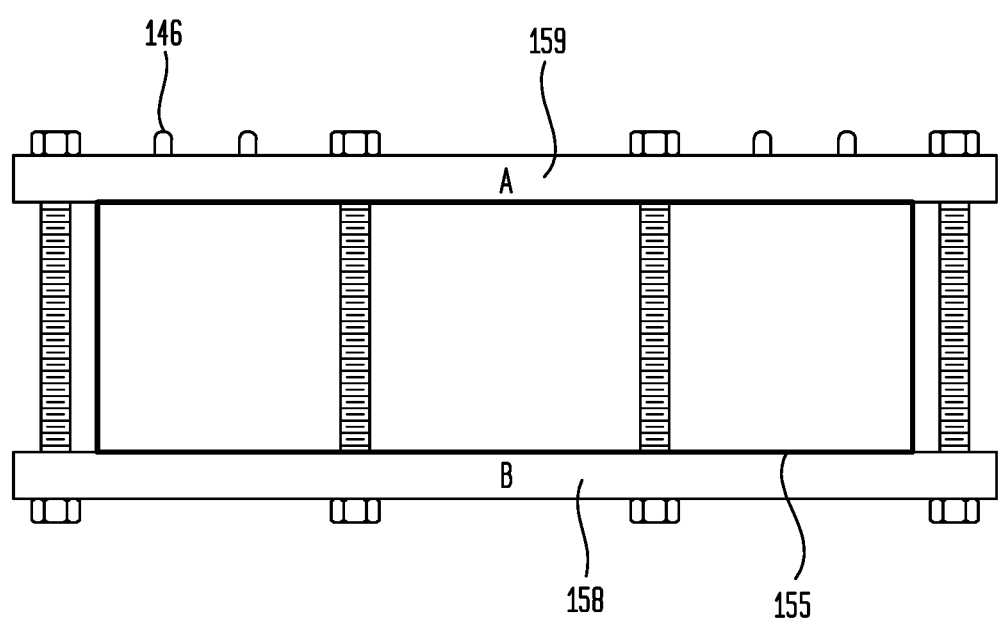
FIG. 39 is a schematic illustration of a step in a method of assembling a cross-flow electrochemical treatment device in accordance with one or more embodiments.
Figure 40:
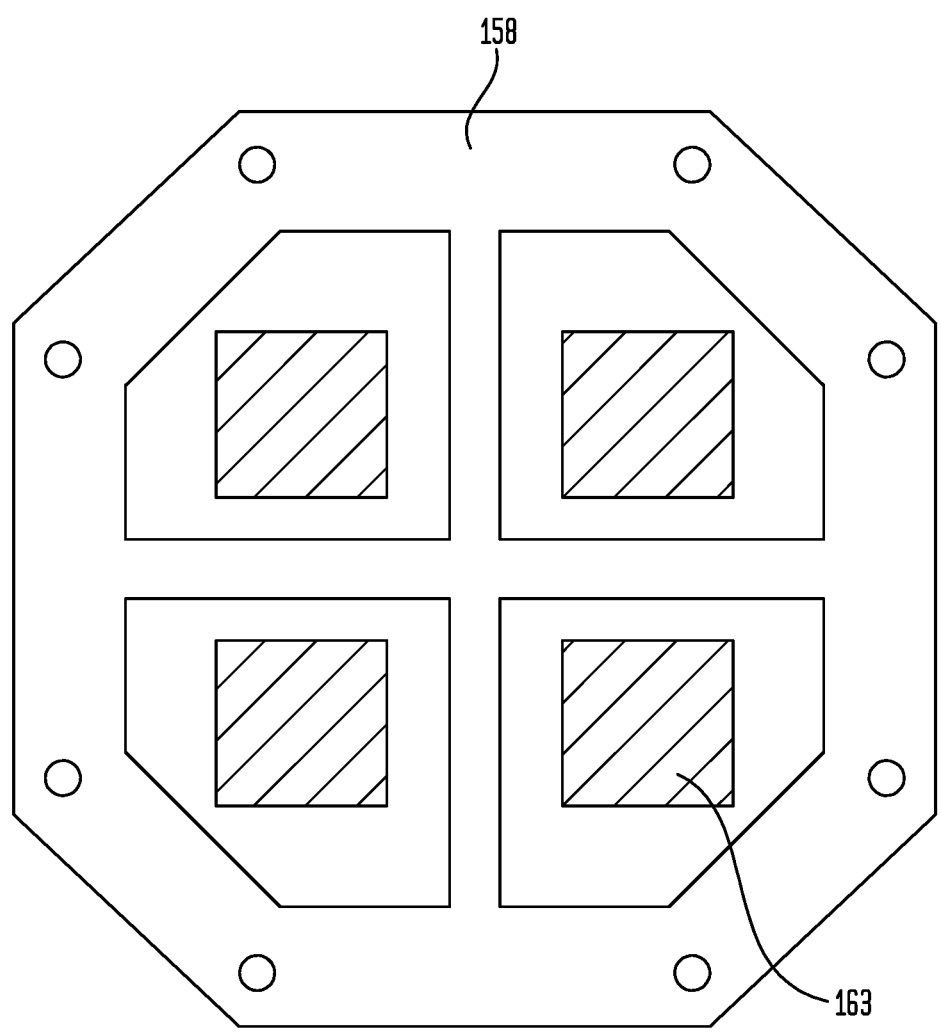
FIG. 40 is a schematic illustration of a step in a method of assembling a cross-flow electrochemical treatment device in accordance with one or more embodiments.

According to one or more embodiments, PVC guiding rods are employed during the stacking process for the formation of the tunnel and then replaced by the expandable screen plug prior to the potting step, as shown in FIGS. 37-42. The expandable plug may be made from, for example, poly-propylene. The poly-propylene may be in the form of sheets loosely rolled. The plug may be formed from thin sheets, for example, 0.38 mm thick, according to some embodiments. FIG. 37 shows a first step, according to one or more methods of assembling an aligned cell stack 145 that comprises stacking alternating membranes and spacers on a potting plate 158 by placing the cell stack materials through PVC guiding rods 146 placed at the corners 118. The guiding rods 146 may extend up from potting plate 158. FIG. 37 shows a second step according to a method of assembly. After stacking the cell stack material, a frame 155 is placed around the material, and flat sleeves 147 and screen shims 148 are added at corners 118 to further assist in alignment of the cell stack 145. According to one or more embodiments, after the screen shims 148 are added, the flat sleeves 147 may be removed. In a third step, shown in FIG. 39, another plate 159 is placed on top of the frame 155, and the entire assembly is tightened. The plate is then flipped so that potting plate 158 with guiding rods 146 is now in a top position and plate 159 is on bottom. In a fourth step, shown in FIG. 40, weights or some other instrument 163 are placed on top to maintain the position of the cell stack 145 and the potting plate 158 with the guide rods 146 is removed. As a result, the slots in the cell material that held the guide rods are rendered empty.

Figure 41:
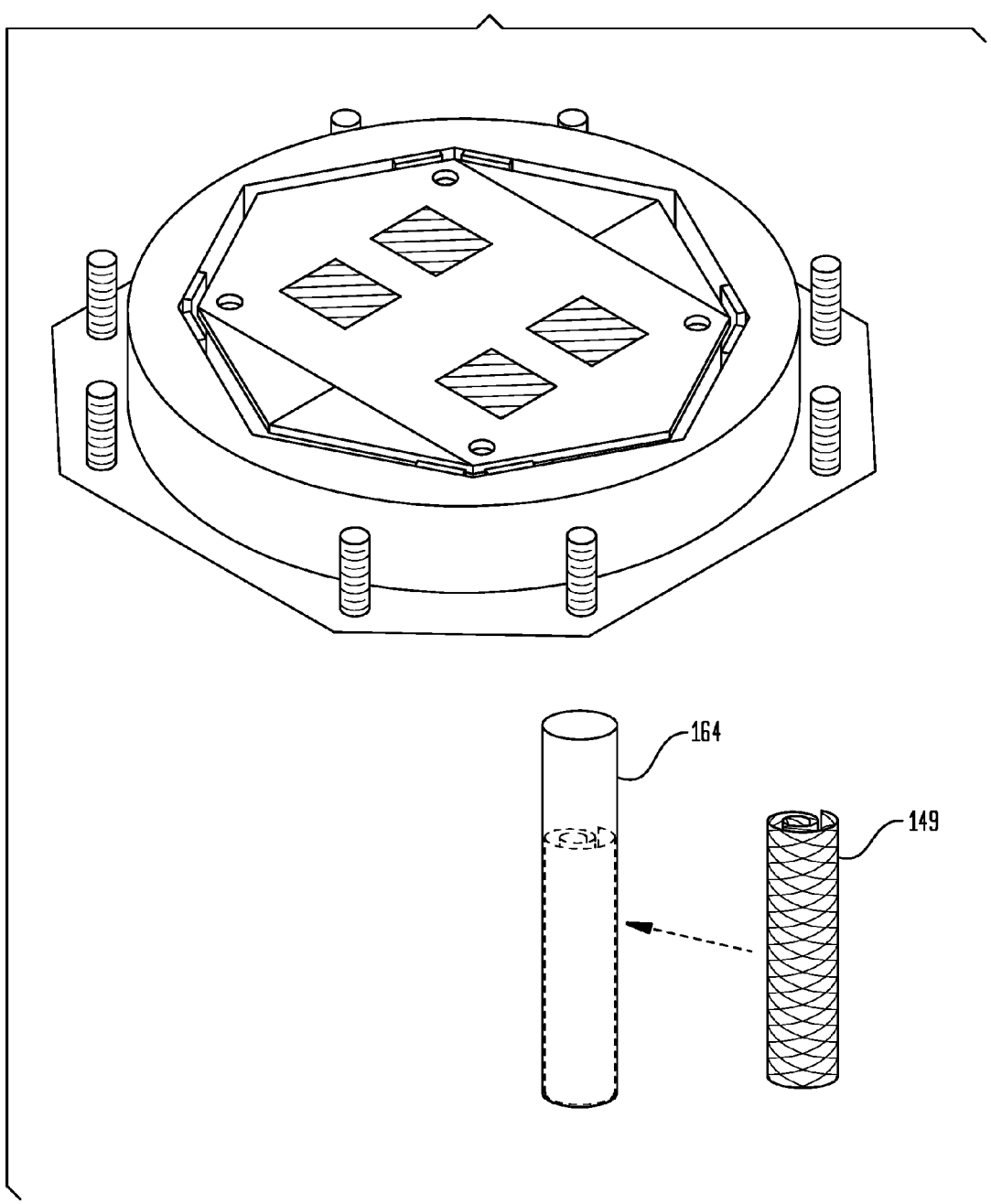
FIG. 41 is a schematic illustration of a step in a method of assembling a cross-flow electrochemical treatment device in accordance with one or more embodiments.
Figure 42:
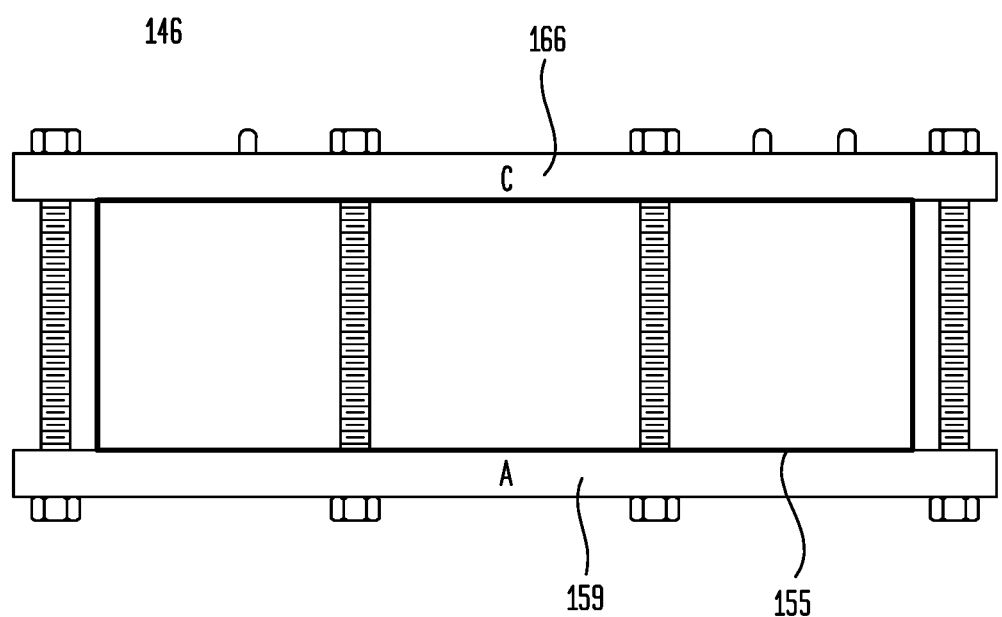
FIG. 42 is a schematic illustration of a step in a method of assembling a cross-flow electrochemical treatment device in accordance with one or more embodiments.

In a fifth step, shown in FIG. 41, an expandable screen plug 149 is placed into each of the empty slots. The expandable screen plug 149 may be deployed via a tubular sleeve 164 made of 0.25 mm thick PP sheets so as to avoid disruption to the layers of material with the stack. Once the plugs 149 are deployed to each of corners 118, a final step, shown in FIG. 42, includes placing a new plate 166 onto the frame 155 and tightening the assembly before removing weights 163. At this stage the assembly is ready for potting.

Inclusion of the expandable screen plug 149 allows for a smooth passage for the potting material to penetrate in between the layers of materials, thereby enhancing the strength of the sub-block. As the sub-corner is one of the possible leak paths, the even distribution/penetration of the potting material may reduce the leakage resulting in an improved efficiency of the product.

Figure 43:
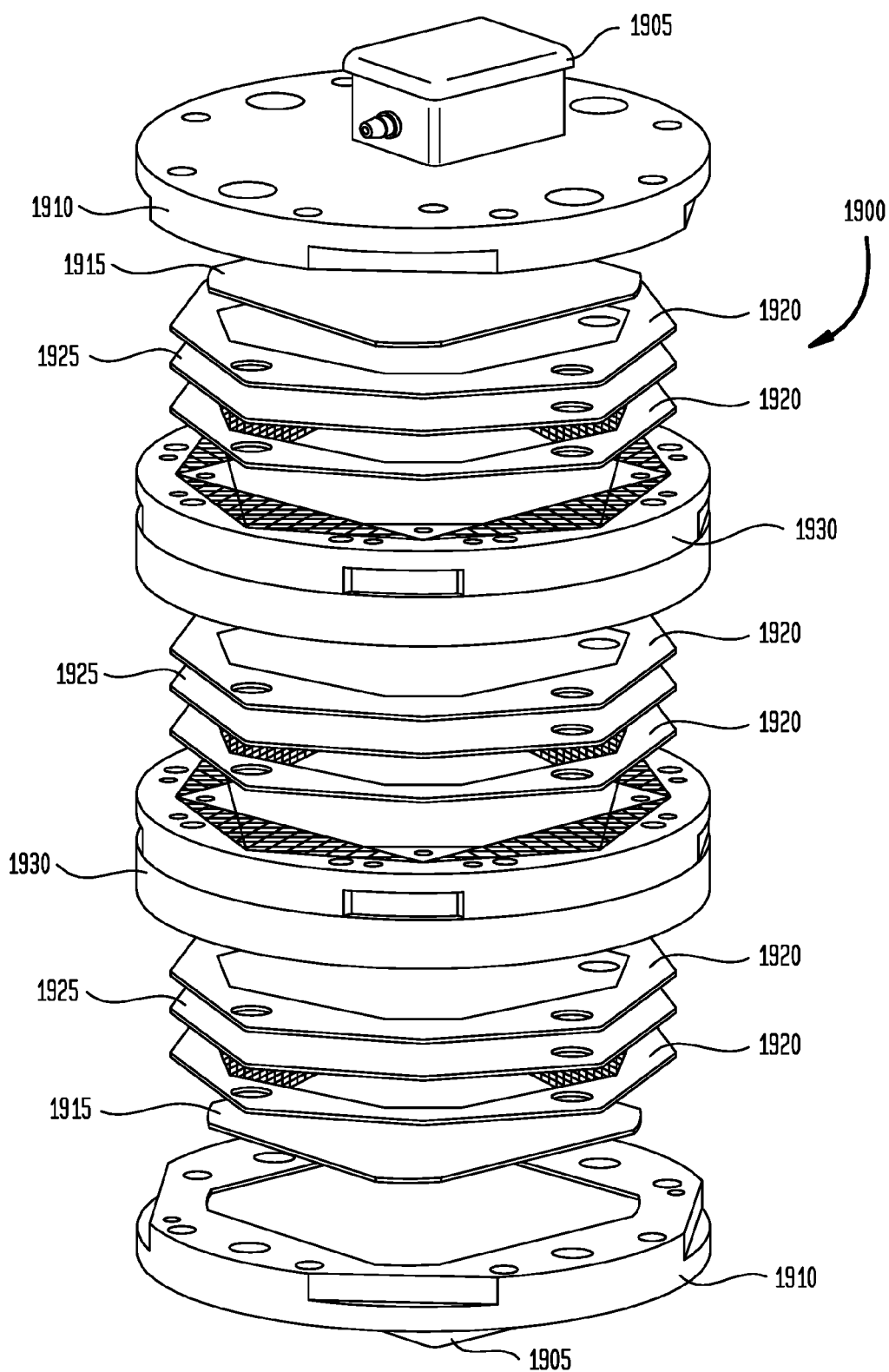
FIG. 43 is an exploded view of an electrochemical treatment apparatus comprising multiple modules in accordance with one or more embodiments.

FIG. 43 is a schematic showing an electrochemical treatment apparatus 1900 without the external housing. Each module or sub-block 1930 contains a cell stack. The modules 1930 are separated by a leak-proof gaskets 1920 and membranes 1925. At each end is an electrode screen 1915, an anode or cathode end plate assembly 1910 and a power connection box 1905. The embodiment shown, for example, has two modular units arranged with the dilute and concentrate streams in a 2-pass configuration. Many combinations of cell pairs and number of modules are possible. Additionally, the configuration can be asymmetric with different numbers of cell pairs in each module. This invention is not limited to any specific number of cell pairs or number of passes.

Figure 44:
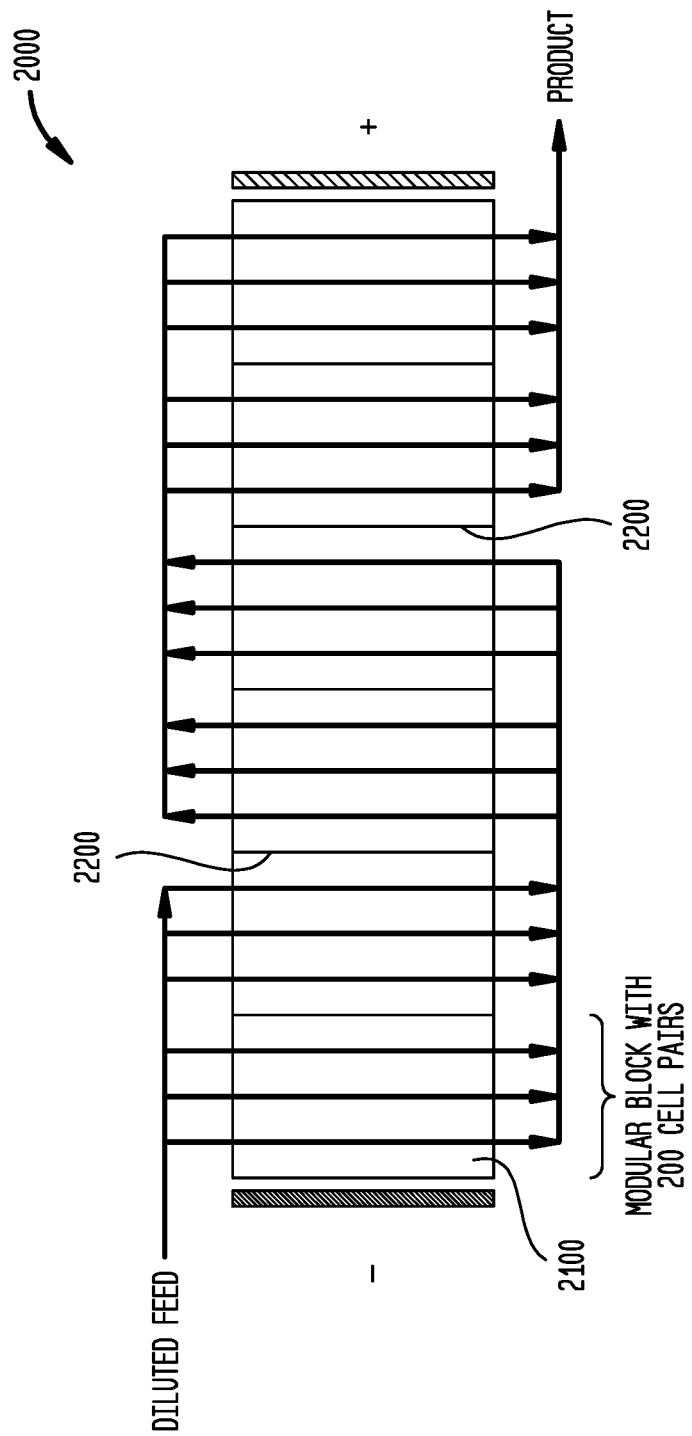
FIG. 44 is a schematic illustration of an electrochemical treatment apparatus comprising multiple modules in accordance with one or more embodiments.

FIG. 44 shows an embodiment of electrical purification apparatus or system wherein the housing 2000 includes blocking spacers 2200 that occasionally redirected the dilute feed after the feed exits certain modular units 2100.

Figure 45:
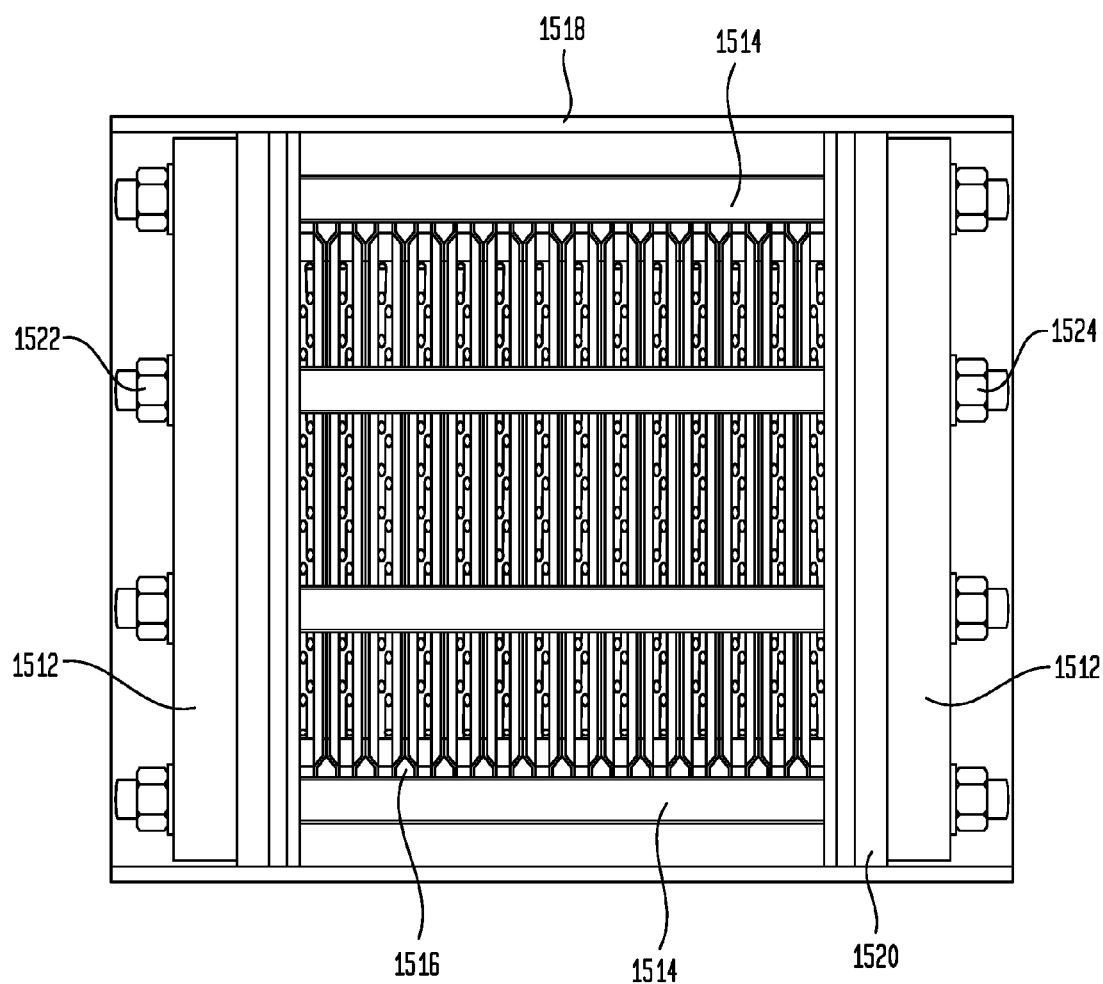
FIG. 45 is a schematic illustration of a housing of an electrochemical treatment apparatus in accordance with one or more embodiments.
Figure 46:
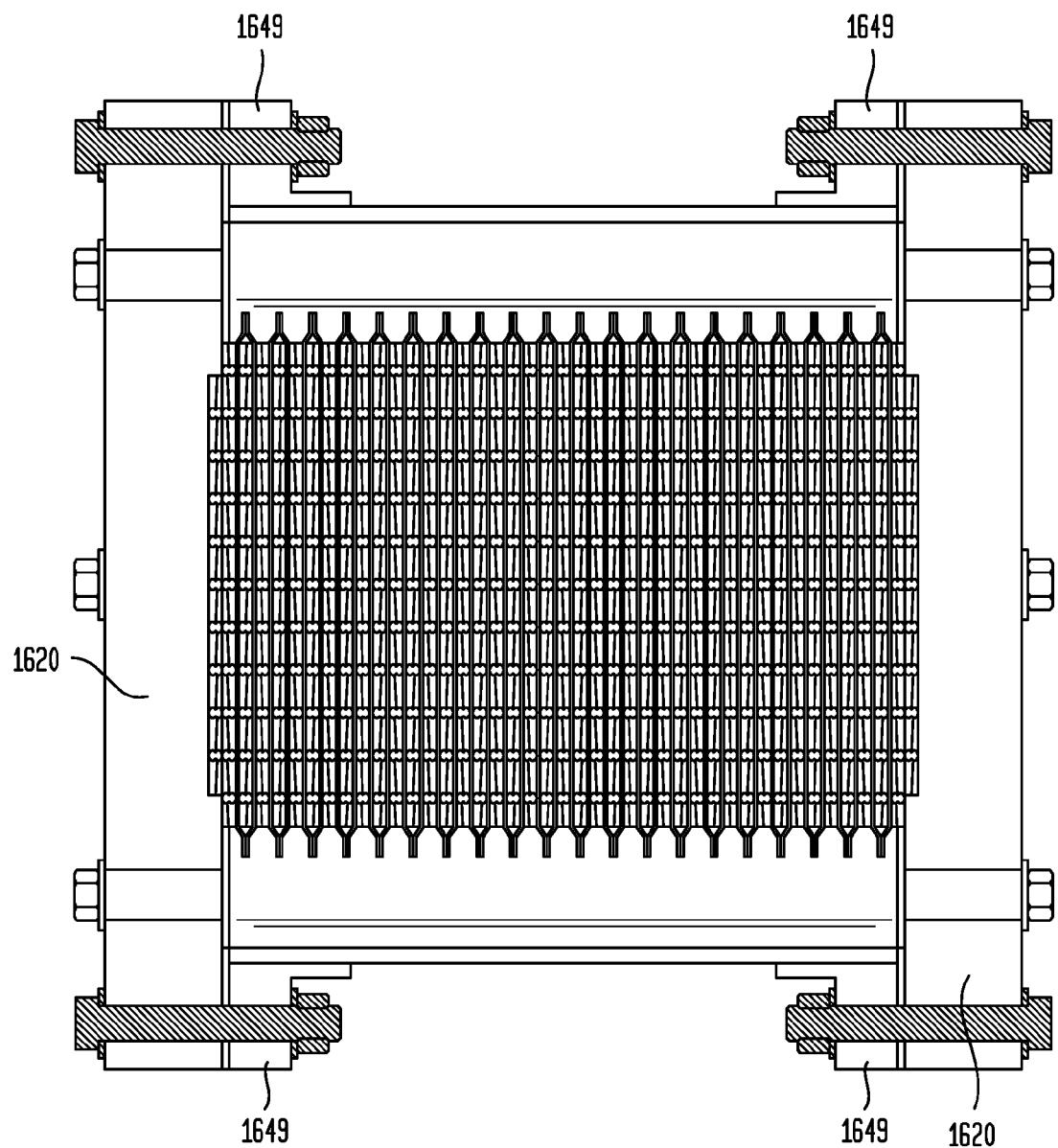
FIG. 46 is a schematic illustration of a housing of an electrochemical treatment apparatus in accordance with one or more embodiments.
Figure 47:
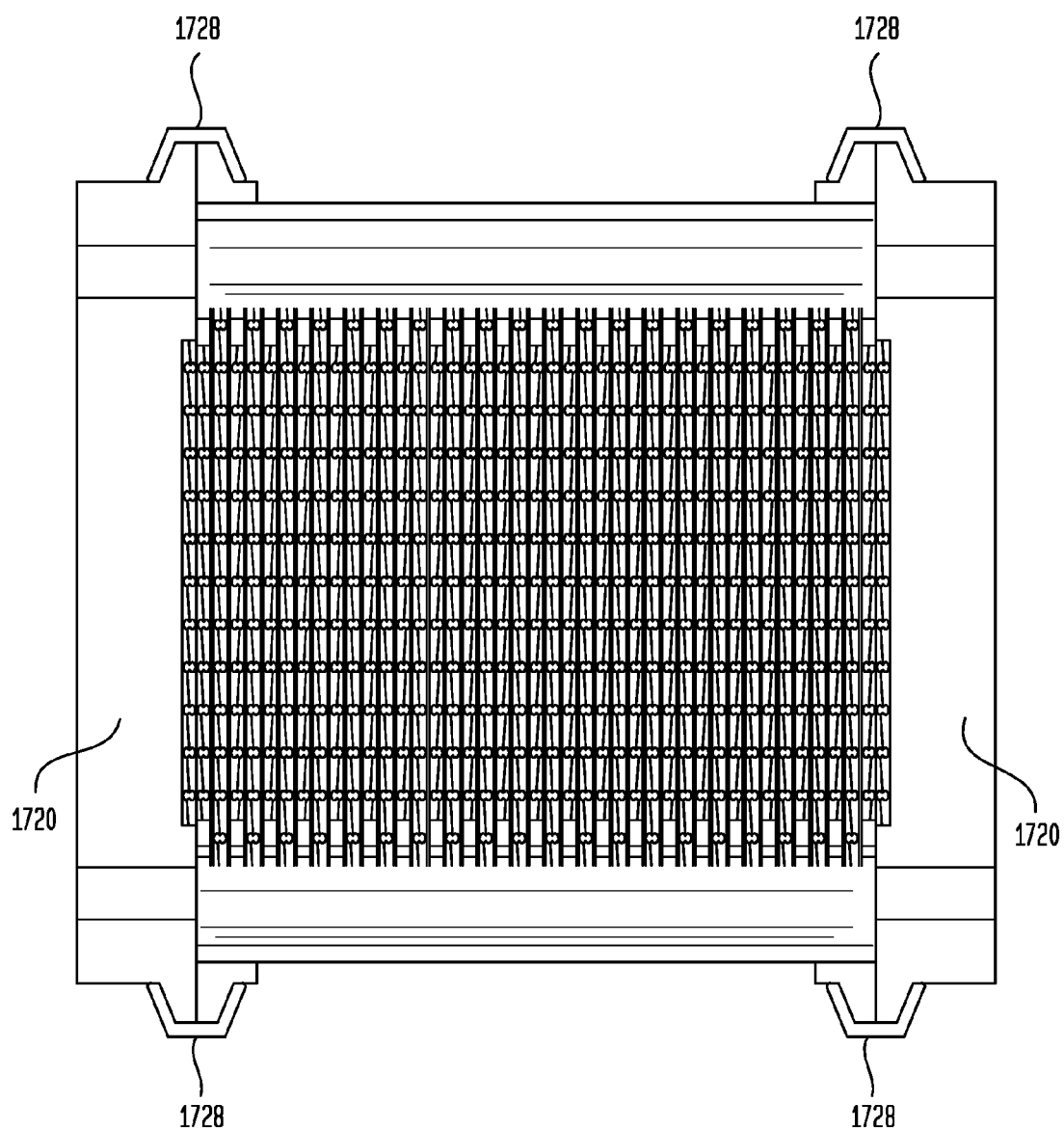
FIG. 47 is a schematic illustration of a housing of an electrochemical treatment apparatus in accordance with one or more embodiments.

FIG. 45 shows one embodiment of a modular unit 1516 is enclosed by housing 1518. Endplates 1512 are drawn together with tie-bars 1514. Tie-bars 1514 are isolated from the fluid streams by non-metallic sleeves. A non-metallic endblock 1520 may be inserted between the modular unit 1516 and endplate 1512 at each end if endplates 1512 are metallic. Endblocks 1520 support the electrodes and isolate the liquid streams from the endplates. The ends of the tie-bar sleeves are sealed against endblocks 1520 by O-rings. Alternatively, endplate 1520 may be non-metallic, and a separate endblock may then not be necessary. As shown in FIG. 45, endplates 1520 may be attached by bolts or threaded rod 1522 and nuts 1524. As shown in FIG. 46, endplates 1620 may be attached by flanges 1649. As shown in FIG. 47, endplates 1720 may be attached by clamps 1728, such as by Victaulic® type clamps.

In some embodiments of the disclosure, the tie-bars may be located outside the housing. In some other embodiments of the disclosure, the endplates may be secured in the housing by segmented or snap rings inserted into grooves at the ends of the housing. The endplates may also be bonded to the housing by adhesives.

A metallic endplate may be fabricated, for example, by machining or casting. A non-metallic endblock or endplate may be fabricated, for example, by machining a block of plastic or by injection molding.

The membrane cells flow compartments may be about 0.33 mm to 0.46 mm thick and, in certain examples, the pot may be air void free.

In some embodiments of the disclosure, a method of providing a source of potable water is provided. In certain embodiments, a method of facilitating the production of potable water from seawater is provided. The method may comprise providing an electrical purification apparatus comprising a cell stack. The method may further comprise fluidly connecting a seawater feed stream to an inlet of the electrical purification apparatus. The method may further comprise fluidly connecting an outlet of the electrical purification apparatus to a potable point of use. Seawater or estuary water may have a concentration of total dissolved solids in a range of about 10,000 to about 45,000 ppm. In certain examples, the seawater or estuary water may have a concentration of total dissolved solids of about 35,000 ppm.

In this embodiment, the cell stack may comprise alternating ion diluting compartments and ion concentrating compartments. Each of the ion diluting compartments may be constructed and arranged to provide a fluid flow in a first direction. Each of the ion concentrating compartments may be constructed and arranged to provide a fluid flow in a second direction that is different from the first direction, as discussed above.

The first direction of fluid flow and the second direction of fluid flow may be selected and provided by way of the construction and arrangement of the compartments. Using the first direction of fluid flow as a direction running along a 0° axis, the second direction of fluid flow may run in a direction of any angle greater than zero degrees and less than 360°. In certain embodiments of the disclosure, the second fluid flow path may run at a 90° angle, or perpendicular to the first fluid flow path. In other embodiments, the second fluid flow path may run at a 180° angle to the first fluid flow path.

The method may further comprise redistributing fluid within at least one of the alternating ion diluting compartments and ion concentrating compartments. One or more of the compartments may be constructed and arranged to redistribute or redirect the fluid flow. This may be accomplished through use of a particular spacer or membrane that defines the compartment that may provide a configuration to redistribute the fluid flow, as described above.

The electrical purification apparatus may further comprise a frame enclosing the cell stack. The frame may be adjacent to or connected to the cell stack to provide a modular unit. The electrical purification apparatus may further comprise a second modular unit that may be secured within a housing. The second modular unit may be secured within the housing such that an ion exchange membrane of the first modular unit is adjacent an ion exchange membrane of the second modular unit.

The method of providing a source of potable water may comprise redirecting at least one of electrical current and fluid flow between the first modular unit and the second modular unit. This may be accomplished, for example, by providing a blocking spacer between the first modular unit and the second modular unit.

A bracket assembly may be positioned between the frame and the housing to secure the modular unit to the housing.

Other types of feed water comprising different concentrations of total dissolved solids may be treated or processed using the apparatus and methods of the present disclosure. For example, brackish water, having a total dissolved solids content in a range of about 1000 ppm to about 10,000 ppm may be treated to produce potable water. Brine, having a total dissolved solids content in a range of about 50,000 ppm to about 150,000 ppm may be treated to produce potable water. In some embodiments, brine, having a total dissolved solids content in a range of about 50,000 ppm to about 150,000 ppm may be treated to produce a water having a lower total dissolved solids content for purposes of disposal, for example, to a body of water, such as an ocean.

The function and advantages of these and other embodiments will be more fully understood from the following examples. The examples are intended to be illustrative in nature and are not to be considered as limiting the scope of the embodiments discussed herein.

EXAMPLE 1

A modular unit was assembled with 93 cell pairs. The extruded polypropylene screens had a thickness of 0.38 mm (0.015") and the films were clear PVC with a thickness of 0.05 mm (0.002"). The ion exchange membranes were manufactured by Evoqua Water Technologies with mean thickness of 0.025 mm (0.001"). Each membrane had a square active area of approximately 305 mm×305 mm (12"×12"). The stack was potted in a machined PVC frame with an outer diameter of 498 mm (19.6") and a thickness of 92 mm (3.62").

The modular unit was inserted between an anode and a cathode, each installed in a machined polypropylene end-block backed up by a machined aluminum endplate. The endplates were pulled together by 8 tie-bars to compress the gaskets between the modular unit and the endblocks.

The device was filled with deionized water and the dilute compartments were pressurized to 4 psi (27.6 kPA, 0.276 bar) while the concentrate compartments were open to atmosphere. A failure in epoxy potting would result in a leakage from the dilute compartments into the concentrate and water flowing out of the concentrate compartments. No cross-leak was detected.

A NaCl solution with a temperature of 25.3° C. and conductivity of 56 mS/cm, corresponding to total dissolved solids (TDS) of 35200 ppm, was fed to both the dilute and concentrate compartments. The TDS is similar to that of typical seawater which, however, would comprise ions other than Na$^+$ and Cl$^-$. The dilute outlet flow rate was 9.1 liter per min (lpm), corresponding to a mean flow velocity of 1.4 cm/s in each dilute compartment, and the concentrate outlet flow rate was 9.6 lpm, corresponding to a mean velocity of 1.51 cm/s.

A DC current of 8 A was applied, resulting in a product at the dilute outlet with conductivity of 52.64 mS/cm (32805 ppm) and a reject at the concentrate outlet with conductivity of 59.19 mS/cm (37459 ppm). The process efficiency $\eta_p$, defined below, was calculated to be 84.3%.

$$\eta_p = \frac{(q_d)_{out}(C_{in} - C_{out})zF}{I}$$

where:
$(q_d)_{out}$=flow rate per dilute compartment at inlet
$C_{in}$=concentration at dilute inlet
$C_{out}$=concentration at dilute outlet
z=valence=1 for NaCl
F=Faraday's constant
I=current The total voltage required across the electrode was 12.9 V, including the voltage drops in the electrode compartments.

The unit was therefore able to efficiently operate to remove impurities from a treatment stream with characteristics similar to that of typical seawater.

EXAMPLE 2

A modular unit was assembled with 93 cell pairs. The materials were the same as in Example 1. Each membrane however had a square active area of approximately 170 mm×170 mm (7"×7"), as compared to approximately 305 mm×305 mm in Example 1. The stack was potted in a machined PVC frame with an outer diameter of 280 mm (11") and a thickness of 92 mm (3.62").

An electrodialysis device was assembled with the modular unit and tested for cross-leak. No cross-leak was detected.

A NaCl solution with a temperature of 28.5° C. and conductivity of 5.9 mS/cm, corresponding to total dissolved solids (TDS) of 3117 ppm, was fed to both the dilute and concentrate compartments. The TDS is in the range for typical brackish water. The dilute outlet flow rate was 7.5 liter per min (lpm), corresponding to a mean flow velocity of 1.7 cm/s in each dilute compartment, and the concentrate outlet flow rate was 7.2 lpm, corresponding to a mean velocity of 1.63 cm/s.

A DC current of 2.71 A was applied, resulting in a product at the dilute outlet with conductivity of 3.9 mS/cm (2018 ppm) and a reject at the concentrate outlet with conductivity of 8.0 mS/cm (4298 ppm). The process efficiency $\eta_p$, was calculated to be 90.2%.

The total voltage required across the electrode was 60 V, including the voltage drops in the electrode compartments. The voltage is much higher than that in Example 1 because the conductivity of the feed is 90% lower.

The unit was therefore able to efficiently operate to remove impurities from a treatment stream with characteristics similar to that of typical brackish water.

Having now described some illustrative embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

It is to be appreciated that embodiments of the devices, systems and methods discussed herein are not limited in application to the details of construction and the arrangement of components set forth in the following description or illustrated in the accompanying drawings. The devices, systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. An electrochemical separation apparatus, comprising:
   a cell stack comprising:
      a plurality of aligned cell pairs, each of the plurality of aligned cell pairs including an ion concentrating compartment constructed and arranged to provide fluid flow in a first direction and an ion diluting compartment constructed and arranged to provide fluid flow in a second direction that is different from the first direction;
      each of the ion concentrating compartments comprising an anion exchange membrane, a cation exchange membrane, and a first spacer positioned between the anion exchange membrane and the cation exchange membrane, the first spacer having a masked first set of end portions and a potted second set of end portions;
      each of the ion diluting compartments comprising an anion exchange membrane, a cation exchange membrane, and a second spacer positioned between the anion exchange membrane and the cation exchange membrane, the second spacer having a potted first set of end portions and a masked second set of end portions;
      the masked first set of end portions of the first spacer being aligned with the potted first set of end portions of the second spacer, and the potted second set of end portions of the first spacer being aligned with the masked second set of end portions of the second spacer;
      each end portion of the first and second sets of end portions defining a channel extending therethrough, each channel being in fluid communication with those spacers through whose masked end portion the channel extends, and each channel being in fluid isolation from those spacers through whose potted end portion the channel extends;
   a frame surrounding the cell stack to form a first module; and
   a housing enclosing the first module.

2. The electrochemical separation apparatus of claim 1, wherein each of the masked first set of end portions of each of the first spacers and masked second set of end portions of each of the second spacers comprises a sleeve surrounding the end portion of the spacer.

3. The electrochemical separation apparatus of claim 2, wherein each of the sleeves comprises a pair of films welded together.

4. The electrochemical separation apparatus of claim 3, wherein the pair of films are welded to each of the first or second spacers at each of the masked first or second set of end portions at multiple interior locations to form obstructions to fluid and current flow.

5. The electrochemical separation apparatus of claim 3, wherein the pair of films are welded directly to each other at each of the masked first or second set of end portions at multiple interior locations to form obstructions to fluid and current flow.

6. The electrochemical separation apparatus of claim 3, wherein each of the sleeves of the first plurality of sleeves comprises a plurality of ribs formed from welded together portions of the pair of plastic films.

7. The electrochemical separation apparatus of claim 2, wherein each of the first or second spacers at each of the masked first or second set of end portions comprises a plurality of raised obstructions in an interior of the masked first or second set of end portions to obstruct fluid and current flow.

8. The electrochemical separation apparatus of claim 2, wherein each sleeve comprises a plastic film and a portion of membrane welded to the masked first or second set of end portions of the first or second spacer, at a periphery of the end portion, the portion of membrane being a portion of one of the anion exchange and the cation exchange membrane.

9. The electrochemical separation apparatus of claim 1, further comprising a second frame surrounding a second cell stack to form a second module within the housing, and a gasket positioned between the first module and the second module, the gasket comprising a plurality of apertures, each aperture aligned respectively with a channel of the first cell stack and a channel of the second module to provide for fluid communication between the first module and the second module.

10. The electrochemical separation apparatus of claim 1, further comprising a second frame surrounding a second cell stack to form a second module within the housing, and a blocking spacer positioned between the first module and the second module to redirect flow between the first module and the second module.

11. The electrochemical separation apparatus of claim 1, wherein the frame comprises a reservoir configured to hold potting material.

12. The electrochemical separation apparatus of claim 11, wherein the frame comprises a channel configured to transfer potting material from the reservoir to the cell stack.

13. The electrochemical separation apparatus of claim 12, wherein the frame comprises a potting diffuser mechanism proximate the cell stack and in fluid communication with the channel.

14. The electrochemical separation apparatus of claim 13, wherein the potting diffuser mechanism comprises an angled cut-out formed in the frame, the angled cut-out configured to distribute potting material evenly to a full width of the cell stack.

15. The electrochemical separation apparatus of claim 14, wherein the frame comprises a unitary body.

16. The electrochemical separation apparatus of claim 1, further comprising a first electrode at a first end of the housing and a second electrode at a second end of the housing.

17. The electrochemical separation apparatus of claim 16, further comprising a casing surrounding the first electrode, the casing comprising a sealing bracket, a sealing cap, and an o-ring positioned between the sealing bracket and the sealing cap.

18. The electrochemical separation apparatus of claim 1, further comprising a plurality of expandable plugs extending through the cell stack and arranged to maintain alignment of the plurality of aligned cell pairs.

19. A method of assembling an electrochemical separation apparatus comprising:
  masking a first plurality of spacers at a first set of end portions;
  masking a second plurality of spacers at a second set of end portions;
  forming a plurality of cell pairs by, for each cell pair, positioning a spacer from the first plurality of spacers between a first anion exchange membrane and a cation exchange membrane to provide an ion concentrating compartment configured to direct fluid flow in a first direction, and positioning a spacer from the second plurality of spacers between the cation exchange membrane and a second anion exchange membrane to provide an ion diluting compartment configured to direct fluid flow in a second direction that is different from the first direction;
  forming a cell stack by successively stacking the formed plurality of cell pairs within a frame;
  potting the first set of end portions and the second set of end portions such that potting material enters the first set of end portions of the second plurality of spacers while being masked from entering the first set of end portions of the first plurality of spacers, and such that potting material enters the second set of end portions of the first plurality of spacers while being masked from entering the second set of end portions of the second plurality of spacers;
  defining a channel through each of the potted portions of each of the first and second sets of end portions such that each of the channels in the first set of end portions is in fluid communication with a plurality of ion concentrating compartments and fluidly isolated from a plurality of ion diluting compartments, while each of the channels in the second set of end portions is in fluid communication with the plurality of ion depleting compartments and fluidly isolated from the plurality of ion concentrating compartments; and
  inserting the channeled cell stack and frame into a housing to form the electrochemical separation apparatus.

20. The method of claim 19, wherein masking a first plurality of spacers at a first set of end portions comprises welding together a pair of plastic films to envelope each of the first set of end portions.

21. The method of claim 20, wherein the pair of plastic films are directly welded to each other.

22. The method of claim 20, wherein the pair of plastic films are welded to each of the first or second spacers.

23. The method of claim 19, wherein potting comprises injecting potting epoxy into the frame surrounding the cell stack from where it is wicked into the first set of end portions and the second set of end portions.

24. The method of claim 23, wherein potting comprises spinning the frame about a central axis as potting epoxy is injected into the frame.

25. The method of claim 23, further comprising promoting uniform distribution of the potting epoxy.

26. The method of claim 19, further comprising mounting a second electrochemical separation apparatus in the housing.

27. The method of claim 26, further comprising inserting a blocking spacer between the first and second electrochemical separation apparatuses.

28. The method of claim 19, further comprising maintaining alignment of the cell stack with at least one expandable plug.

29. The method of claim 19, further comprising promoting current efficiency within the electrochemical separation apparatus.

* * * * *